United States Patent
Volkerink et al.

(10) Patent No.: US 12,387,587 B2
(45) Date of Patent: Aug. 12, 2025

(54) CONTROL MONITORING USING WIRELESS TRACKING DEVICES

(71) Applicant: Trackonomy Systems, Inc., San Jose, CA (US)

(72) Inventors: Hendrik J. Volkerink, Palo Alto, CA (US); Ajay Khoche, West San Jose, CA (US); Taylor Albert Gregoire-Wright, Palo Alto, CA (US); Aaron Storrs, San Jose, CA (US)

( * ) Notice: Subject to any disclaimer, the term of this patent is extended or adjusted under 35 U.S.C. 154(b) by 0 days.

(21) Appl. No.: 17/808,974

(22) Filed: Jun. 24, 2022

(65) Prior Publication Data

US 2022/0335805 A1 Oct. 20, 2022

Related U.S. Application Data

(63) Continuation-in-part of application No. 17/648,917, filed on Jan. 25, 2022, now Pat. No. 11,798,391, and
(Continued)

(51) Int. Cl.
| | |
|---|---|
| *G08B 21/18* | (2006.01) |
| *G08B 23/00* | (2006.01) |
| *G05B 23/00* | (2006.01) |

(52) U.S. Cl.
CPC ............ *G08B 21/18* (2013.01); *G08B 23/00* (2013.01); *G05B 23/00* (2013.01)

(58) Field of Classification Search
CPC .... G08B 21/00; G08B 21/18; G08B 23/0291; G08B 23/00; G05B 23/00; G05B 23/028;
(Continued)

(56) References Cited

U.S. PATENT DOCUMENTS

| 11,115,732 B2 | 9/2021 | Lucrecio et al. |
| 11,236,843 B2 | 2/2022 | Weyn et al. |

(Continued)

FOREIGN PATENT DOCUMENTS

| AU | 2018204317 A1 | 6/2018 |
| AU | 2018250358 A1 | 10/2018 |

(Continued)

OTHER PUBLICATIONS

NPL Search {May 17, 2023).*
PCT Application No. PCT/US2022/035004, International Search Report and Written Opinion, dated Oct. 20, 2022.

*Primary Examiner* — Van T Trieu

(57) ABSTRACT

A wireless tracking device and methods detect movement of a control of equipment, determines a setting of the equipment based on a sensed position of the control, and generates an alert when the control is moved unexpectedly. The wireless tracking device may include an adhesive surface that, in use, adheres the tracking device to the equipment, a sensor that senses a position of the control, a memory storing the position and a setting module having non-transitory computer-readable instructions, and a processor coupled to the sensor and the memory and configured to execute the setting module to analyze the position to determine the setting of the control. The wireless tracking device may implement a lockout/tagout protocol and may have many form factors including an adhesive tape, a belt, a single-use security tag, a cable lock, a padlock, a cable, a stamp and a valve sensor.

30 Claims, 42 Drawing Sheets

Related U.S. Application Data a continuation-in-part of application No. 17/330,353, filed on May 25, 2021, now Pat. No. 11,663,889, and a continuation-in-part of application No. 17/493,827, filed on Oct. 4, 2021, now Pat. No. 11,864,058, and a continuation-in-part of application No. 17/449,582, filed on Sep. 30, 2021, now Pat. No. 11,741,822.

(60) Provisional application No. 63/215,379, filed on Jun. 25, 2021, provisional application No. 63/291,467, filed on Dec. 20, 2021, provisional application No. 63/141,149, filed on Jan. 25, 2021, provisional application No. 63/085,992, filed on Sep. 30, 2020, provisional application No. 63/029,675, filed on May 25, 2020, provisional application No. 63/087,282, filed on Oct. 4, 2020, provisional application No. 63/196,150, filed on Jun. 2, 2021, provisional application No. 63/124,791, filed on Dec. 12, 2020.

(58) Field of Classification Search
CPC .......... G05B 23/0283; G05B 23/0286; G05B 23/0289; G05B 23/0294; G05B 23/0297; G05B 23/03; G05B 19/318; G05B 23/0291; H04B 17/309; H04B 17/318; H04L 1/00; H04L 1/18

See application file for complete search history.

(56) References Cited

U.S. PATENT DOCUMENTS

| | | |
|---|---|---|
| 2008/0156121 A1 | 7/2008 | Radomsky et al. |
| 2014/0054883 A1 | 2/2014 | Lanigan et al. |
| 2018/0163095 A1 | 6/2018 | Khoche |
| 2019/0037362 A1 | 1/2019 | Nogueira-Nine |
| 2019/0171187 A1* | 6/2019 | Cella ................. G05B 19/4183 |
| 2019/0368233 A1* | 12/2019 | Gengler ............. E05B 47/0611 |
| 2020/0070032 A1* | 3/2020 | Orady ................ A63B 21/0058 |
| 2020/0193794 A1* | 6/2020 | Green .................... G08B 25/10 |
| 2020/0225655 A1* | 7/2020 | Cella ................ G05B 19/41875 |
| 2020/0276680 A1* | 9/2020 | Green .................... G06N 20/00 |
| 2020/0305765 A1 | 10/2020 | Herr et al. |
| 2020/0382907 A1* | 12/2020 | Sherlock ............... H04W 4/029 |
| 2021/0003231 A1 | 1/2021 | Weyn et al. |

FOREIGN PATENT DOCUMENTS

| | | |
|---|---|---|
| CA | 3061878 A1 | 11/2018 |
| CA | 3008512 A1 | 12/2018 |

* cited by examiner

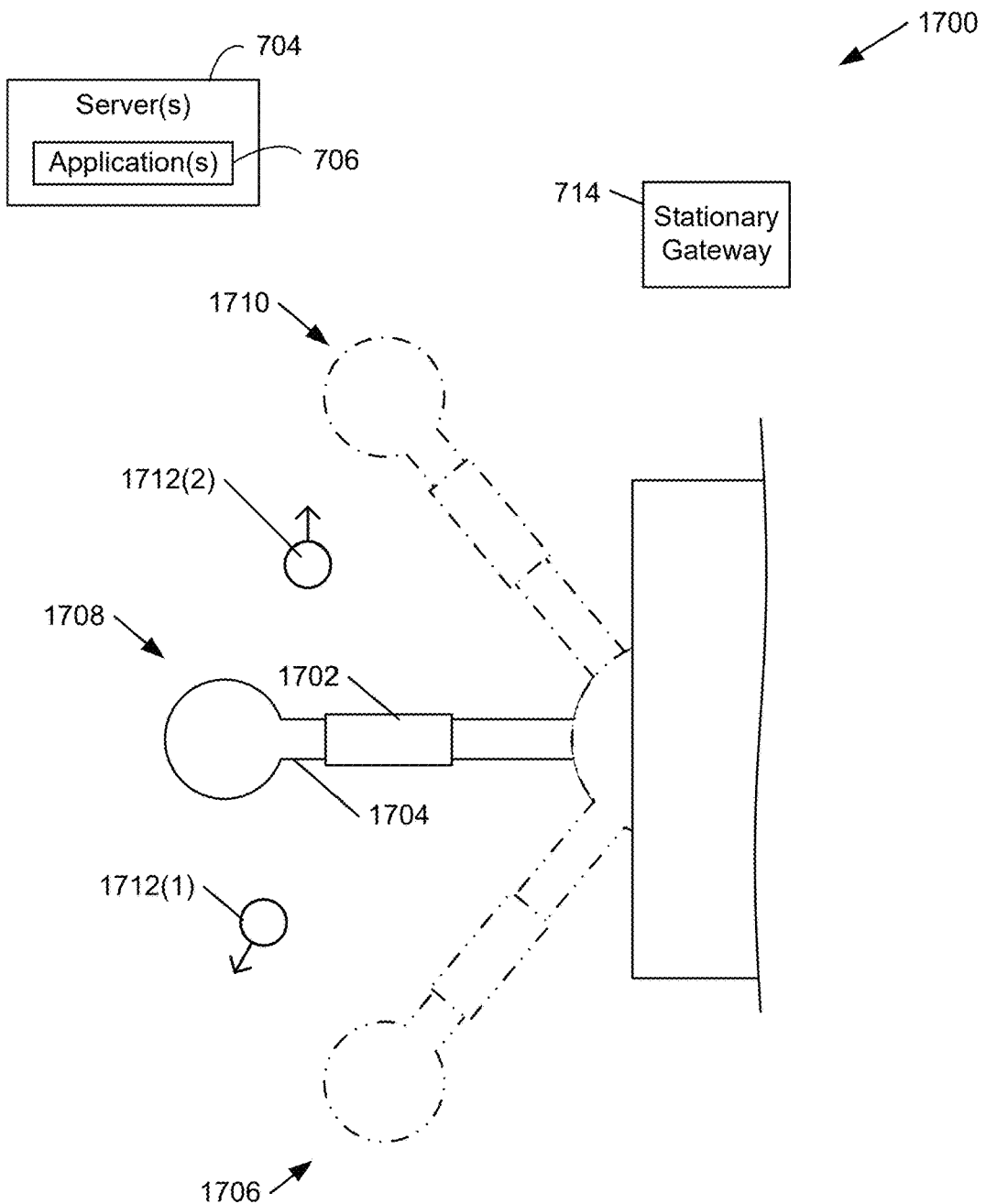
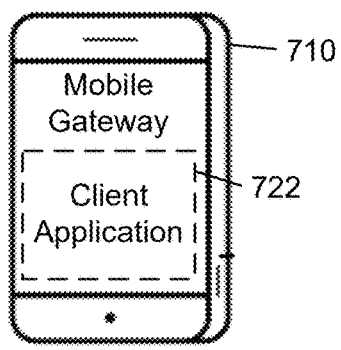
FIG. 17

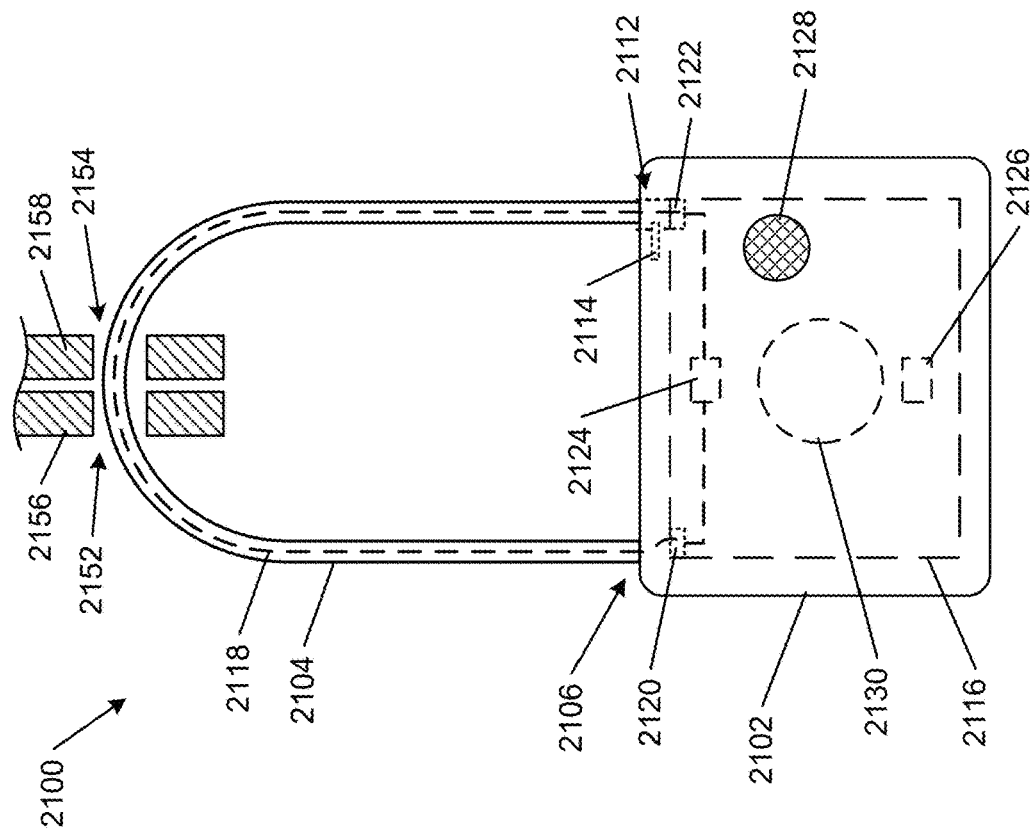
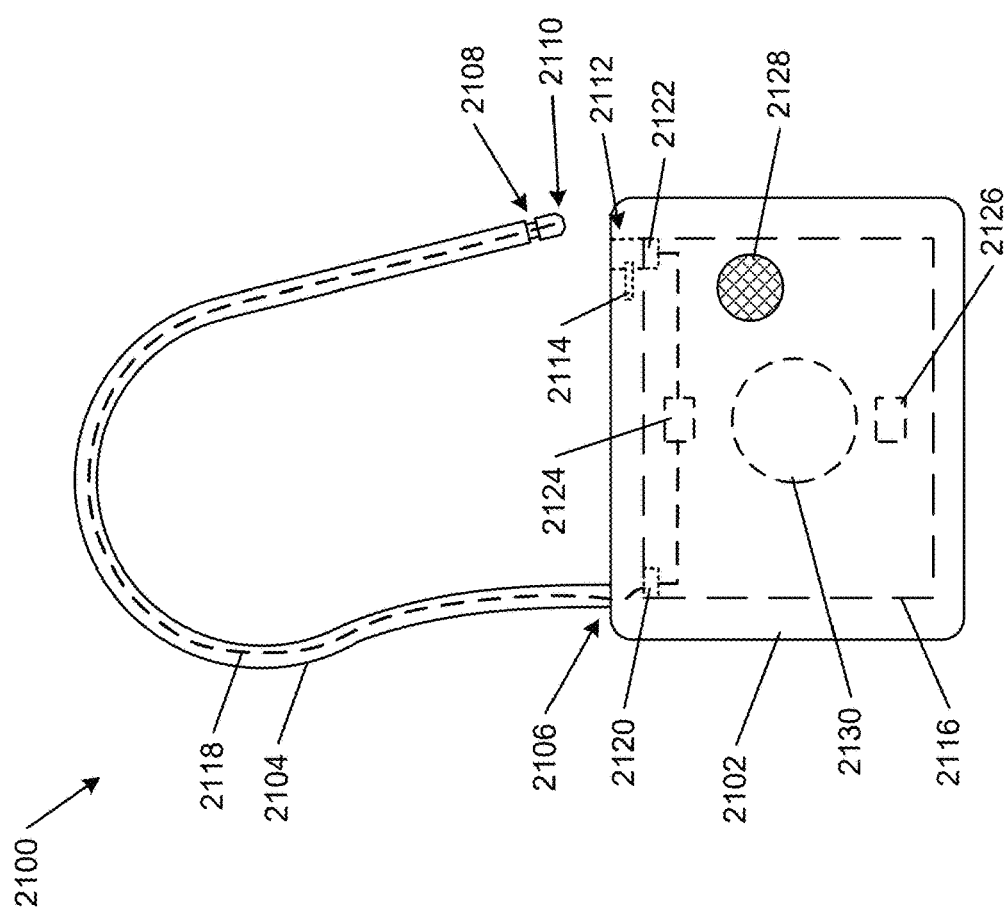
FIG. 21B
FIG. 21A

CONTROL MONITORING USING WIRELESS TRACKING DEVICES

RELATED APPLICATIONS

This application claims priority to 63/215,379, titled "Valve Position Monitoring Using Wireless Tracking Devices," filed Jun. 25, 2021, and to U.S. Patent Application No. 63/291,467, titled "Smart Wireless Tracking Belt," filed Dec. 20, 2021. This application is also a Continuation-In-Part of U.S. patent application Ser. No. 17/648,917, titled "Wireless Tracking Belts for Asset Tracking," filed Jan. 25, 2021, which claims priority to U.S. Patent Application Ser. No. 63/141,149, titled "Wireless Tracking Belts for Asset Tracking," filed Jan. 25, 2021, U.S. Patent Application Ser. No. 63/215,379, titled "Valve Position Monitoring Using Wireless Tracking Devices," filed Jun. 25, 2021, and U.S. Patent Application Ser. No. 63/291,467, titled "Smart Wireless Tracking Belt," filed Dec. 20, 2021. This application is also a Continuation-In-Part of U.S. patent application Ser. No. 17/330,353, titled "Detecting Tampering in Assets and Authenticating Authorized Users," filed May 25, 2021, which claims priority to U.S. Patent Application Ser. No. 63/029,675, titled "Tamper Detecting Disposable Covert Tape", filed May 25, 2020, and to U.S. Patent Application Ser. No. 63/085,992, titled "Detecting Tampering in Assets and Authenticating Authorized Users," filed Sep. 30, 2020. This application is also a Continuation-In-Part of U.S. patent application Ser. No. 17/493,827, titled "Flexible Tracking Device for Cables and Equipment," filed Oct. 4, 2021, which claims priority to U.S. Patent Application No. 63/087,282, filed on Oct. 4, 2020. This application is also a Continuation-In-Part of U.S. patent application Ser. No. 17/449,582, titled "System and Method of Intelligent Node Detecting Events for Border Protection And Security," filed Sep. 30, 2021, a Continuation-in-part of U.S. patent application Ser. No. 17/330,353, titled "Detecting Tampering In Assets and Authenticating Authorized Users", filed May 25, 2021, which claims priority to U.S. Provisional Application 63/029,675, titled "Tamper Detecting Disposable Convert Tape", filed May 25, 2020, and claims priority to U.S. Provisional Application Ser. No. 63/124,791, titled "Flexible Solar Powered Wireless Communication Device", filed Dec. 12, 2020, and claims priority to U.S. Provisional Application Ser. No. 63/196,150, titled "Computer Vision And Augmented Reality For Tamper Detection", filed Jun. 2, 2021, and claims priority to U.S. Provisional Application Ser. No. 63/085,992, titled "Detecting Tampering In Assets And Authenticating Authorized Users", filed Sep. 30, 2020. Each of the above referenced applications is incorporated herein by reference in its entirety.

BACKGROUND

In environments wherein large numbers of assets are being managed, stored, and transported, it is often difficult to migrate to updated equipment. For example, it may be prohibitively expensive to purchase new equipment. Implementing retrofits to existing equipment, too, is often costly, requiring manpower and time that interrupt or stop a normal flow of operations in order to gather existing equipment, implement retrofits, and to deploy the retrofitted equipment.

In some cases, tracking devices may be used to collect data on assets that do not have an inherent capability to collect and transmit data. However, a conventional tracking device may be exposed to physical damage or trauma. In particular, assets that are used in environments or applications that have a high risk of physical damage may not be well suited for electronics devices that are sensitive to physical damage or trauma.

SUMMARY

In one embodiments, a system for detecting a setting of a control for equipment, includes: a tracking device, having: a sensor that senses a position of the control, a memory storing the position and a setting module having non-transitory computer-readable instructions, and, a processor coupled to the sensor and the memory and configured to execute the setting module to analyze the position to determine the setting of the control; and, a battery that supplies power to the sensor, the memory, and the processor.

In another embodiment, a method for lockout/tagout using a wireless tracking device, includes: detecting unexpected movement of the wireless tracking device by: reading sensor data from at least one movement sensor of the wireless tracking device; and processing the sensor data to detect movement of the wireless tracking device; and generating an alert when the unexpected movement is detected.

In another embodiment, a method for lockout/tagout using a wireless tracking device, includes: detecting unexpected movement of a control of equipment by: reading sensor data from at least one sensor of the wireless tracking device; and processing the sensor data to determine the control has moved; and generating an alert when the control is moved unexpectedly.

In another embodiments, a wireless tracking device for monitoring position of a control, includes: a sensor that senses a position of the control; a memory storing the position and non-transitory computer-readable instructions; a processor coupled to the sensor and the memory and configured to execute the computer-readable instructions to determine change in a position of the control; and a battery that supplies power to the sensor, the memory, and the processor. The wireless tracking device is flexible and has an adhesive surface that, in use, adheres the wireless tracking device to the control.

BRIEF DESCRIPTION OF THE FIGURES

FIG. 17 is a schematic side view of one example control lever illustrating use of a tape node positioned on a shaft of control lever to determine a position or setting of control lever, in embodiments.

FIGS. 21A and 21B are schematic diagrams illustrating one example single-use smart security device in an open position prior to use, and in a closed position during use, respectively, in embodiments.

DETAILED DESCRIPTION OF THE EMBODIMENTS

Figure 1:
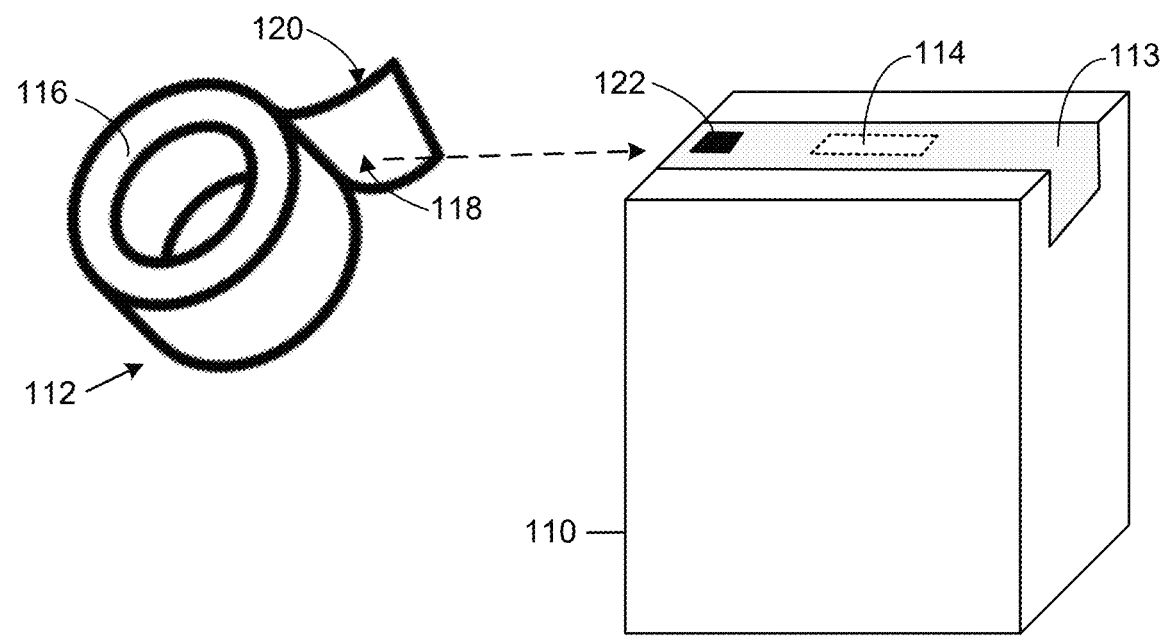
FIG. 1 is a schematic showing one example adhesive tape-agent platform, including wireless transducing circuit, used to seal a package for shipment, in embodiments.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

In some contexts, the term "agent" may refer to a "node", and an "agent" or "node" may be adhesively applied to a surface and denoted as a "tape node" or "tape agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent".

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 6A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

Further, each of the "agents", "nodes", "tape nodes", and "tape agents" may include flexible or non-flexible form factors unless otherwise specified. Thus, each of the "agents", "nodes", "tape nodes", and "tape agents" include flexible and non-flexible (rigid) form factors, or a combination thereof including flexible components and non-flexible components.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component", and "unit" refer to hardware, software, or firmware, or a combination thereof. The term "processor" or "computer" or the like includes one or more of: a microprocessor with one or more central processing unit (CPU) cores, a graphics processing unit (GPU), a digital signal processor (DSP), a field-programmable gate array (FPGA), a system-on-chip (SoC), a microcontroller unit (MCU), and an application-specific integrated circuit (ASIC), a memory controller, bus controller, and other components that manage data flow between said processor associated memory, and other components communicably coupled to the system bus. Thus the terms "module," "manager," "component", and "unit" may include computer readable instructions that, when executed by a processor, implement the functionality discussed herein with respect to said "module," "manager," "component", and "unit".

Adhesive Tape Agent Platform

FIG. 1 is a schematic showing one example adhesive tape-agent platform 112, including wireless transducing circuit 114, used to seal a package 110 for shipment. In this example, a segment 113 of the adhesive tape-agent platform 112 is dispensed from a roll 116 and affixed to the package 110. The adhesive tape-agent platform 112 includes an adhesive side 118 and a non-adhesive surface 120. The adhesive tape-agent platform 112 may be dispensed from the roll 116 in the same way as any conventional packing tape, shipping tape, or duct tape. For example, the adhesive tape-agent platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 2:
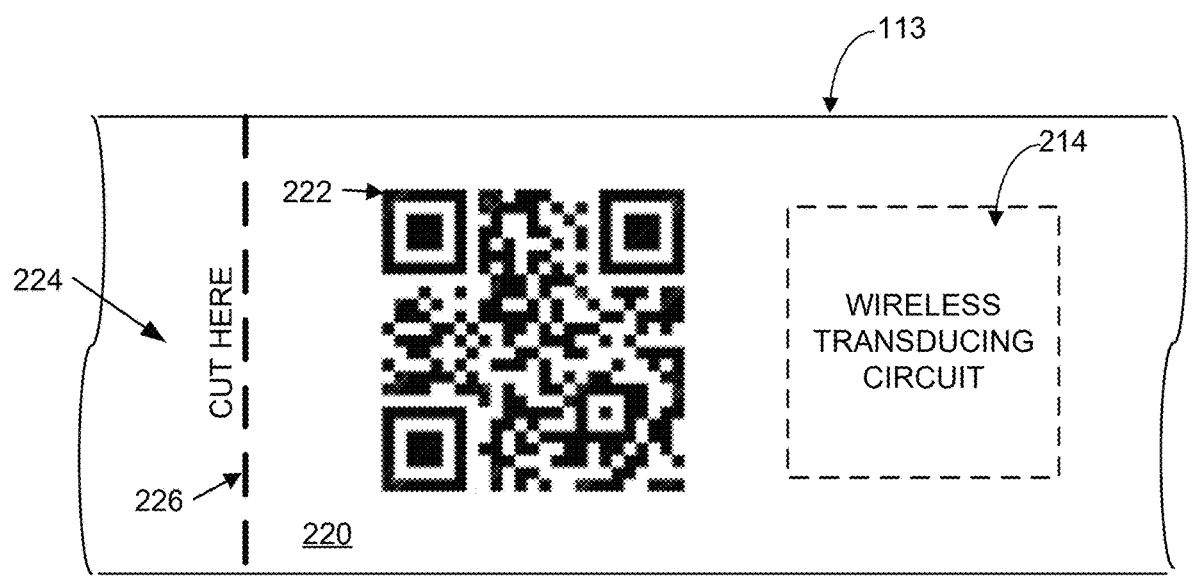
FIG. 2 is a schematic showing the non-adhesive surface of one segment of the adhesive tape agent platform of FIG. 1, in embodiments.

FIG. 2 is a schematic showing the non-adhesive surface 120 of the segment 113 of the adhesive tape agent platform 112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example of FIG. 2, the segment 113 of the adhesive tape agent platform 112 includes an identifier 122 (e.g., a two-dimensional bar code, such as a QR Code), written instructions 224 (e.g., "Cut Here"), and an associated cut line 226 that indicates where the user should cut the adhesive tape agent platform 112. The written instructions 224 and the cut line 226 typically are printed or otherwise marked on the top non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 226 may demarcate the boundaries between adjacent segments at locations that are free of any active components of the wireless transducing circuit 114. The spacing between the wireless transducing circuit 114 and the cut lines 226 may vary depending on the intended communication, transducing and/or adhesive taping application. In the example illustrated in FIG. 1, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape agent platform to the package 110.

In some examples, the wireless transducing circuits 114 embedded in one or more segments 113 of the adhesive tape-agent platform 112 are activated when the adhesive tape agent platform 112 is cut along the cut line 226. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 226).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
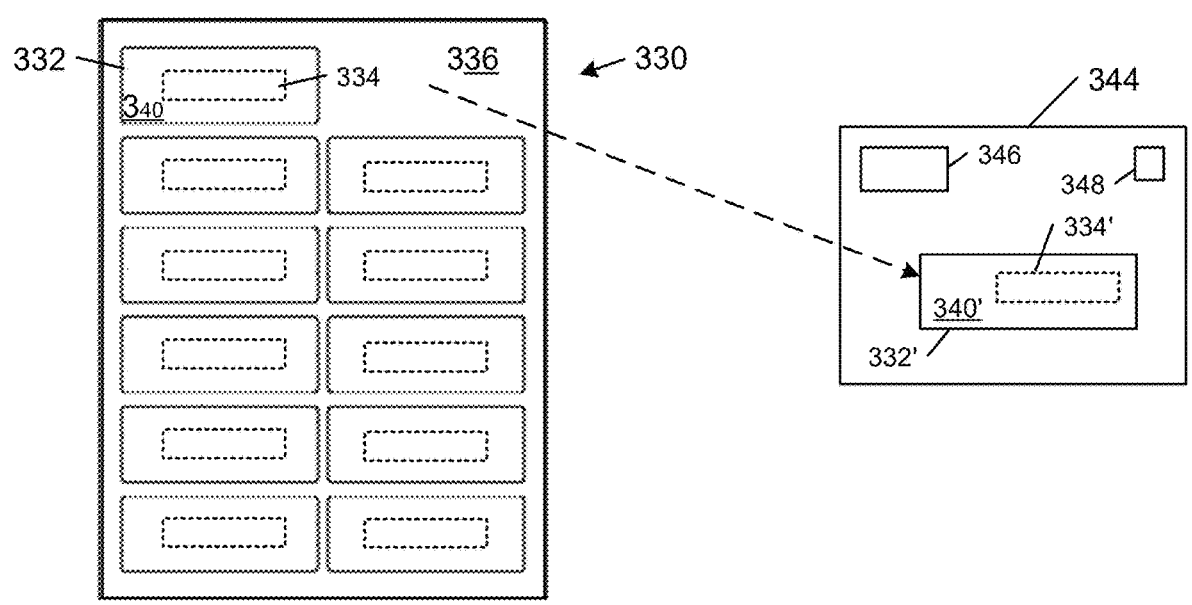
FIG. 3 is a schematic showing one example adhesive tape platform that includes a set of adhesive tape platform segments, in embodiments.

FIG. 3 is a schematic showing one example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Adhesive tape platform 330 may represent adhesive tape platform 112 if FIG. 1. Each adhesive tape platform segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 44 also includes a return address 346 and, optionally, a postage stamp or mark 348.

In some examples, segments of the adhesive tape platform 330 are deployed by a human operator. The human operator may be equipped with a mobile phone or other device that allows the operator to authenticate and initialize the adhesive tape platform 330. In addition, the operator can take a picture of a parcel including the adhesive tape platform and any barcodes associated with the parcel and, thereby, create a persistent record that links the adhesive tape platform 330 to the parcel. In addition, the human operator typically will send the picture to a network service and/or transmit the picture to the adhesive tape platform 330 for storage in a memory component of the adhesive tape platform 330.

In some examples, the wireless transducing circuit components 334 that are embedded in a segment 332 of the adhesive tape platform 330 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
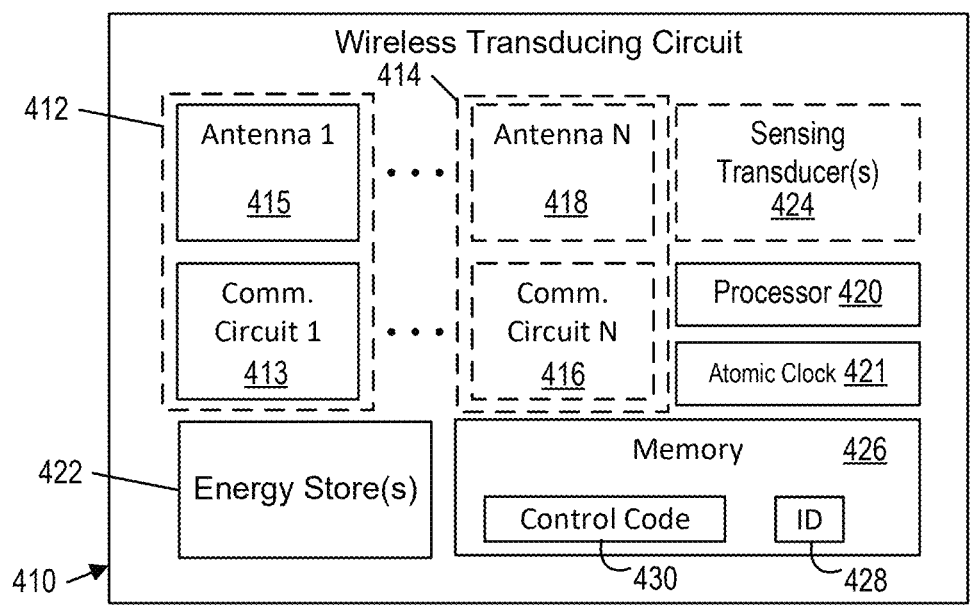
FIG. 4 is a block diagram illustrating components of an example wireless transducing circuit that includes one or more wireless communication modules, in embodiments.

FIG. 4 is a block diagram illustrating components of an example wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or sensing transducers 424. In other embodiments, memory 426 is integrated in the wireless transducing circuit 410 as shown in FIG. 4. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
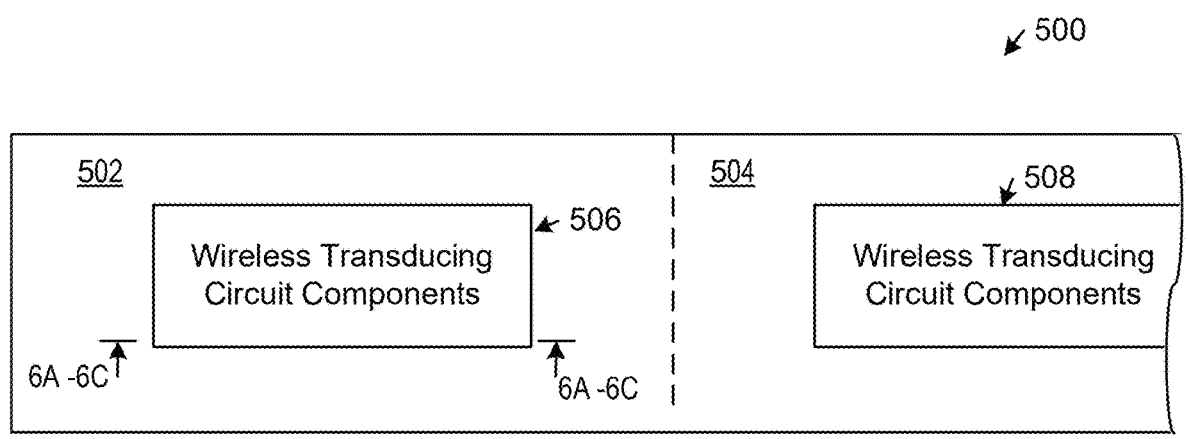
FIG. 5 is a top view of a portion of an example flexible adhesive tape platform that shows a first segment and a portion of a second segment, in embodiments.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 410 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 500 according to a roll-to-roll fabrication process is described in connection with FIGS. 6A-6C and as shown in FIGS. 7A and 7C of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 6A:
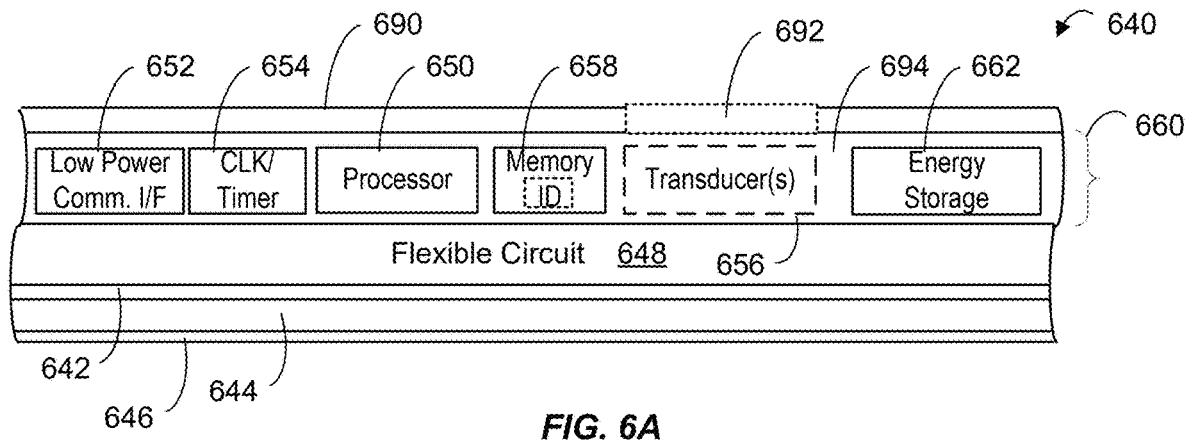
FIGS. 6A-C show cross sectional side views of three flexible adhesive tape agent platforms that each include a respective set of the components of the wireless transducing circuit of FIG. 5, in embodiments.

FIG. 6A shows a cross-sectional side view of a portion of an example segment 640 of a flexible adhesive tape agent platform (e.g., platform 500 of FIG. 5) that includes a respective set of the components of the wireless transducing circuit 410 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a prefabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

Figure 6B:
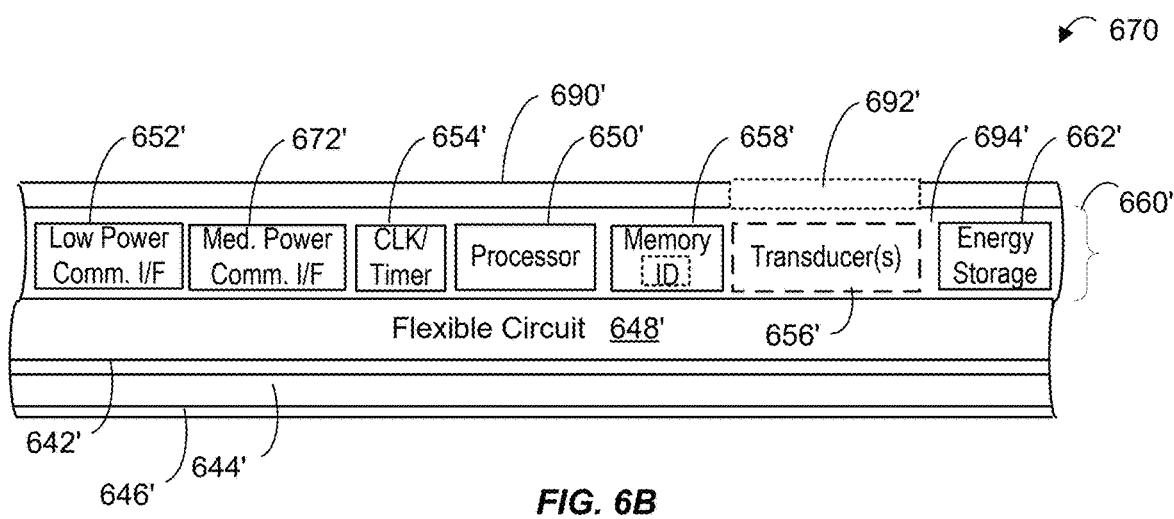

FIG. 6B shows a cross-sectional side-view of a portion of an example segment 670 of a flexible adhesive tape agent platform (e.g., platform 500 of FIG. 5) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communications-interface 652. The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

Figure 6C:
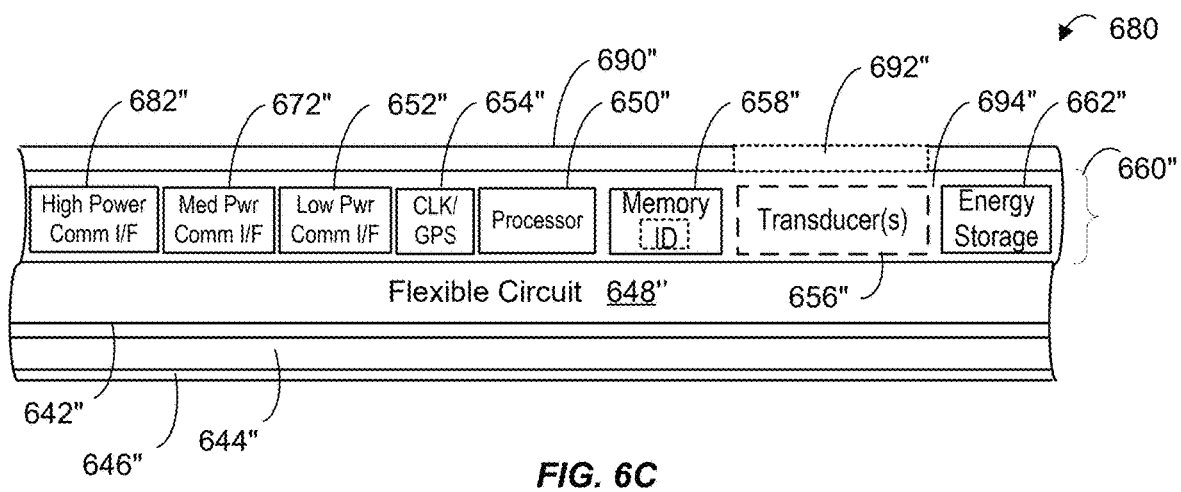

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power communications-interface 682" (e.g., a cellular interface; e.g., GSM/GPRS) in addition to a low-power communications-interface 652" and may include a medium-power communications-interface 672". The high-power communications-interface 682" has a range that provides global coverage to available infrastructure (e.g., the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power communications interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682" and the transducers) on the front-side of the flexible circuit 648, 648', 648" to the electrodes of the energy storage device 662, 662', 662" via one or more through holes in the substrate of the flexible circuit 648, 648', 648".

The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

Figure 7:
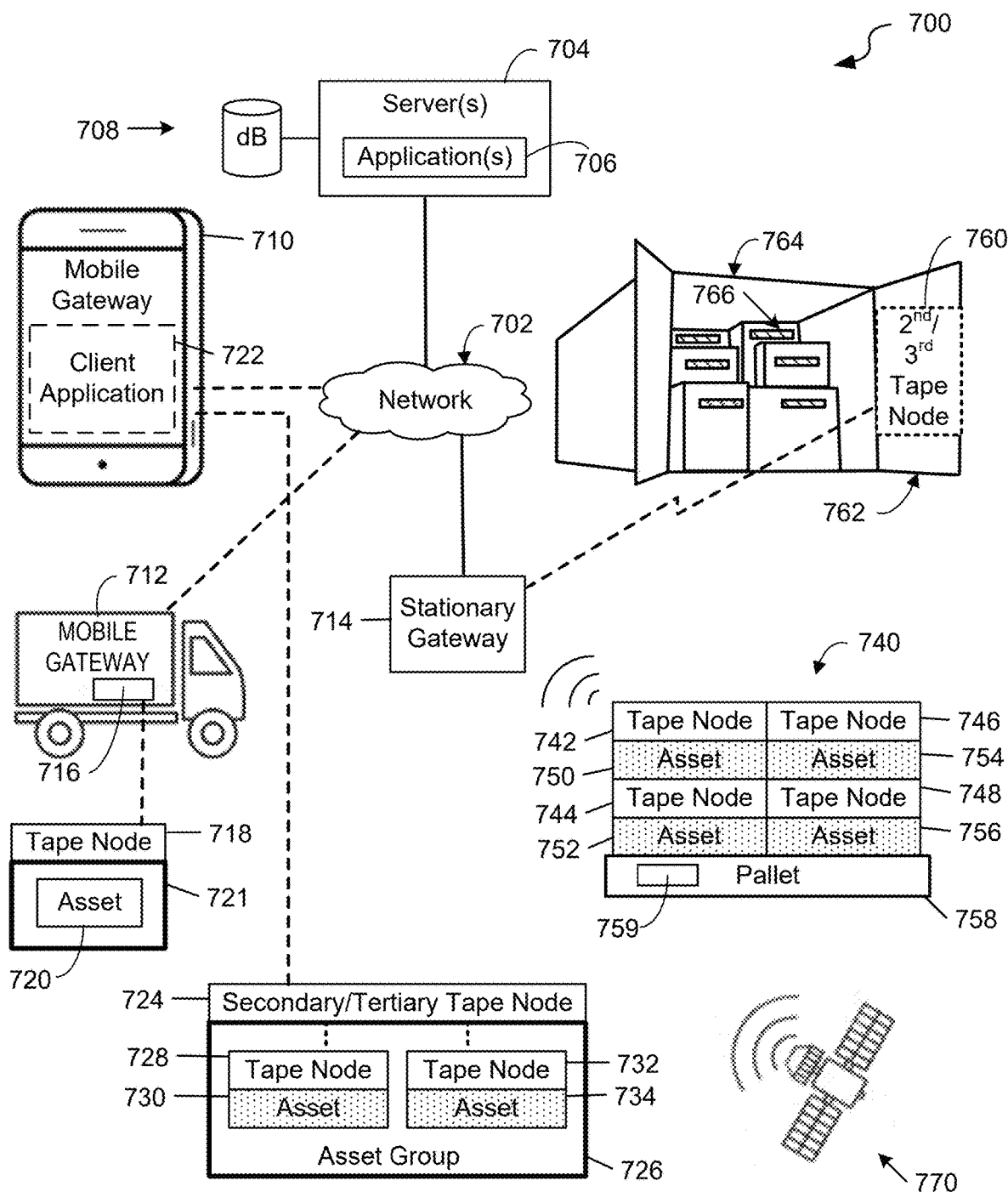
FIG. 7 shows an example network communications environment that includes a network supporting communications between servers, mobile gateways, a stationary gateway, and various types of tape nodes associated with various assets, in embodiments.

FIG. 7 shows an example network communications environment 700 that includes a network 702 that supports communications between one or more servers 704 executing one or more applications of a network service 708, mobile gateways 710 (a smart device mobile gateway), 712 (a vehicle mobile gateway), a stationary gateway 714, and various types of tape nodes that are associated with various assets (e.g., parcels, equipment, tools, persons, and other things). Network communications environment 700 may also be called a wireless tracking system 700. Hereinafter "tape nodes" may be used interchangeably with the "agents", as described above, with reference to FIGS. 1-6C; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 702 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 702 includes communications infrastructure equipment, such as a geolocation satellite system 770 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and Zig-Bee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 720) or other stationary (e.g., stationary gateway 714) or mobile object (e.g., a, such as a delivery truck, such as mobile gateway 712) or stationary object (e.g., a structural element of a building). This process activates the tape node (e.g., the tape node 718) and causes the tape node 718 to communicate with the one or more servers 704 of the network service 708. In this process, the tape node 718 may communicate through one or more other tape nodes (e.g., the tape nodes 742, 744, 746, 748) in the communication hierarchy. In this process, the one or more servers 704 executes the network service application 706 to programmatically configure tape nodes 718, 724, 728, 732, 742, 744, 746, 748, that are deployed in the network communications environment 700. In some examples, there are multiple classes or types of tape nodes (e.g., the master agent, secondary agent, or tertiary agent discussed herein), where each tape node class has a different respective set of functionalities and/or capacities, as described herein with respect to the "agents."

In some examples, the one or more servers 704 communicate over the network 702 with one or more gateways 710, 712, 714 that are configured to send, transmit, forward, or relay messages to the network 702 in response to transmissions from the tape nodes 718, 724, 728, 732, 742, 744, 746, 748 that are associated with respective assets and within communication range. Example gateways include mobile gateways 710, 712 and a stationary gateway 714. In some examples, the mobile gateways 710, 712, and the stationary gateway 714 are able to communicate with the network 702 and with designated sets or groups of tape nodes.

In some examples, the mobile gateway 712 is a vehicle (e.g., a delivery truck or other mobile hub) that includes a wireless communications unit 716 that is configured by the network service 708 to communicate with a designated network of tape nodes, including tape node 718 (e.g., a master tape node) in the form of a label that is adhered to a parcel 721 (e.g., an envelope) that contains an asset 720, and is further configured to communicate with the network service 708 over the network 702. In some examples, the tape node 718 includes a lower-power wireless-communications interface of the type used in, e.g., segment 640 (shown in FIG. 6A), and the wireless communications unit 716 may implemented by a secondary or tertiary tape node (e.g., one of segment 670 or segment 680, respectively shown in FIGS. 6B and 6C) that includes a lower-power communications interfaces for communicating with tape nodes within range of the mobile gateway 712 and a higher-power communications-interface for communicating with the network 702. In this way, the tape node 718 and wireless communications unit 716 create a hierarchical wireless network of tape nodes for transmitting, forwarding, bridging, relaying, or otherwise communicating wireless messages to, between, or on behalf of the tape node 718 in a power-efficient and cost-effective way.

In some examples, a mobile gateway 710 is a mobile phone that is operated by a human operator and executes a client application 722 that is configured by a network service to communicate with a designated set of tape nodes, including a secondary or tertiary tape node 724 that is adhered to a parcel 726 (e.g., a box), and is further configured to communicate with a server 704 over the network 702. In the illustrated example, the parcel 726 contains a first parcel labeled or sealed by a master tape node 728 and containing a first asset 730, and a second parcel labeled or sealed by a master tape node 732 and containing a second asset 734. The secondary or tertiary tape node 724 communicates with each of the master tape nodes 728, 732 and also communicates with the mobile gateway 710. In some examples, each of the master tape nodes 728, 732 includes a lower-power wireless-communications interface of the type used in, e.g., segment 640 (shown in FIG. 6A), and the secondary/tertiary tape node 724 is implemented by a tape node (e.g., segment 670 or segment 680, shown in FIGS. 6B and 6C) that includes a low-power communications interface for communicating with the master tape nodes 728, 732 contained within the parcel 726, and a higher-power communications interface for communicating with the mobile gateway 710. The secondary or tertiary tape node 724 is operable to relay wireless communications between the master tape nodes 728, 732 contained within the parcel 726 and the mobile gateway 710, and the mobile gateway 710 is operable to relay wireless communications between the secondary or tertiary tape node 724 and the server 704 over the network 702. In this way, the master tape nodes 728 and 732 and the secondary or tertiary tape node 724 create a wireless network of nodes for transmitting, forwarding, relaying, or otherwise communicating wireless messages to, between, or on behalf of the master tape nodes 728, 732, the secondary or tertiary tape node 724, and the network service (not shown) in a power-efficient and cost-effective way.

In some embodiments, the client application 722 is installed on a mobile device (e.g., smartphone) that may also operate as mobile gateway 710. The client application 722 may cause the mobile device to function as a mobile gateway 710. For example, the client application 722 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 722) relays that data to the server 704 via cellular (2G, 3G, 4G, 5G) or Wi-Fi. Further, the client application 722 may cause the mobile device to establish a connection with, and receive pings (e.g., alerts to nearby assets that an environmental profile threshold has been exceeded), from the tape nodes or from the server 704. The tape nodes or server may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 722 may share location data with the tape node, allowing the tape node to pinpoint its location.

In some examples, the stationary gateway 714 is implemented by a server 704 executing a network service application 706 that is configured by the network service 708 to communicate with a designated set 740 of master tape nodes 742, 744, 746, 748 that are adhered to respective parcels containing respective assets 750, 752, 754, 756 on a pallet 758. In other examples, the stationary gateway 714 is implemented by a secondary or tertiary tape node 760 (e.g., segments 670 or 680, respectively shown in FIGS. 6B and 6C) that is adhered to, for example, a wall, column or other infrastructure component of the physical premise's environment 700, and includes a low-power communications interface for communicating with nodes within range of the stationary gateway 714 and a higher-power communications interface for communicating with the network 702.

In one embodiment, each of the master tape nodes 742-748 is a master tape node and is configured by the network service 708 to communicate individually with the stationary gateway 714, which relays communications from the master tape nodes 742-748 to the network service 708 through the stationary gateway 714 and over the network 702. In another embodiment, one of the master tape nodes 742-748 at a time is configured to transmit, forward, relay, or otherwise communicate wireless messages to, between, or on behalf of the other master nodes on the pallet 758. In this embodiment, the master tape node may be determined by the master tape nodes 742-748 or designated by the network service 708. In some examples, the master tape nodes 742-748 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 759 is adhered to the pallet 758 and is configured to perform the role of a master node for the other master tape nodes 742-748. In these ways, the master tape nodes 742-748, 759 are configurable to create different wireless networks of nodes for transmitting, forwarding, relaying, bridging, or otherwise communicating wireless messages with the network service 408 through the stationary gateway 714 and over the network 702 in a power-efficient and cost-effective way.

In the illustrated example, the stationary gateway 714 also is configured by the network service 708 to communicate with a designated network of tape nodes, including the secondary or tertiary tape node 760 that is adhered to the inside of a door 762 of a shipping container 764, and is further configured to communicate with the network service 708 over the network 702. In the illustrated example, the shipping container 764 contains a number of parcels labeled or sealed by respective master tape nodes 766 and containing respective assets. The secondary or tertiary tape node 760 communicates with each of the master tape nodes 766 within the shipping container 764 and communicates with the stationary gateway 714. In some examples, each of the master tape nodes 766 includes a low-power wireless communications-interface (e.g., the low-power wireless-communication interface 652, with reference to FIG. 6A), and the secondary or tertiary tape node 760 includes a low-power wireless-communications interface (low-power wireless-communication interfaces 652', 652", with reference to FIGS. 6B-6C) for communicating with the master tape nodes 766 contained within the shipping container 764, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 714. In some examples, either a secondary or tertiary tape node, or both, may be used, depending on whether a high-power wireless-communication interface is necessary for sufficient communication.

In some examples, when the doors of the shipping container 764 are closed, the secondary or tertiary tape node 760 is operable to communicate wirelessly with the master tape nodes 766 contained within the shipping container 764. In some embodiments, both a secondary and a tertiary node are attached to the shipping container 764. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 760 is configured to collect sensor data from master tape nodes 766 and, in some embodiments, process the collected data to generate, for example, statistics from the collected data. When the doors of the shipping container 764 are open, the secondary or tertiary tape node 760 is programmed to detect the door opening (e.g., using a photodetector or an accelerometer component of the secondary or tertiary tape node 760) and, in addition to reporting the door opening event to the network service 708, the secondary or tertiary tape node 760 is further programmed to transmit the collected data and/or the processed data in one or more wireless messages to the stationary gateway 714. The stationary gateway 714, in turn, is operable to transmit the wireless messages received from the secondary or tertiary tape node 760 to the network service 708 over the network 702. Alternatively, in some examples, the stationary gateway 714 also is operable to perform operations on the data received from the secondary or tertiary tape node 760 with the same type of data produced by the secondary or tertiary tape node 760 based on sensor data collected from the master tape nodes 742-748. In this way, the secondary or tertiary tape node 760 and master tape node 766 create a wireless network of nodes for transmitting, forwarding, relaying, or otherwise communicating wireless messages to, between, or on behalf of the master tape node 766, the secondary or tertiary tape nodes 760, and the network service 708 in a power-efficient and cost-effective way.

In an example of the embodiment shown in FIG. 7, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-6C). The short-range master tape nodes typically are adhered directly to parcels containing assets. In the illustrated example, the master tape nodes 718, 728, 732, 742-748, 766 are short-range tape nodes. The short-range tape nodes typically communicate with a low-power wireless-communication protocol (e.g., Bluetooth LE, Zigbee, or Z-wave). The segment 670 are typically adhered to objects (e.g., a parcel 726 and a shipping container 764) that are associated with multiple parcels that are separated from the medium-range tape nodes by a barrier or a long distance. In the illustrated example, the secondary and/or tertiary tape nodes 724 and 760 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 700.

In the illustrated example, the mobile gateway 712 and the stationary gateway 714 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 712 (e.g., a truck). In these examples, the wireless communications unit 716 may be moved to different locations in the network communications environment 700 to assist in connecting other tape nodes to the wireless communications unit 716. In some examples, the stationary gateway 714 is a tape node that may be attached to a stationary structure (e.g., a wall) in the network communications environment 700 with a known geographic location (e.g., GPS coordinates).

In these examples, other tape nodes in the environment may determine their geographic location by querying the stationary gateway 714.

In some examples, in order to conserve power, the tape nodes typically communicate according to a schedule promulgated by the network service 708. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 704, either directly or indirectly through a gateway tape node (e.g., the long-range tape node, such as wireless communication unit 716, adhered to the mobile gateway 712, or a long-range tape node, such as stationary gateway 714, that is adhered to an infrastructure component of the network communications environment 700). In other examples, the master tape node processes the information contained in the received data packets and transmits the processed information to the server 704.

Figure 8:
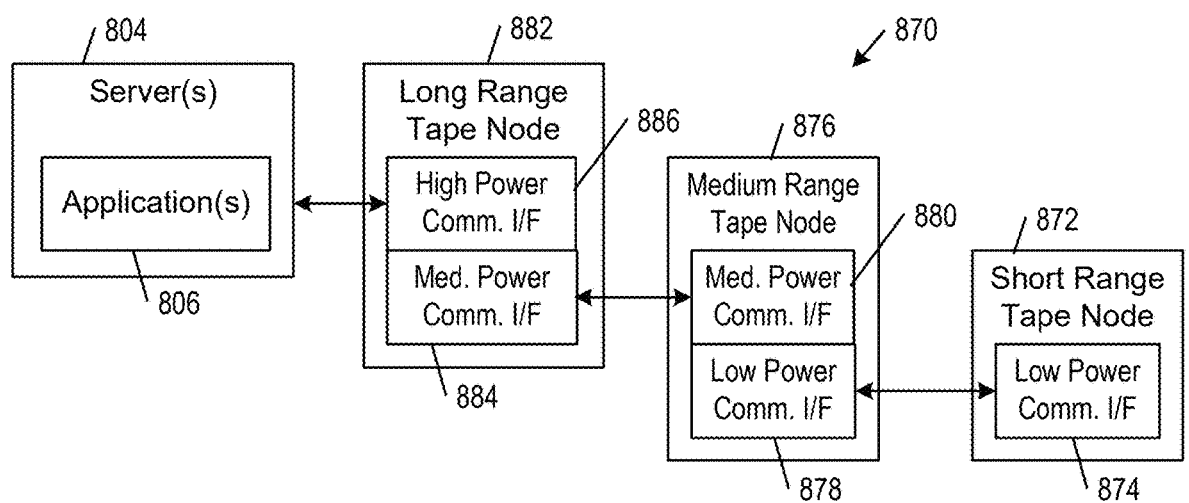
FIG. 8 shows one example hierarchical wireless communications network of tape nodes, in embodiments.

FIG. 8 shows an example hierarchical wireless communications network 870 of tape nodes. In this example, the short-range tape node 872 and the medium range tape node 876 communicate with one another over their respective low power wireless communication interfaces 874, 878. The medium range tape node 876 and the long-range tape node 882 communicate with one another over their respective medium power wireless communication interfaces 880, 884. The long-range tape node 882 and the one or more network service servers 804 (e.g., server(s) 704, FIG. 7) running applications 806 (e.g., application(s) 706, FIG. 7) communicate with one another over the high-power communication interface 884. In some examples, the low power communication interfaces 874, 878 establish wireless communications with one another in accordance with the Bluetooth LE protocol, the medium power communication interfaces 880, 884 establish wireless communications with one another in accordance with the LoRa communications protocol, and the high-power communication interface 886 establishes wireless communications with the one or more network service servers 804 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 804 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the one or more network service servers 804. The schedule usually dictates all aspects of the communication, including the times when particular tape nodes should communicate, the mode of communication, and the contents of the communication. In one example, the one or more network service servers 804 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 804, either directly or indirectly through a gateway tape node (e.g., the long-range wireless communication unit 716 adhered to the mobile gateway 712 (which could be a vehicle, ship, plane, etc.) or the stationary gateway 714 is a long-range tape node adhered to an infrastructure component of the environment 700). In other examples, the master tape node processes the information contained in the received data packets and transmits the processed information to the one or more network service servers 804/704.

Figure 9:
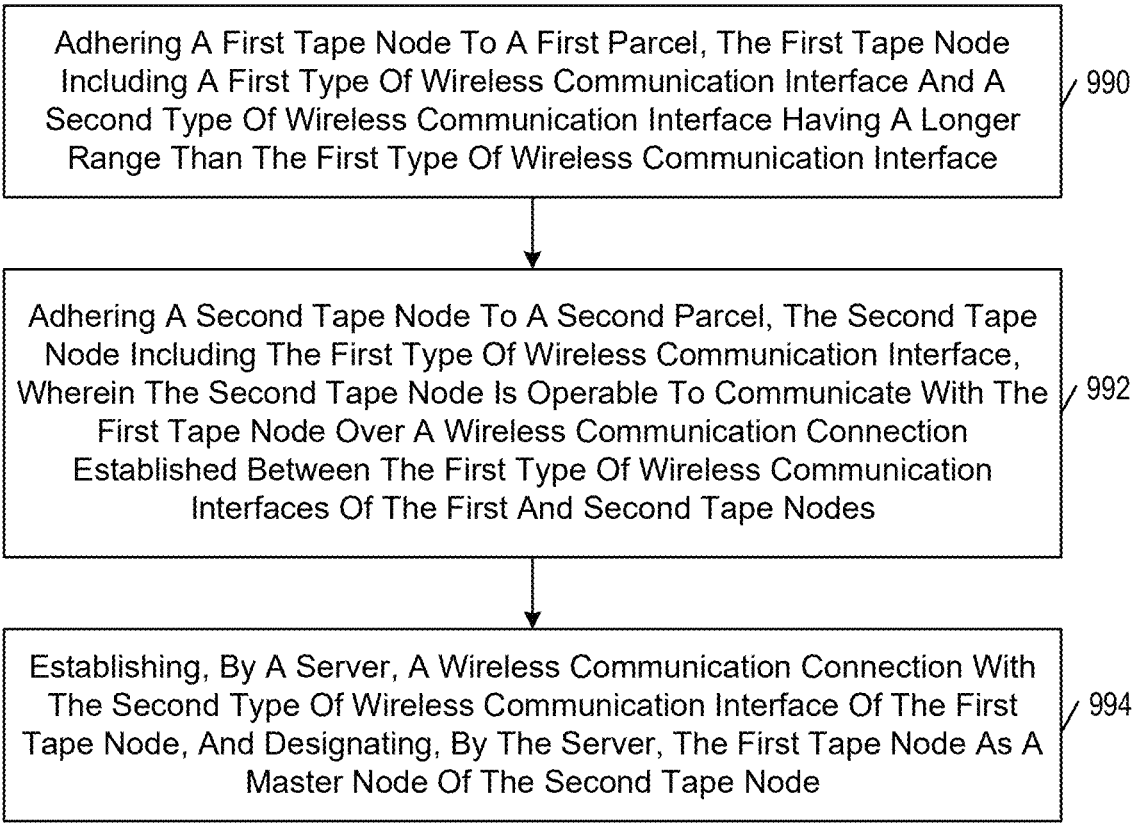
FIG. 9 shows one example method of creating a hierarchical communications network, in embodiments.

FIG. 9 shows an example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 9, block 990). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 9, block 992). An application executing on a computer system (e.g., the one or more network service servers 804 of a network service 808) establishes a wireless communication connection with the second type of wireless communication interface of the first tape node, and the application transmits programmatic code executable by the first tape node to function as a master tape node with respect to the second tape node (FIG. 9, block 994).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 10A:
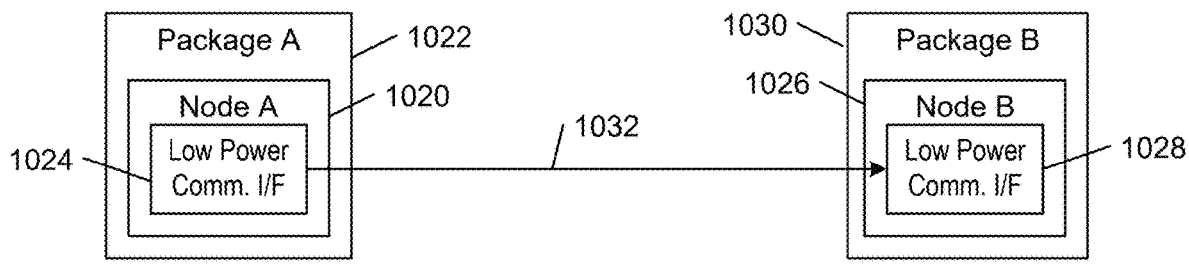
FIGS. 10A and 10B show example communication between tape nodes attached to packages, in embodiments.

Referring to FIG. 10A, a node 1020 (Node A) is associated with a package 1022 (Package A). In some embodiments, the node 1020 may be implemented as a tape node that is used to seal the package 1022 or it may be implemented as a label node that is used to label the package 1022; alternatively, the node 1020 may be implemented as a non-tape node that is inserted within the package 1022 or embedded in or otherwise attached to the interior or exterior of the package 1022. In the illustrated embodiment, the node 1020 includes a low power communications interface 1024 (e.g., a Bluetooth Low Energy communications interface). Another node 1026 (Node B), which is associated with another package 1030 (Package B), is similarly equipped with a compatible low power communications interface 1028 (e.g., a Bluetooth Low Energy communications interface).

In an example scenario, in accordance with the programmatic code stored in its memory, node 1026 (Node B) requires a connection to node 1020 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1020 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1032 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
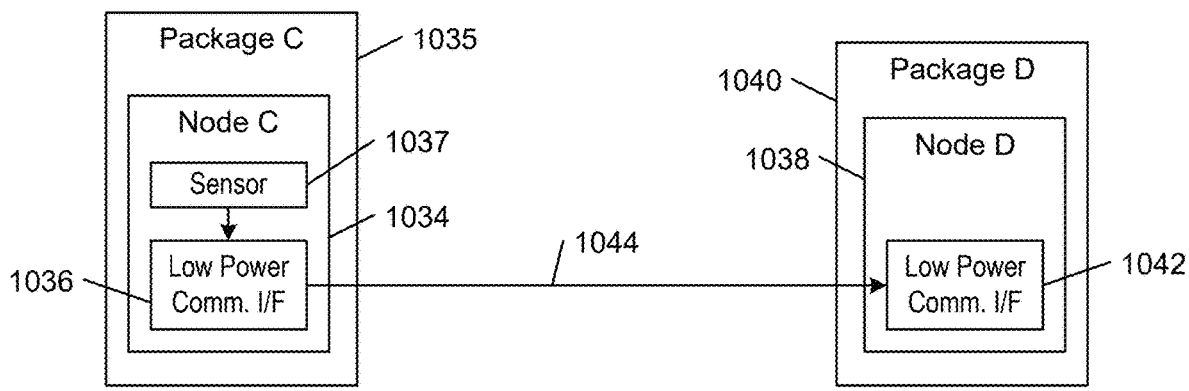

Referring to FIG. 10B, a node 1034 (Node C) is associated with a package 1035 (Package C). In the illustrated embodiment, the Node C includes a low power communications interface 1036 (e.g., a Bluetooth Low Energy communications interface), and a sensor 1037 (e.g., a temperature sensor). Another node 1038 (Node D), which is associated with another package 1040 (Package D), is similarly equipped with a compatible low power communications interface 1042 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 1044 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
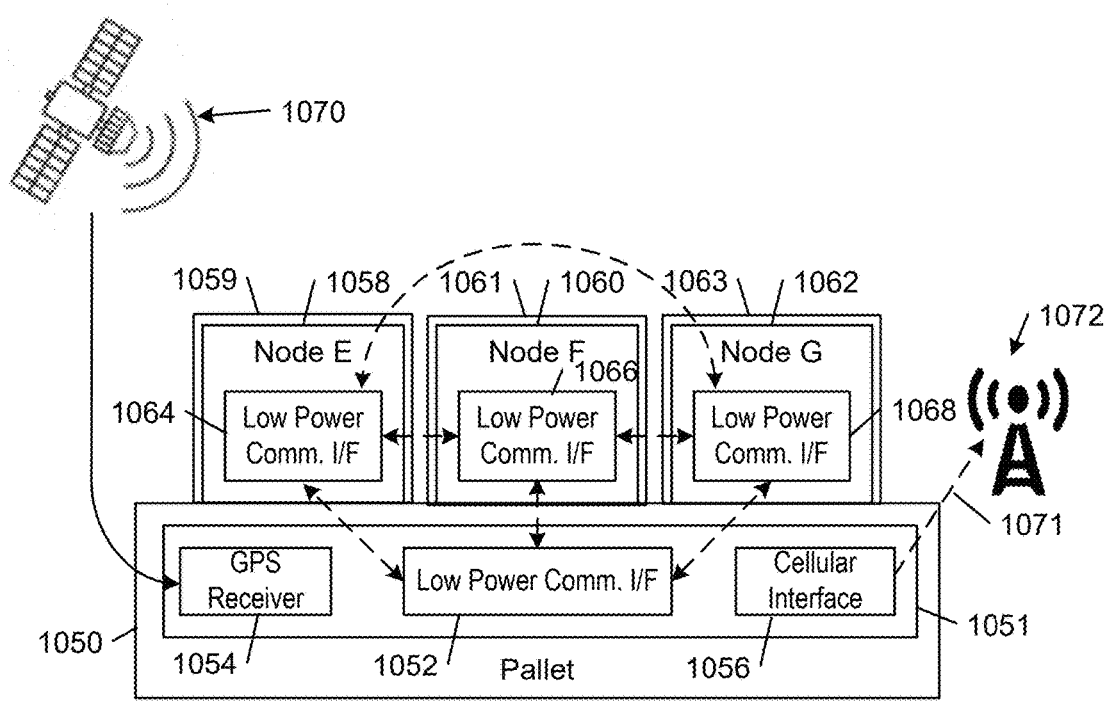
FIG. 10C shows example communication between a tape node attached to a pallet and tape nodes attached to packages on the pallet, in embodiments.

Referring to FIG. 10C, a pallet 1050 is associated with a master node 1051 that includes a low-power communications interface 1052, a GPS receiver 1054, and a cellular communications interface 1056. In some embodiments, the master node 1051 may be implemented as a tape node or a label node that is adhered to the pallet 1050. In other embodiments, the master node 1051 may be implemented as a non-tape node that is inserted within the body of the pallet 1050 or embedded in or otherwise attached to the interior or exterior of the pallet 1050.

The pallet 1050 provides a structure for grouping and containing packages 1059, 1061, 1063 each of which is associated with a respective peripheral node 1058, 1060, 1062 (Node E, Node F, and Node G). Each of the peripheral nodes 1058, 1060, 1062 includes a respective low power communications interface 1064, 1066, 1068 (e.g., Bluetooth Low Energy communications interface). In the illustrated embodiment, each of the nodes E, F, G, and the master node 1051 are connected to each of the other nodes over a respective low power communications path (shown by dashed lines).

In some embodiments, the packages 1059, 1061, 1063 are grouped together because they are related. For example, the packages 1059, 1061, 1063 may share the same shipping itinerary or a portion thereof. In an example scenario, the master pallet node 1051 scans for advertising packets that are broadcasted from the peripheral nodes 1058, 1060, 1062. In some examples, the peripheral nodes broadcast advertising packets during respective scheduled broadcast intervals. The master node 1051 can determine the presence of the packages 1059, 1061, 1063 in the vicinity of the pallet 1050 based on receipt of one or more advertising packets from each of the nodes E, F, and G. In some embodiments, in response to receipt of advertising packets broadcasted by the peripheral nodes 1058, 1060, 1062, the master node 1051 transmits respective requests to the server to associate the master node 1051 and the respective peripheral nodes 1058, 1060, 1062. In some examples, the master tape node requests authorization from the server to associate the master tape node and the peripheral tape nodes. If the corresponding packages 1059, 1061, 1063 are intended to be grouped together (e.g., they share the same itinerary or certain segments of the same itinerary), the server authorizes the master node 1051 to associate the peripheral nodes 1058, 1060, 1062 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1051 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1058, 1060, 1062 include environmental sensors for obtaining information regarding environmental conditions in the vicinity of the associated packages 1059, 1061, 1063. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1051 can determine its own location based on geolocation data transmitted by a satellite-based radio navigation system 1070 (e.g., GPS, GLONASS, and NAVSTAR) and received by the GPS receiver 1054 component of the master node 1051. In an alternative embodiment, the location of the master pallet node 1051 can be determined using cellular based navigation techniques that use mobile communication technologies (e.g., GSM, GPRS, CDMA, etc.) to implement one or more cell-based localization techniques. After the master node 1051 has ascertained its location, the distance of each of the packages 1059, 1061, 1063 from the master node 1051 can be estimated based on the average signal strength of the advertising packets that the master node 1051 receives from the respective peripheral node. The master node 1051 can then transmit its own location and the locations of the package nodes E, F, and G to a server over a cellular interface connection with a cellular network 1072. Other methods of determining the distance of each of the packages 1059, 1061, 1063 from the master node 1051, such as Received Signal-Strength Index (RSSI) based indoor localization techniques, also may be used.

In some embodiments, after determining its own location and the locations of the peripheral nodes, the master node 1051 reports the location data and the collected and optionally processed (e.g., either by the peripheral nodes peripheral nodes 1058, 1060, 1062 or the master node 1051) sensor data to a server over a cellular communication path 1071 on a cellular network 1072.

In some examples, nodes are able to autonomously detect logistics execution errors if packages that are supposed to travel together no longer travel together and raise an alert. For example, a node (e.g., the master node 1051 or one of the peripheral nodes 1058, 1060, 1062) alerts the server when the node determines that a particular package 1059 is being or has already been improperly separated from the group of packages. The node may determine that there has been an improper separation of the particular package 1059 in a variety of ways. For example, the associated peripheral node 1058 that is bound to the particular package 1059 may include an accelerometer that generates a signal in response to movement of the package from the pallet. In accordance with its intelligent agent program code, the associated peripheral node 1058 determines that the master node 1051 has not disassociated the particular package 1059 from the group and therefore broadcasts advertising packets to the master node, which causes the master node 1051 to monitor the average signal strength of the advertising packets and, if the master node 1051 determines that the signal strength is decreasing over time, the master node 1051 will issue an alert either locally (e.g., through a speaker component of the master node 1051) or to the server.

Figure 11:
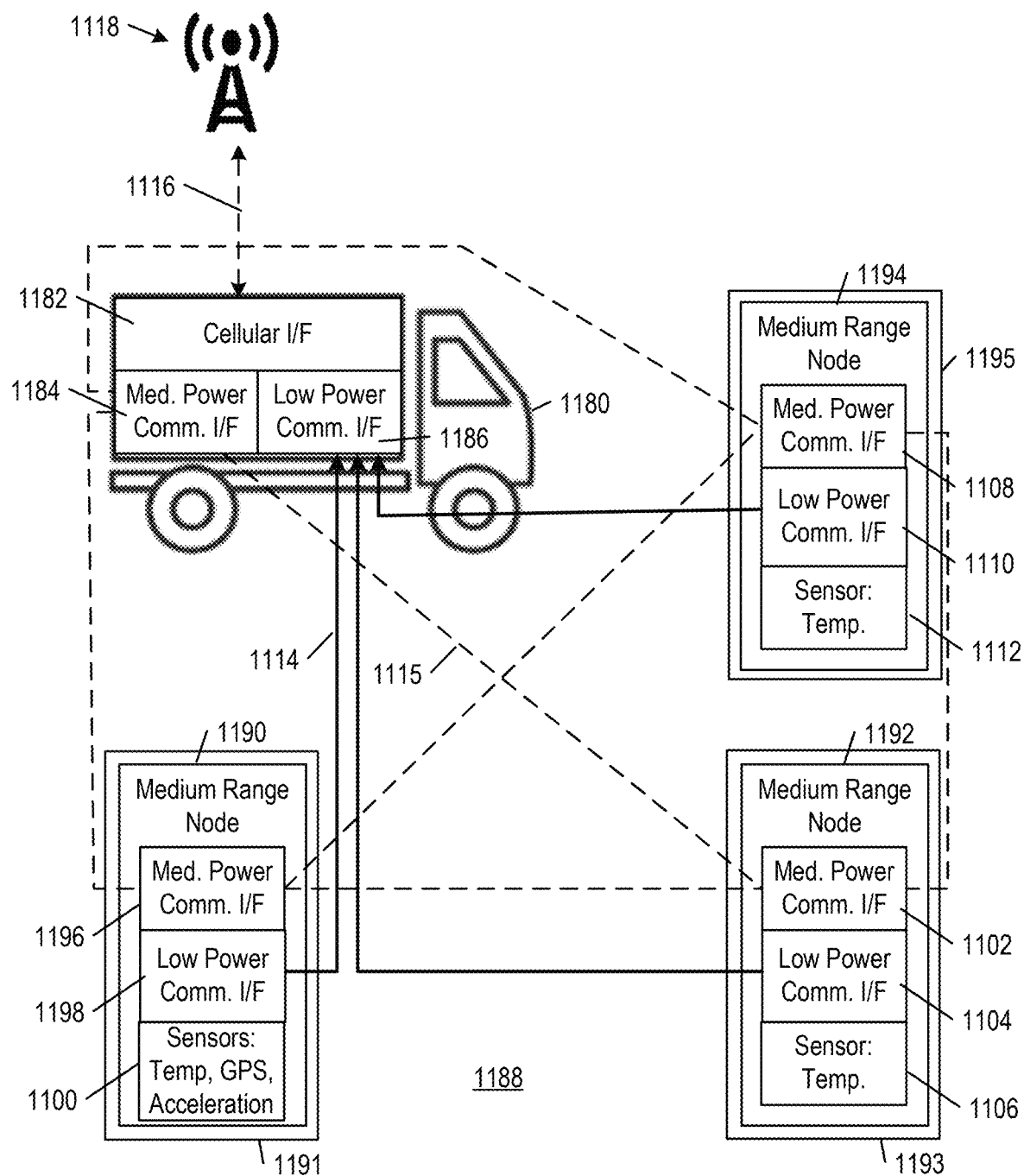
FIG. 11 shows a truck configured as a mobile node, or mobile hub, with a cellular communications interface, a medium-power communications interface, and a low power communications interface, in embodiments.

Referring to FIG. 11, a truck 1180 is configured as a mobile node or mobile hub that includes a cellular communications interface 1182, a medium-power communications interface 1184, and a low power communications interface 1186. The communications interfaces 1180-1186 may be implemented on one or more tape and non-tape nodes. In an illustrative scenario, the truck 1180 visits a logistic storage facility, such as a warehouse 1188, to wirelessly obtain temperature data generated by temperature sensors in the medium range nodes 1190, 1192, 1194. The warehouse 1188 contains nodes 1190, 1192, and 1194 that are associated with respective logistic containers 1191, 1193, 1195. In the illustrated embodiment, each node 1190-1194 is a medium range node that includes a respective medium power communications interface 1196, 1102, 1108, a respective low power communications interface 1198, 1104, 1110 and one or more respective sensors 1100, 1106, 1112. In the illustrated embodiment, each of the package nodes 1190, 1192, 1194 and the truck 1180 is connected to each of the other ones of the package nodes through a respective medium power communications path (shown by dashed lines). In some embodiments, the medium power communications paths are LoRa formatted communication paths.

In some embodiments, the communications interfaces 1184 and 1186 (e.g., a LoRa communications interface and a Bluetooth Low Energy communications interface) on the node on the truck 1180 is programmed to broadcast advertisement packets to establish connections with other network nodes within range of the truck node. A warehouse 1188 includes medium range nodes 1190, 1192, 1194 that are associated with respective logistic containers 1191, 1193, 1195 (e.g., packages, boxes, pallets, and the like). When the truck node's low power interface 1186 is within range of any of the medium range nodes 1190, 1192, 1194 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1190, 1192, 1194, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1114 or a LoRa formatted communication path 1115), the truck node determines the identity information for the medium range node 1190 (e.g., a peripheral node), the medium range node's capabilities include retrieving temperature data, and the medium range node's services include transmitting temperature data to other nodes. Depending of the size of the warehouse 1188, the truck 1180 initially may communicate with the nodes 1190, 1192, 1194 using a low power communications interface (e.g., Bluetooth Low Energy interface). If any of the anticipated nodes fails to respond to repeated broadcasts of advertising packets by the truck 1180, the truck 1180 will try to communicate with the non-responsive nodes using a medium power communications interface (e.g., LoRa interface). In response to a request from the medium-power communication interface 1184, the medium range node 1190 transmits an indication of its measured temperature data to the truck node. The truck node repeats the process for each of the other medium range nodes 1192, 1194 that generate temperature measurement data in the warehouse 1188. The truck node reports the collected (and optionally processed, either by the medium range nodes 1190, 1192, 1194 or the truck node) temperature data to a server over a cellular communication path 1116 with a cellular network 1118.

Figure 12:
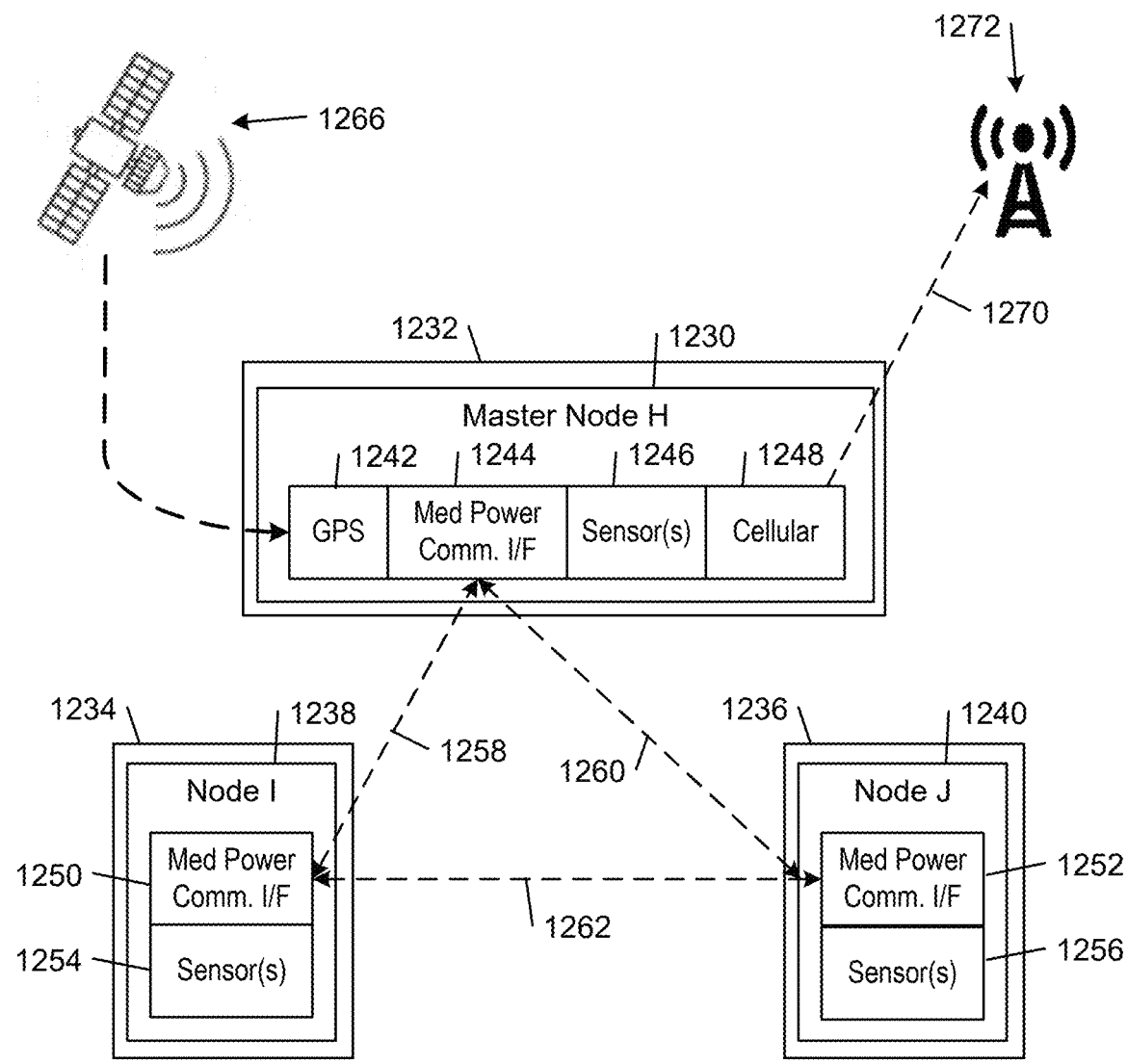
FIG. 12 shows a master node associated with a logistic item that is grouped together with other logistic items associated with peripheral nodes, in embodiments.

Referring to FIG. 12, a master node 1230 is associated with a logistic item 1232 (e.g., a package) and grouped together with other logistic items 1234, 1236 (e.g., packages) that are associated with respective peripheral nodes 1238, 1240. The master node 1230 includes a GPS receiver 1242, a medium power communications interface 1244, one or more sensors 1246, and a cellular communications interface 1248. Each of the peripheral nodes 1238, 1240 includes a respective medium power communications interface 1250, 1252 and one or more respective sensors 1254, 1256. In the illustrated embodiment, the peripheral and master nodes are connected to one another other over respective pairwise communications paths (shown by dashed lines). In some embodiments, the nodes 1230, 1238, 1240 communicate through respective LoRa communications interfaces over LoRa formatted communications paths 1258, 1260, 1262.

In the illustrated embodiment, the master and peripheral nodes 1230, 1238, 1240 include environmental sensors for obtaining information regarding environmental conditions in the vicinity of the associated logistic items 1232, 1234, 1236. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1230 periodically broadcasts advertising packets in the surrounding area. When the peripheral nodes 1238, 1240 are within range of master node 1230, and are operating in a listening mode, the peripheral nodes 1238, 1240 will extract the address of master node 1230 and potentially other information (e.g., security information) from the advertising packets. If, according to their respective programmatic code, the peripheral nodes 1238, 1240 determine that they are authorized to connect to the master node 1230, the peripheral nodes 1238, 1240 will attempt to pair with the master node 1230. In this process, the peripheral nodes 1238, 1240 and the master node 1230 determine each other's identities, capabilities, and services. For example, after successfully establishing a respective communication path 1258, 1260 with each of the peripheral nodes 1238, 1240 (e.g., a LoRa formatted communication path), the master node 1230 determines certain information about the peripheral nodes 1238, 1240, such as their identity information (e.g., peripheral nodes), their capabilities (e.g., measuring temperature data), and their services include transmitting temperature data to other nodes.

After establishing LoRa formatted communications paths 1258, 1260 with the peripheral nodes 1238, 1240, the master node 1230 transmits requests for the peripheral nodes 1238, 1240 to transmit their measured and/or locally processed temperature data to the master node 1230.

In the illustrated embodiment, the master node 1230 can determine its own location based on geolocation data transmitted by a satellite-based radio navigation system 1266 (e.g., GPS, GLONASS, and NAVSTAR) and received by the GPS receiver 1242 component of the master node 1230. In an alternative embodiment, the location of the master node 1230 can be determined using cellular based navigation techniques that use mobile communication technologies (e.g., GSM, GPRS, CDMA, etc.) to implement one or more cell-based localization techniques. After the master node 1230 has ascertained its location, the distance of each of the logistic items 1234, 1236 from the master node 1230 can be estimated based on the average signal strength of the advertising packets that the master node 1230 receives from the respective peripheral node. The master node 1230 can then transmit its own location and the locations of the package nodes H, J, and I to a server over a cellular interface connection with a cellular network 1272. Other methods of determining the distance of each of the logistic items 1234, 1236 from the master node 1230, such as Received Signal-Strength Index (RSSI) based indoor localization techniques, also may be used.

In some embodiments, after determining its own location and the locations of the peripheral nodes, the master node 1230 reports the location data, the collected and optionally processed (e.g., either by the peripheral nodes peripheral nodes 1238, 1240 or the master node 1230) sensor data to a server over a cellular communication path 1270 on a cellular network 1272.

Figure 13A:
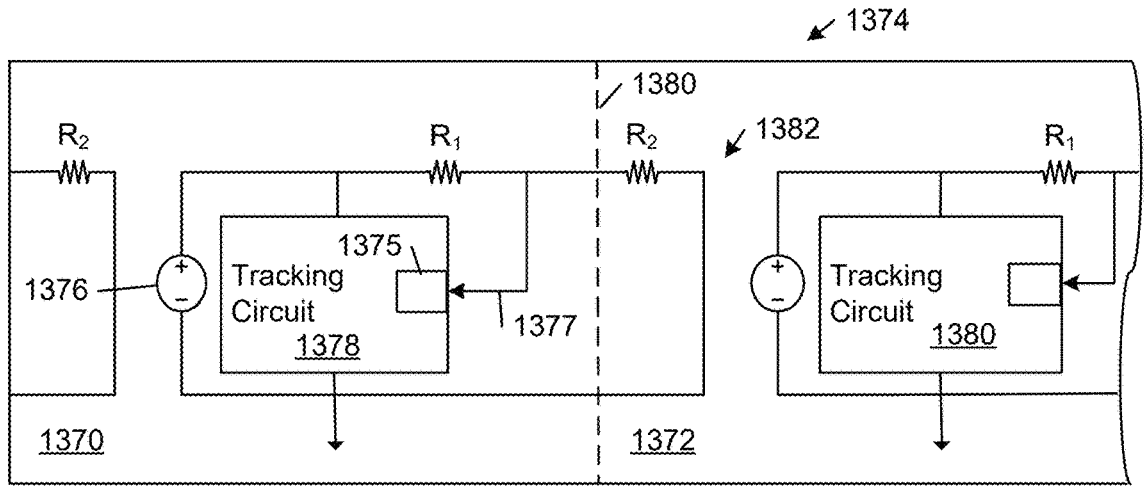
FIGS. 13A and 13B each show one example wake circuit that delivers power to a tracking circuit in response to an event, in embodiments.

Referring to FIG. 13A, in some examples, each of one or more of the segments 1370, 1372 of a tracking adhesive product 1374 includes a respective circuit 1375 that delivers power from the respective energy source 1376 to the respective tracking circuit 1378 (e.g., a processor and one or more wireless communications circuits) in response to an event. In some of these examples, the wake circuit 1375 is configured to transition from an off-state to an on-state when the voltage on the wake node 1377 exceeds a threshold level, at which point the wake circuit transitions to an on-state to power-on the segment 1370. In the illustrated example, this occurs when the user separates the segment from the tracking adhesive product 1374, for example, by cutting across the tracking adhesive product 1374 at a designated location (e.g., along a designated cut-line 1380). In particular, in its initial, un-cut state, a minimal amount of current flows through the resistors R1 and R2. As a result, the voltage on the wake node 1377 remains below the threshold turn-on level. After the user cuts across the tracking adhesive product 1374 along the designated cut-line 1380, the user creates an open circuit in the loop 1382, which pulls the voltage of the wake node above the threshold level and turns on the wake circuit 1375. As a result, the voltage across the energy source 1376 will appear across the tracking circuit 1378 and, thereby, turn on the segment 1370. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 1378 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

Figure 13B:
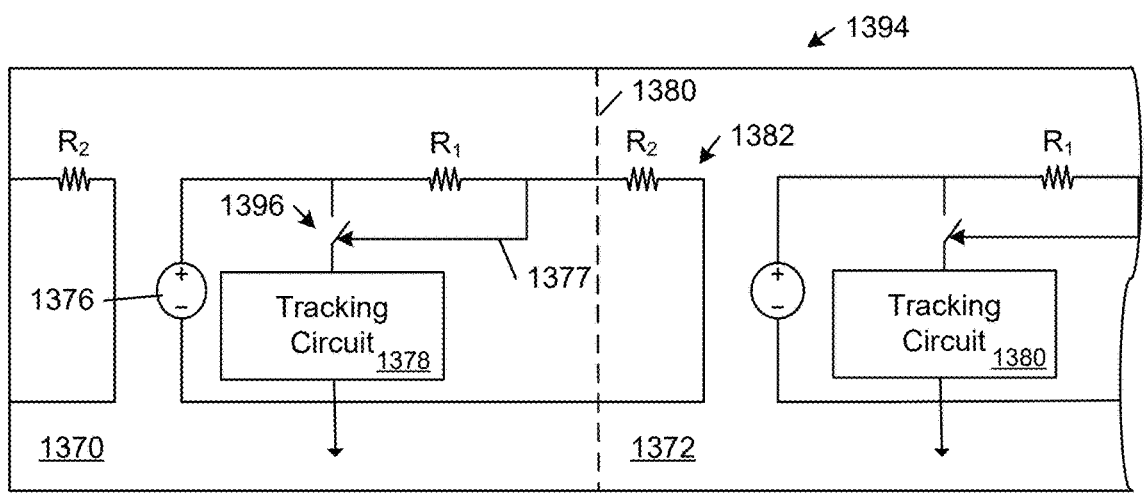

FIG. 13B shows another example of a tracking adhesive product 1394 that delivers power from the respective energy source 1376 to the respective tracking circuit 1378 (e.g., a processor and one or more wireless communications circuits) in response to an event. This example is similar in structure and operation as the tracking adhesive product 1394 shown in FIG. 13A, except that the wake circuit 1375 is replaced by a switch 1396 that is configured to transition from an open state to a closed state when the voltage on the switch node 1377 exceeds a threshold level. In the initial state of the tracking adhesive product 1394, the voltage on the switch node is below the threshold level as a result of the low current level flowing through the resistors R1 and R2. After the user cuts across the tracking adhesive product 1394 along the designated cut-line 1380, the user creates an open circuit in the loop 1382, which pulls up the voltage on the switch node above the threshold level to close the switch 1396 and turn on the tracking circuit 1378.

A wireless sensing system includes a plurality of wireless nodes configured to detect tampering in assets. Tampering may include, but is not limited to, opening assets such as boxes, containers, storage, or doors, moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the wireless sensing system. The wireless sensing system is configured to provide a notification or alert to a user of the wireless sensing system. In some embodiments, a wireless node may directly transmit the notification or alert to the user. In other embodiments, a wireless node may include a display that indicates whether or not a tampering event has occurred (e.g., the display may be an indicator light or LED).

Alerts may be transmitted to server/cloud, other wireless nodes, a client device, or some combination thereof. For example, in an embodiment, a wireless node of the wireless sensing system captures sensor data, detects a tampering event, and transmits an alarm to a user of the wireless sensing system (e.g., without communicating with a server or cloud of the wireless sensing system). In another embodiment, a wireless node of the wireless sensing system captures sensor data and transmits the sensor data to a gateway, parent node (e.g., black tape), or client device. The gateway, parent node, or client device detects a tampering event based on the received sensor data and transmits an alarm to a user of the wireless sensing system. In another embodiment, the wireless node of the wireless sensing system captures sensor data, detects a tampering event, and transmits information describing the tampering event to a server or cloud of the wireless sensing system. The server or cloud of the wireless sensing system transmits an alarm to a user of the wireless sensing system.

Figure 13C:
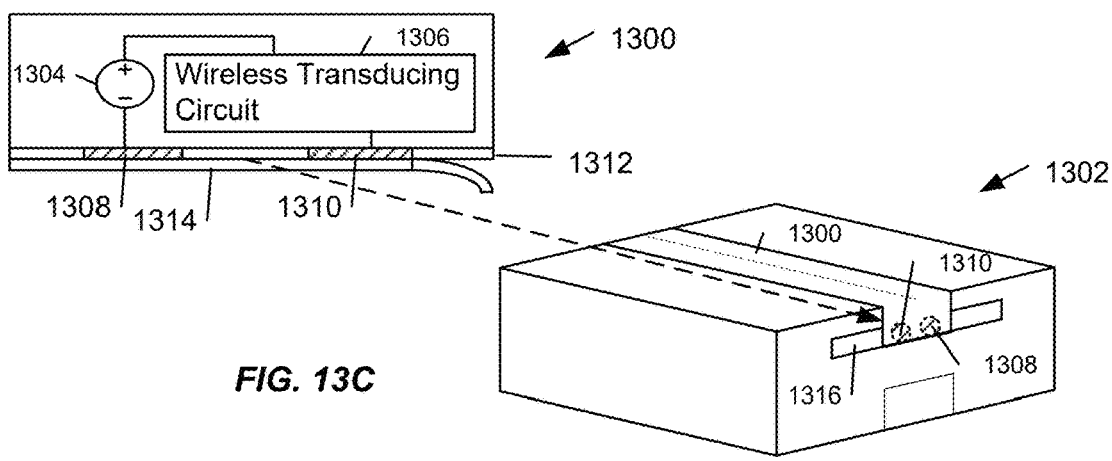
FIG. 13C shows a diagrammatic cross-sectional front view of an example adhesive tape platform and a perspective view of an example asset, in embodiments.

FIG. 13C shows a diagrammatic cross-sectional front view of an example adhesive tape platform 1300 and a perspective view of an example asset 1302. Instead of activating the adhesive tape platform in response to separating a segment of the adhesive tape platform from a roll or a sheet of the adhesive tape platform, this example is configured to supply power from the energy source 1304 to turn on the wireless transducing circuit 1306 in response to establishing an electrical connection between two power terminals 1308, 1310 that are integrated into the adhesive tape platform. In particular, each segment of the adhesive tape platform 1300 includes a respective set of embedded tracking components, an adhesive layer 1312, and an optional backing sheet 1314 with a release coating that prevents the segments from adhering strongly to the backing sheet 1314. In some examples, the power terminals 1308, 1310 are composed of an electrically conductive material (e.g., a metal, such as copper) that may be printed or otherwise patterned and/or deposited on the backside of the adhesive tape platform 1300. In operation, the adhesive tape platform can be activated by removing the backing sheet 1314 and applying the exposed adhesive layer 1312 to a surface that includes an electrically conductive region 1316. In the illustrated embodiment, the electrically conductive region 1316 is disposed on a portion of the asset 1302. When the adhesive backside of the adhesive tape platform 1300 is adhered to the asset with the exposed terminals 1308, 1310 aligned and in contact with the electrically conductive region 1316 on the asset 1302, an electrical connection is created through the electrically conductive region 1316 between the exposed terminals 1308, 1310 that completes the circuit and turns on the wireless transducing circuit 1306. In particular embodiments, the power terminals 1308, 1310 are electrically connected to any respective nodes of the wireless transducing circuit 1306 that would result in the activation of the tracking circuit 1306 in response to the creation of an electrical connection between the power terminals 1308, 1310.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

Equipment Setting Monitoring

A wireless tracking device (e.g., adhesive tape node or rigid tracking device) may be attached to a control (e.g., a valve, a lever, a handle, etc.) of equipment. Advantageously, the wireless tracking device collects data from at least one sensor incorporated therein and determines a position and/or setting of the control. The at least one sensor may include one or more of: a magnetometer, an accelerometer, a gyroscope, a geolocation sensor (e.g., GPS), an optical sensor, an image sensor, a time-of-flight sensor (e.g., a transceiver to detect time of flight data, signal strength, as used for trilateration, triangulation, etc.), an acoustic sensor, an infrared sensor, and so on. The wireless tracking device may determine its positioned when static and/or when moving. For example, a single wireless tracking device may include at least one sensor that collects data for determining a position and/or change in position, of the control.

Figure 14A:
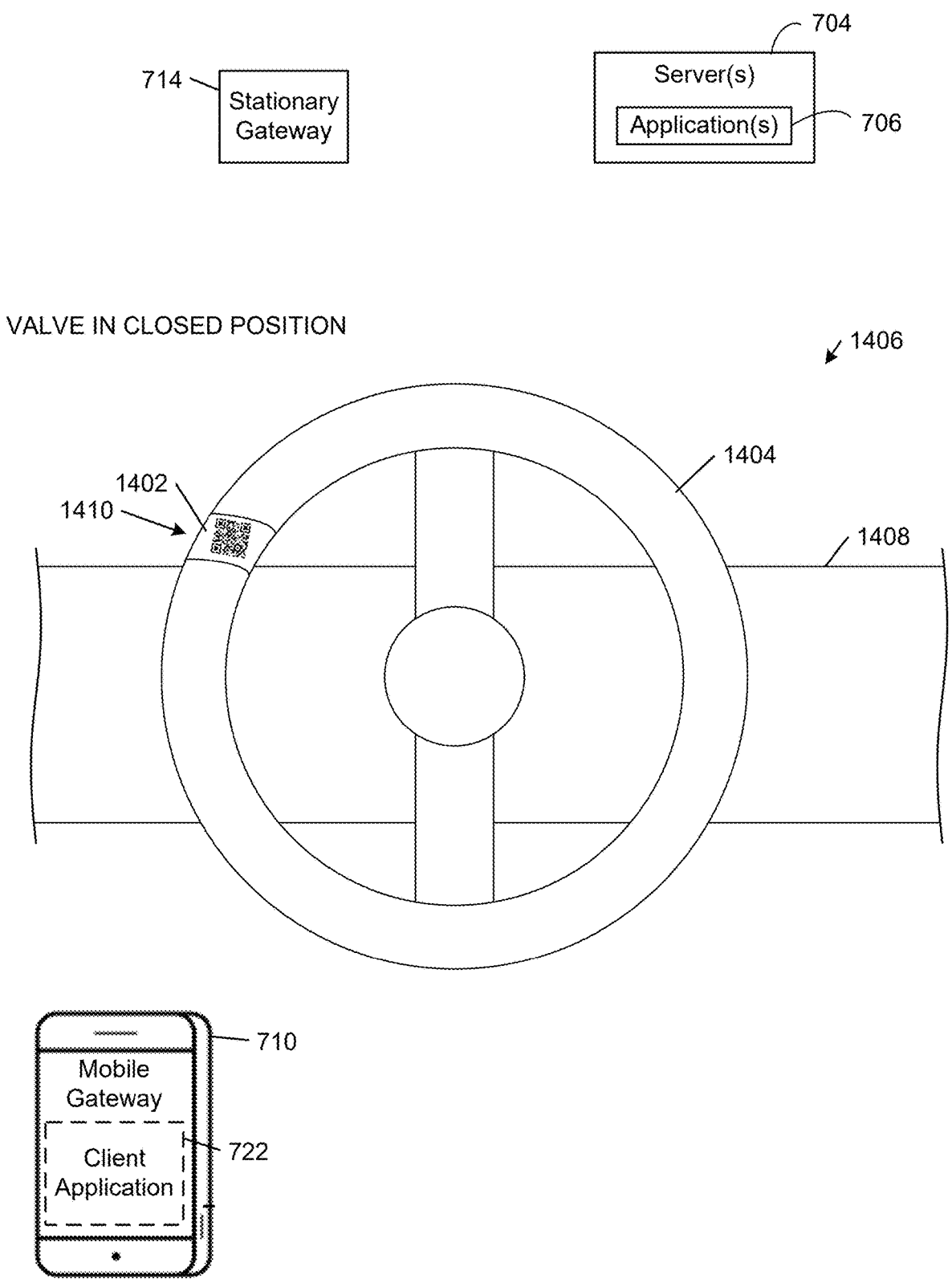
FIGS. 14A and 14B shows a wireless tracking device attached to a valve handle of a control valve that controls flow of fluid through a pipe, in embodiments.
Figure 14B:
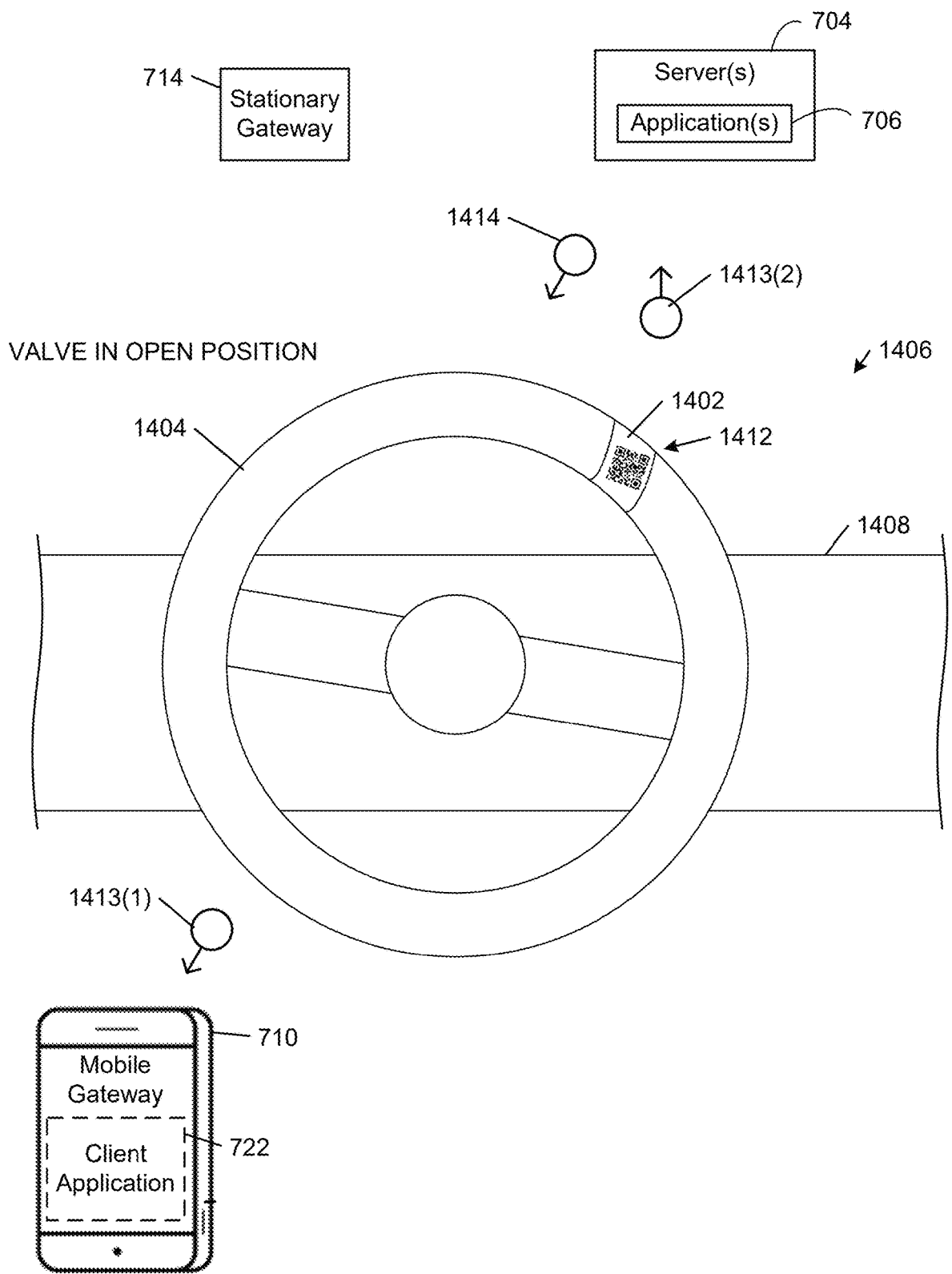
Figure 14C:
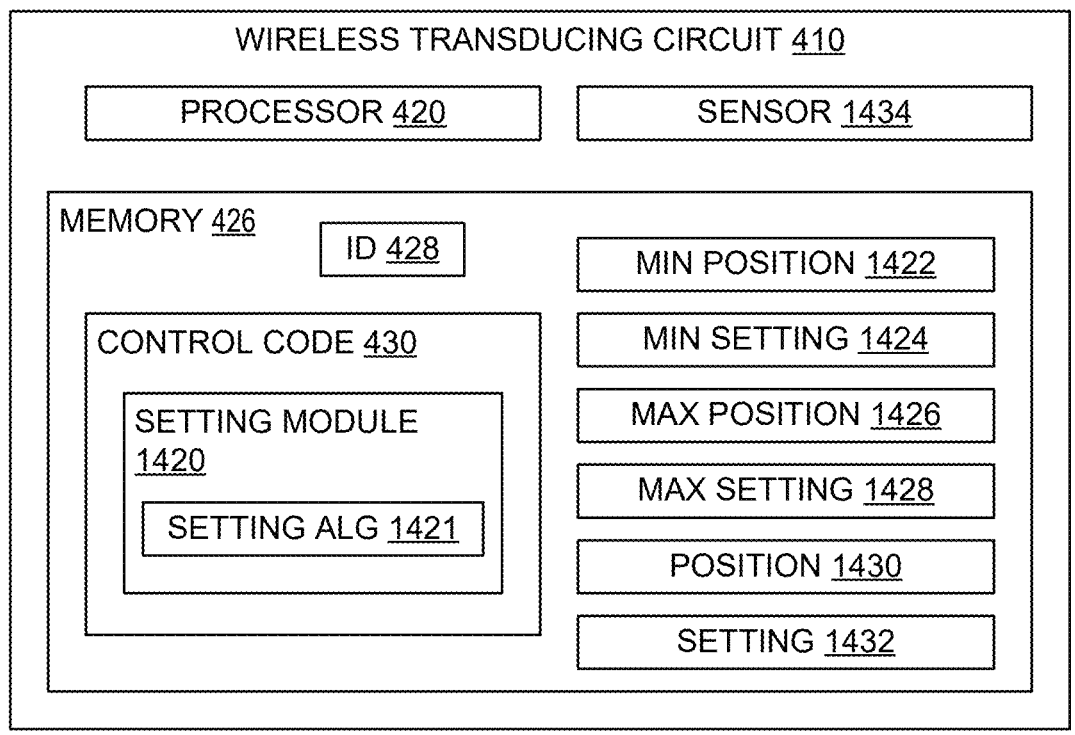
FIG. 14C shows wireless transducing circuit of the wireless tracking device of FIGS. 14A and 14B, in embodiments.

FIGS. 14A and 14B shows a wireless tracking device 1402 attached to a valve handle 1404 of a control valve 1406 that controls flow of fluid through a pipe 1408. Wireless tracking device 1402 may represent any of segment 113 of FIG. 1, and segments 640, 670 and 680 of FIGS. 6A-6C. FIG. 14C shows wireless transducing circuit 410 of wireless tracking device 1402 where control code 430 includes a setting module 1420, implemented as machine-readable instructions that are executable by processor 420 to cause wireless tracking device 1402 to implement the following functions.

In FIG. 14A, valve 1406 is closed and in FIG. 14B valve 1406 is open. FIGS. 14A and 14B are best viewed together with the following description. In certain embodiments, wireless tracking device 1402 has an adhesive layer that adheres to valve handle 1404. In other embodiments, wireless tracking device 1402 has an adhesive layer that adheres to itself to attach to valve handle 1404 such that it does not move relative to valve handle 1404. Other methods of attaching wireless tracking device 1402 to valve handle 1404 such that is does not move relative to valve handle 1404 may be used without departing from the scope hereof.

When possible, setting module 1420 may implement a calibration/learning period after deployment of wireless tracking device 1402 to learn a range of movement of valve handle 1404. For the calibration/learning period, an operator moves valve handle 1404 between a minimum position (e.g., valve 1406 is closed) and a maximum position (e.g., valve 1406 is fully open). Wireless tracking device 1402 detects and stores in memory 426 a minimum position 1422 and a maximum position 1426. Minimum position 1422 and maximum position 1426 may define an angle of wireless tracking device 1402 and or a distance of wireless tracking device 1402 from a reference point (e.g., stationary gateway 714). Wireless tracking device 1402 may receive (e.g., from mobile gateway 710 or from server 704) a corresponding minimum setting value 1424 and a maximum setting value 1428. For example, minimum setting value 1424 may be zero, and maximum setting value may be ten. In another example, minimum setting value 1424 is zero and maximum setting value 1428 is 24, corresponding to a maximum of 24 gallons per minute flow rate through valve 1406.

At intervals, as valve 1406 is opened by manually turning handle 1404 or through autonomous control, setting module 1420 uses sensor 1434 to sense movement of valve handle 1404 from a first position and orientation 1410 to a second position and orientation 1412. In certain embodiments, sensor 1434 is a highly integrated 9-axis absolute orientation MEMS sensor by Bosch® that is a combination of a 3-axis acceleration sensor, a 3-axis gyroscope and a 3-axis geomagnetic sensor. At second position and orientation 1412, at least, setting module 1420 determines a current position 1430 (e.g., an angle of wireless tracking device 1402 and/or distance of wireless tracking device 1402 from a reference point). Setting module 1420 may then use a setting algorithm 1421 to calculate a current setting 1432 based on one or more of: current position 1430 and minimum position 1422, minimum setting 1424, maximum position 1426, and maximum setting 1428. Setting algorithm 1421 is a formulate based on linearity of flow through valve 1604 for different positions of valve handle 1404, for example. Where valve handle 1404 makes one or more complete rotations when opening and closing valve 1406, setting module 1420 detects and tracks these rotations to determine a status of valve 1402. Accordingly, setting module 1420 detects a current position 1430 based on changes in position (using accelerometer and/or time-of-flight) and orientation (e.g., using a gyroscope, magnetometer, and/or multiple accelerometers) to determine that (a) valve handle 1404 has been moved and (b) a new position for valve handle 1404 based upon the change in position and orientation and may determine a current setting 1432 corresponding to current position 1430.

Where wireless tracking device 1402 detects its orientation and/or position with reference to the Earth, when valve 1406 moves relative to the Earth (e.g., where valve 1406 is mounted in a vehicle, such as a ship, trail, truck, etc.), the orientation of wireless tracking device 1402 may not indicate the orientation of valve handle 1404 relative to valve 1406. Accordingly, setting module 1420 may retrieve a reference orientation from stationary gateway 714, where stationary gateway 714 is mounted to the same structure as valve 1406 and does not move relative to valve 1406. Setting module 1420 thereby determine an orientation of valve handle 1404 relative to valve 1406. For example, setting module 1420 may instruct stationary gateway 714 to determine its orientation relative to the Earth at the same time that wireless tracking device 1402 determines its orientation relative to the Earth. Setting module 1420 may then use changes in the orientation of the stationary gateway 714 relative to an initially determines orientation reference of stationary gateway 714, to adjust the determined orientation of valve handle 1404. Accordingly, setting module 1420 may determine a position of valve handle 1404 relative to valve 1406 irrespective of changes in the orientation of valve 1406.

Advantageously, setting module 1420 may detect changes in the position of valve handle 1404 and may determine a status of valve 1406 based upon these changes and/or its current position. In certain embodiments, wireless tracking device 1402 includes one or more of: a magnetometer, an accelerometer, and a gyroscope for detecting changes in orientation, and movement of valve handle 1404. Multiple wireless tracking devices may be attached to valve handle 1404 to increase accuracy and//or reliability of position and/or orientation detection.

Wireless tracking device 1402 may send (e.g., wirelessly) a notification to another node of wireless tracking system 700, FIG. 7. For example, setting module 1420 may send a notification indicative of a detected change in the status of valve 1406 to mobile gateway 710 and or server 704. In another example, where valve handle 1404 is not expected to move, wireless tracking device 1402 may only need detect movement indicative of valve handle being turned, but not need to detect a position of valve handle 1404. For example, where valve 1406 is expected to remain fully open during operation of certain equipment, wireless tracking device 1402 uses an accelerometer to detect movement of valve handle 1404. When wireless tracking device 1402 detects movement of valve handle 1404 (e.g., a person closes valve 1406 in error), wireless tracking device 1402 sends an alert/notification 1413(1) to a local mobile gateway 710 (e.g., of a local supervisor) and/or sends an alert/notification 1413(2) to server 704. In certain embodiments, server 704 determines an appropriate intervention and generates one or more messages to instruct a user on how to correct the problem. Accordingly, incorrect/undesirable operation of valve 1406 is detected and corrective action may be initiated.

In another example, wireless tracking device 1402 may use an optical sensor (e.g., a camera, a light-dependent-resistor, etc.) to detect changes in light. For example, where a control is positioned beneath a protective opaque cover that is opened to access the control, by placing wireless tracking device 1402 within the cover (e.g., near the control), wireless tracking device 1402 may detect changes in light levels that indicate that the cover is opening. Accordingly, wireless tracking device 1402 may send an alert/notification (e.g., alert/notification 1413) that the control is being accessed. In another example, the optical sensor may detect changes in one or more indicator lights of a control panel, whereby change in the indicator lights is indicative of a change in a control of the equipment.

In certain embodiments, wireless tracking device 1402 may change behavior or its operational assignment in response to detecting a change in a position of valve handle 1404. For example, in response to detecting a change in position of valve handle 1404, wireless tracking device 1402 may change to an operational assignment that detects and reports ambient air temperature to server 704 for example. In another example, in response to detecting a change in position of valve handle 1404, wireless tracking device 1402 may change from a first operational assignment (e.g., monitoring for movement of valve handle 1404) to a second operational assignment (e.g., monitoring ambient air temperature). In one example of operation, wireless tracking device 1402 detects a change in position of valve handle 1404 and reports the change to mobile gateway 710, which is local to (e.g., at the same site, same building, same room) wireless tracking device 1402. For example, mobile device 710 may be carried by a supervisor for valve 1406 and/or equipment connected thereto. Accordingly, the local supervisor at the plant is appraised of changes (authorized or unauthorized) to valve 1406. Wireless tracking device 1402 may also report changes in position of valve 1406 to server 704 (e.g., when mobile gateway 710 fails to acknowledge the notification sent by wireless tracking device 1402), where application 706 may generate one or more notifications to mobile gateway 710. In certain embodiments, wireless tracking device 1402 communicates with stationary gateway 714, which relays messages to one or both of mobile gateway 710 and/or server 704. In certain embodiments, wireless tracking device 1402 uses stationary gateway 714 to detect a time of flight of communications and/or a signal strength for use in trilateration to determine a position of wireless tracking device 1402 (e.g., relative to stationary gateway 714). Stationary gateway 714 may also collect and/or relay information from wireless tracking device 1402 to server 704 and/or other devices or components.

Particularly, where valve 1406 is critical to a local process or system, when unexpected and unwanted movement of valve handle 1404 is detected, wireless tracking device 1402 immediately attempts to location and communicate with a local device, such as mobile gateway 710, such that intervention may occur quickly. Where wireless tracking device 1402 does not receive acknowledgements for any short-range communications (e.g., Bluetooth, Wi-Fi, etc.), wireless tracking device 1402 may use other longer range wireless protocols (e.g., LORA, cellular, etc.) to send alert/notification 1413 to ensure movement of and/or changes in the position of valve 1406 are received by wireless tracking system 700. For example, where wireless tracking device 1402 is monitoring a control that is critical to system unction and/or is critical to safety of personnel, when alert/notification 1413 is not acknowledged, wireless tracking device 1402 uses a communication protocol with greater range.

In certain embodiments, server 704 represents a plant controller whereby wireless tracking device 1402 provides feedback to server 704 indicative of control of the plant, allowing server 704 to make decisions based upon a detected position and/or changes to valve 1406. Where valve 1406 is required to be in a certain position during operation of the plant, server 704 may initiate corrective actions when wireless tracking device 1402 detect unexpected changes to the position of valve handle 1404. For example, server 704 may send an alert 1414 (e.g., a high priority notification) to mobile gateway 710 instructing the supervisor to return valve 1406 to the required position. Alerts 1413 and 1414 are described in further detail below with respect to FIG. 17.

Figure 15:
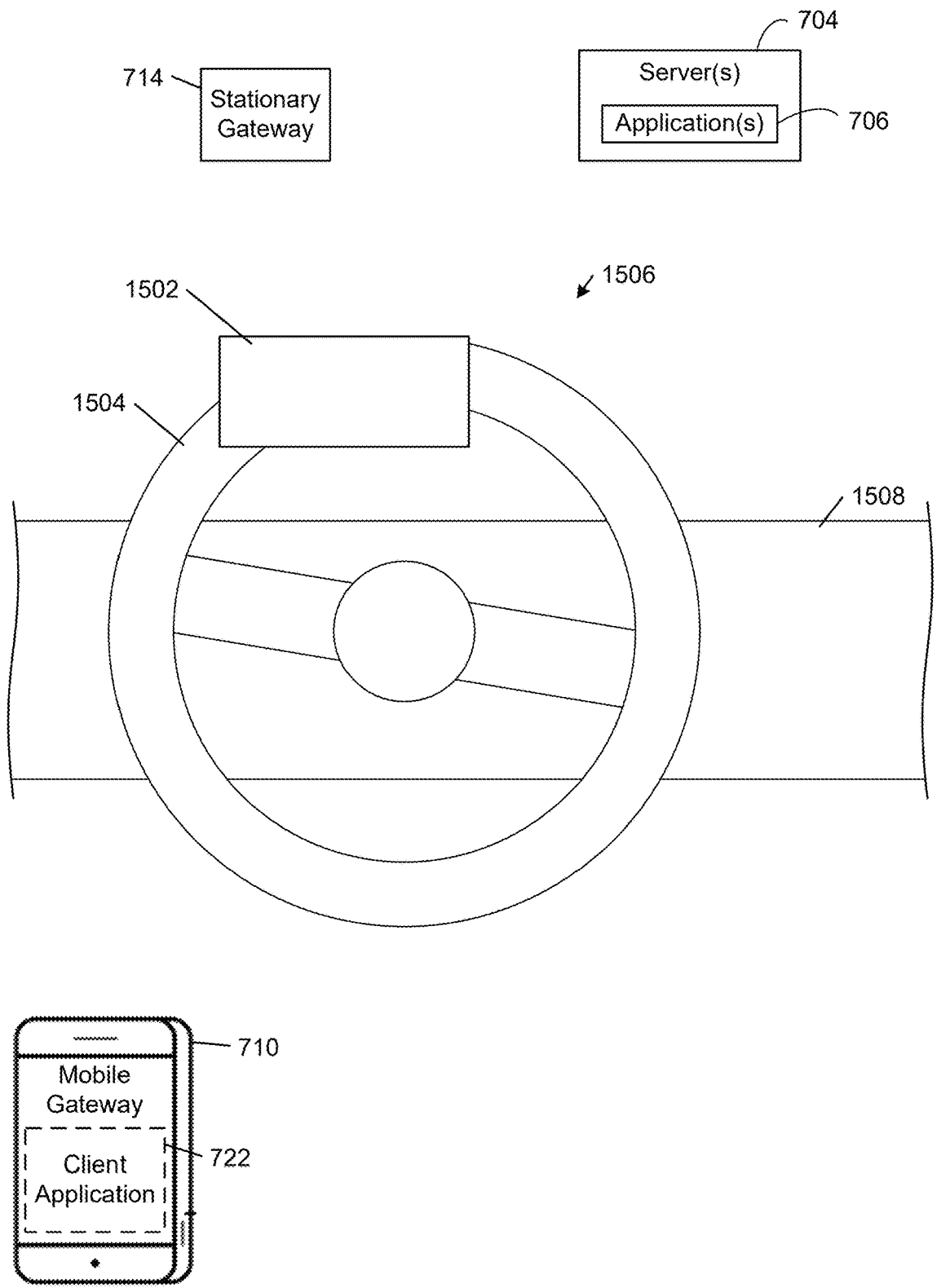
FIG. 15 is a schematic illustrating one example rigid wireless tracking device attached to a valve handle of a control valve that controls flow of fluid through a pipe, in embodiments.

FIG. 15 is a schematic illustrating one example rigid wireless tracking device 1502 attached to a valve handle 1504 of a control valve 1506 that controls flow of fluid through a pipe 1508. Unlike the embodiment of FIGS. 14A, 14B, and 14C where wireless tracking device 1402 has a flexible form factor that may conform to and adhesively adhere to the shape of valve handle 1404, wireless tracking device 1502 is substantially rigid. Accordingly, wireless tracking device 1502 may use other means for immovably attaching to valve handle 1504. For example, wireless tracking device 1502 may adhere to a place that include a clamp for attaching to valve handle 1504. Once attached to valve handle 1504, wireless tracking device 1502 operates similarly to wireless tracking device 1402 of FIGS. 14A, 14B, and 14C.

Figure 16:
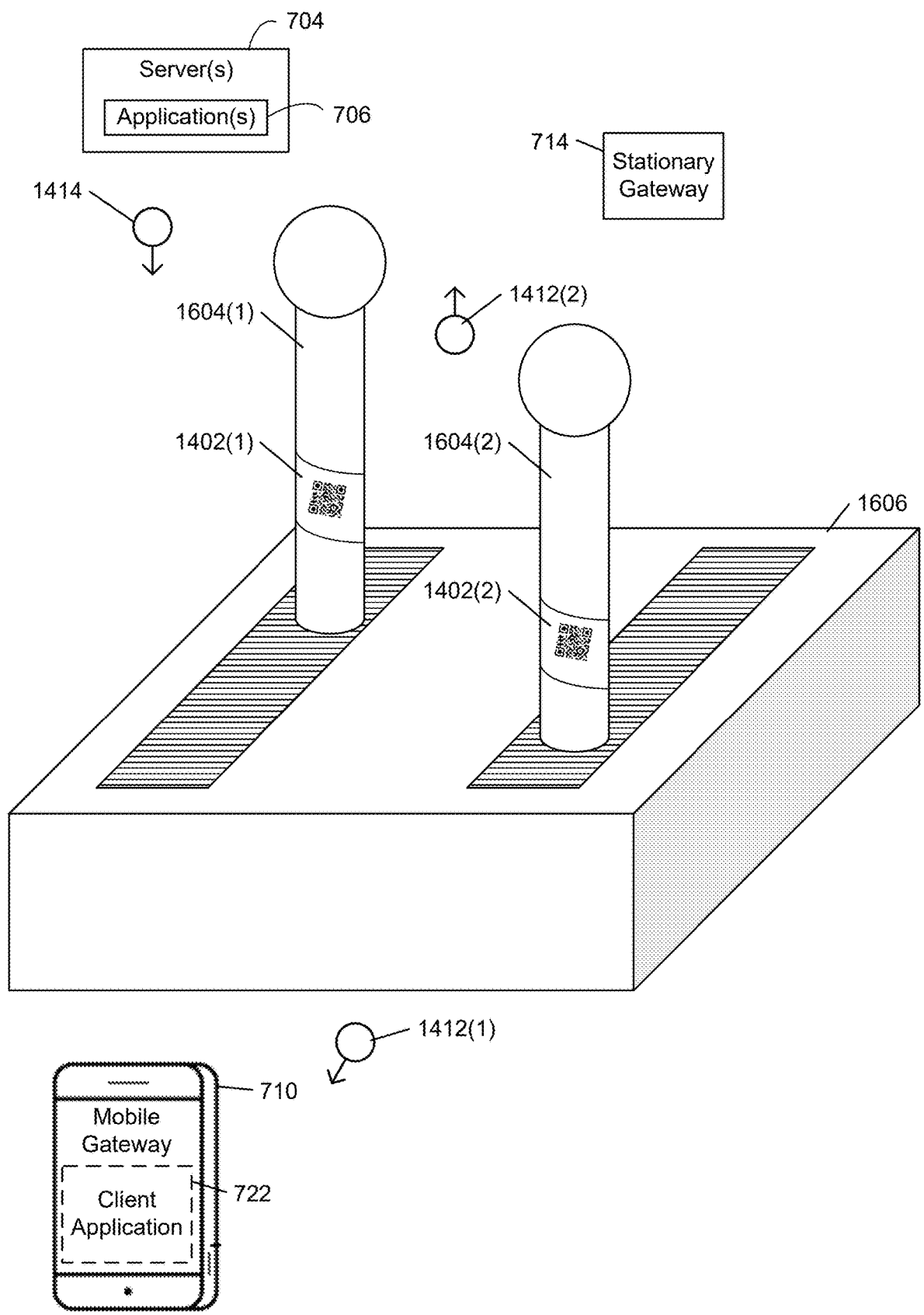
FIG. 16 is a perspective diagram illustrating two example wireless tracking devices(1)(2) monitoring positions of two control levers(1)(2) of a control unit, in embodiments.

FIG. 16 is a perspective diagram illustrating two example wireless tracking devices 1402(1) and 1402(2) monitoring positions of two control levers 1604(1) and 1604(2) of a control unit 1606. Control unit 1606 controls operation of plant equipment and/or machinery for example. In this example, control levers 1604 move linearly and independently of one another. Wireless tracking device 1402(1) is attached to control lever 1604(1) to determine a position and/or detect movement of control lever 1604(1) and wireless tracking device 1402(2) is attached to control lever 1604(2) to determine a position and/or detect movement of control lever 1604(2). As described above, wireless tracking devices 1402(1) and 1402(2) may use one or more sensors (e.g., an accelerometer) to detect movement of control levers 1604(1) and 1604(2), respectively. Further, wireless tracking devices 1402(1) and 1402(2) may determine positions of control levers 1604(1) and 1604(2), for example using time-of-flight calculations for communications between wireless tracking devices 1402(1) and 1402(2) and stationary gateway 714. Stationary gateway 714 may be positioned near and in line with wireless tracking devices 1402 to improve accuracy of detected positions, for example. When changes to control levers 1604 are detected, the respective wireless tracking device 1402 sends alert/notification 1413 indicative of the change and/or current position to one or both of mobile gateway 710 and/or server 704.

In certain embodiments, wireless tracking device 1402 generates an alert/notification that includes an intervention, such as manually checking a position of the control that has been changed. Optionally, the alert/notification may instruct a person to reset the control to a previous position or setting.

FIG. 17 is a schematic side view of one example control lever 1700 illustrating use of a tape node 1702 positioned on a shaft of control lever 1700 to determine a position or setting of control lever 1700. In the example of FIG. 17, control lever 1700 rotates between a lower position 1706 and an upper position 1710, and may be positioned at any angle therebetween, or specific angles. For example, a center position 1708 may represent a neutral (stationary) position where a corresponding machine is not operation, lower position 1706 may represent a reverse position, where the machine operates in reverse, and upper position 1710 represents a forward position whereby the machine operates in a forward direction.

In this example, control lever 1700 rotates on a vertical plane and tape node 1702 uses an angle sensor (e.g., at least two accelerometers and/or a gyroscope) to measure an orientation relative to the Earth (e.g., using gravity) and thereby determine a change in angle of control lever 1704. Based on the change in angle, and a known reference angle, tape node 1702 may determine a setting (e.g., forward, neutral, reverse) of control lever 1700.

In certain embodiments, tape node 1702 may communicate with one or more of server 704, mobile gateway 710, and stationary gateway 714 of wireless tracking system 700, FIG. 7. Similar to control valve 1406 of FIGS. 14A and 14B, where setting of control lever 1704 is critical, tape node 1702 may send one or both of an alert 1712(1) to mobile gateway 710 and an alert 1712(2) to server 704 to indicate changes to control lever 1704.

Figure 18:
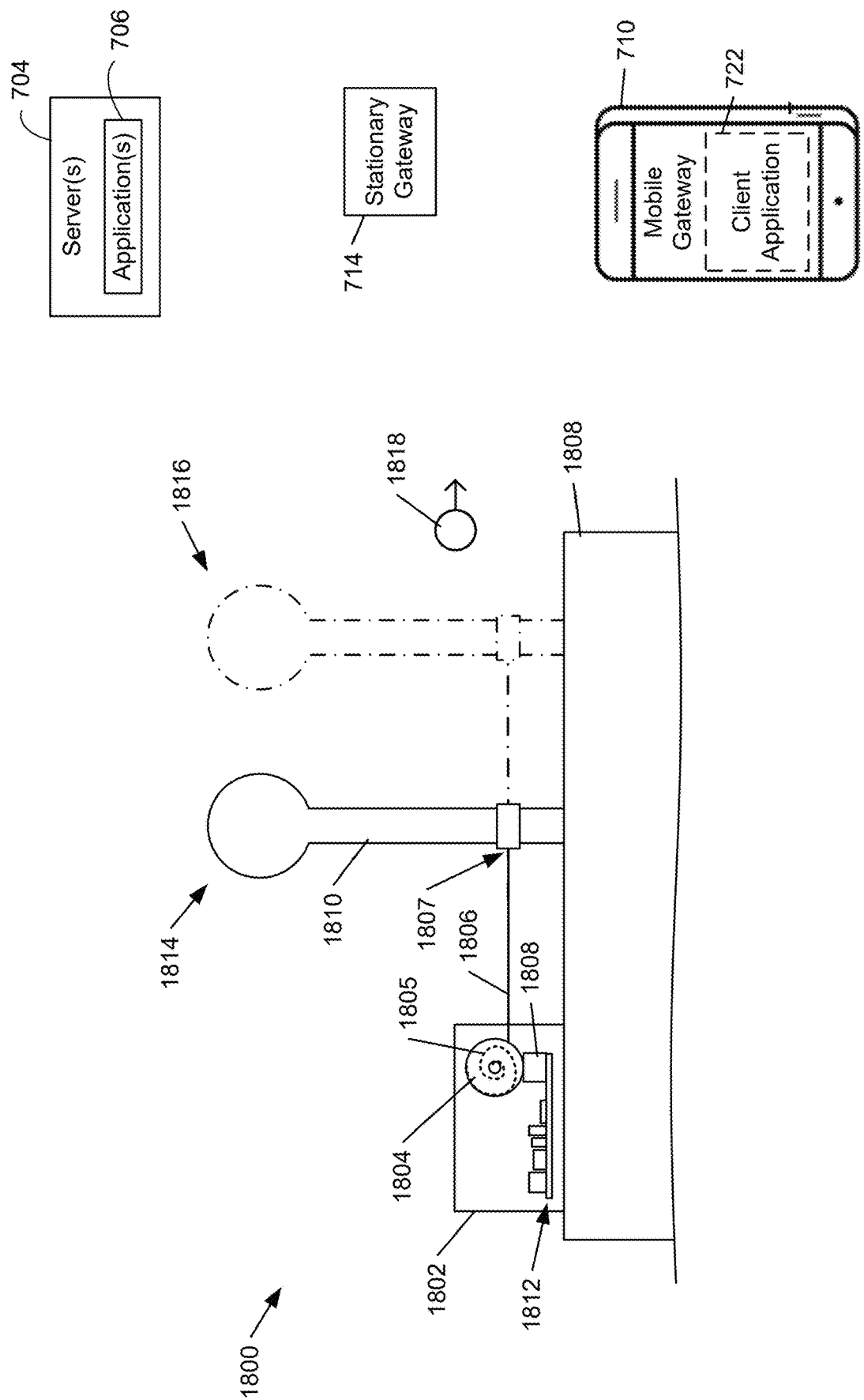
FIG. 18 is a schematic diagram illustrating one example scenario that uses an alternative form factor wireless tracking device that uses mechanical sensing of movement and/or position of a control lever that moves in a horizontal plane, in embodiments.

FIG. 18 is a schematic diagram illustrating one example scenario 1800 that uses an alternative form factor wireless tracking device 1802 that uses mechanical sensing of movement and/or position of a control lever 1810 that moves in a horizontal plane. In scenario 1800, angular and/or positional changes of a control lever (or any other type of control) cannot be measured accurately using orientation changes based on gravity and/or distance movements based on time-of-flight measurements are too small to measure accurately.

Wireless tracking device 1802 is fixedly attached to a housing 1808 of a lever 1810 and includes a spool 1804 with a retracting spring 1805 and a cord 1806 that attaches, at a distal end 1807, to lever 1810. Spring 1805 causes spool 1804 to rotate, retracting cord 1806, such that cord 1806 is kept taught. Wireless tracking device 1802 includes wireless transducing circuit 1812 and may operate similarly to segments 113 of FIGS. 1 and 2, segments 640, 670, and 680 of FIGS. 6A, 6B, and 6C, tapes nodes 718, 724, 728, 732, 742, 744, 746, 748 of FIG. 7, tape nodes 872, 876, and 882 of FIG. 8, and other segments, tape nodes, and wireless tracking devices described above. Wireless transducing circuit 1812 further includes a sensor 1808 that detects rotation of spool 1804, thereby allowing wireless transducing circuit 1812 to detect movement of lever 1810. sensor 1808 is any one or more of: an optical sensor (e.g., where spool 1804 includes markings sensed by sensor 1808), a magnetic sensor (e.g., where spool 1804 include magnetic elements that are sensed by sensor 1808), or any other type of sensor suitable for detecting rotation of spool 1804.

In one example of operation, as lever 1810 is moved from a first position 1814 to a second position 1816, cord 1806 is pulled by lever 18010 and unwinds from spool 1804, rotating spool 1804 against spring 1805, and rotation of spool 1804 is sensed by sensor 1808 as movement of lever 1810 in a first direction. As lever is moved from second position 1816 to first position 1814, spring 1805 causes spool 1804 to retract cord 1806, and rotation of spool 1804 is sensed by sensor 1808 as movement of lever 1810 in an opposite direction. Software within wireless transducing circuit 1812 tracks rotation of spool 1804 as level 1810 is moved and may, after calibration, determine a position of lever 1810. Wireless tracking device 1802 may send an alert/notification 1818 indicative of movement of lever 1810 and may include a determined position of lever 1810. For example, wireless tracking device 1802 may communicate with server 704 of wireless tracking system 700 of FIG. 7, such as by using wireless communication with one or more of stationary gateway 714 and/or mobile gateway 710.

Wireless tracking device 1802 may also detect rotation of nuts and screws. For example, distal end 1807 may be attached to a cap positioned over the nut or screw such that any rotation of the nut or screw moves cord 1806 and is thereby detected by wireless transducing circuit 1812.

Any of wireless tracking devices 1402, 1702 and 1802 may be used to detect unwanted movement of a valve handle or control lever and may generate an intervention that instructs an operator or supervisor to correct the unwanted movement.

Figure 19:
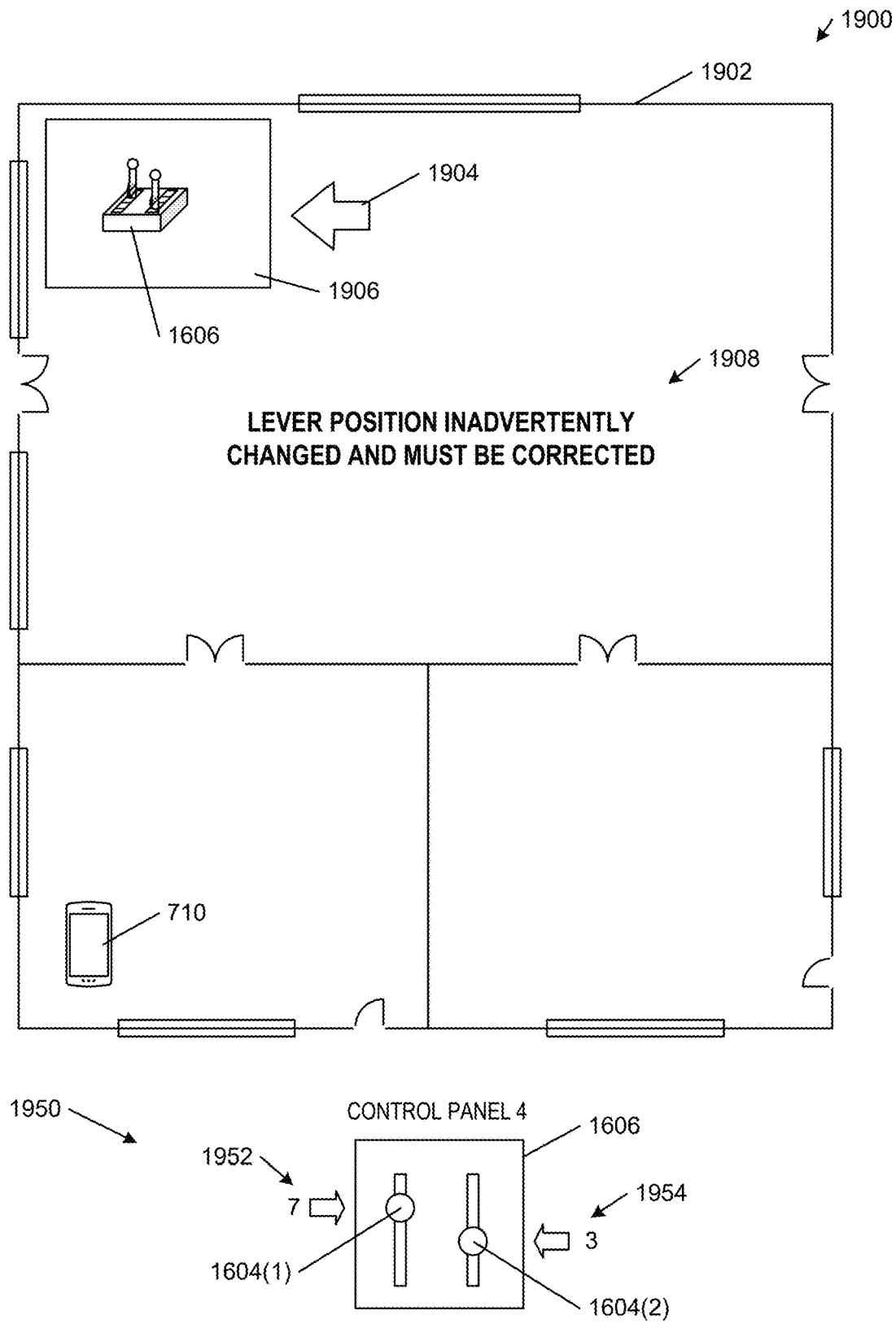
FIG. 19 is a schematic diagram illustrating example intervention information, in embodiments.

FIG. 19 is a schematic diagram illustrating example intervention information 1900 included in one or both of alert/notification 1413(1) and alert/notification 1414 of FIGS. 14B and 16, alert/notification 1712 of FIG. 17, and alert/notification 1818 of FIG. 18. FIG. 19 continues the embodiment of FIG. 16 but may also apply to the embodiments of FIGS. 14A/14B, 17 and 18, where the corresponding valve and/or levers are indicated.

Intervention information 1900 includes a floor plan 1902 (see U.S. patent application Ser. No. 16/857,177 and U.S. patent application Ser. No. 17/323,995, both incorporated herein by reference) of an operational area that includes the location of control panel 1606 and a location of mobile gateway 710. For example, floor plan 1902 may represent shop floor, a process control room, a factory building, and so on. Intervention information 1900 indicates, using an arrow 1904 for example, a location of control panel 1606, which is located on equipment 1906 in this example. In certain embodiments, intervention information 1900 also shows a location of mobile gateway 710 (e.g., automatically updated by client application 722 based on a determined location of mobile gateway 710). In certain embodiments, intervention information 1900 includes instructions and/or directions 1908 the indicate actions needed by an operator and/or supervisor. For example, a user of mobile gateway 710 may be a supervisor or operator of equipment 1906, whereby intervention information 1900 directs the attention of the user to an unexpected change at control panel 1606. Intervention 1900 may include additional information, such as landmark features, equipment detail, and infrastructure of wireless tracking system 700 without departing from the scope hereof.

Intervention information 1900 may also provide setting information 1950 for control panel 1606. In one example, setting information 1950 provides details of previous settings for control panel 1606. For example, setting information 1950 may be an image captured of control panel 1606 with levers 1604 positioned at the desired setting. in certain embodiments, the image may be captured by mobile gateway 710 when the user set control panel 1606 and is uploaded to one or both of wireless tracking devices 1402(1) and 1402(2). In another example, setting information 1950 is a schematic illustrating new settings for one or both levers 1604 of control panel 1606. As shown in FIG. 19, setting information 1950 instructs the user to ser lever 1604(1) to a value of seven, as indicated by arrow 1952, and to set lever 1604(2) to value of three, as indicated by arrow 1954. In other embodiments, setting information 1950 may have other graphics suitable for the control being set, or may be non-graphical (e.g., entirely alphanumeric).

Figure 20A:
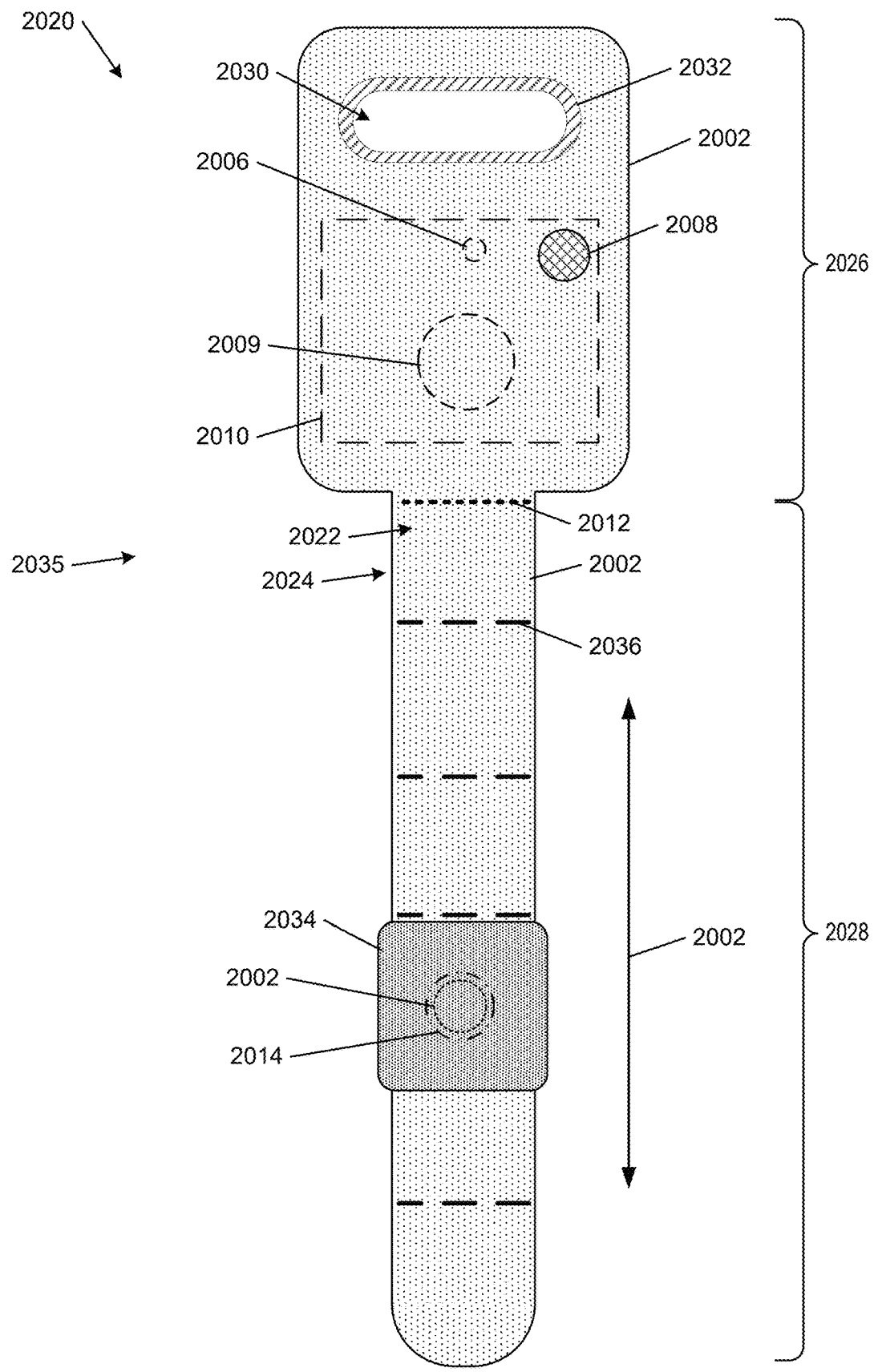
FIG. 20A is a schematic diagram illustrating one example smart wireless tracking belt that uses hook and loop fastening and magnetic closure sensing, where a magnet is positionable on the belt for different sized use.
Figure 20B:
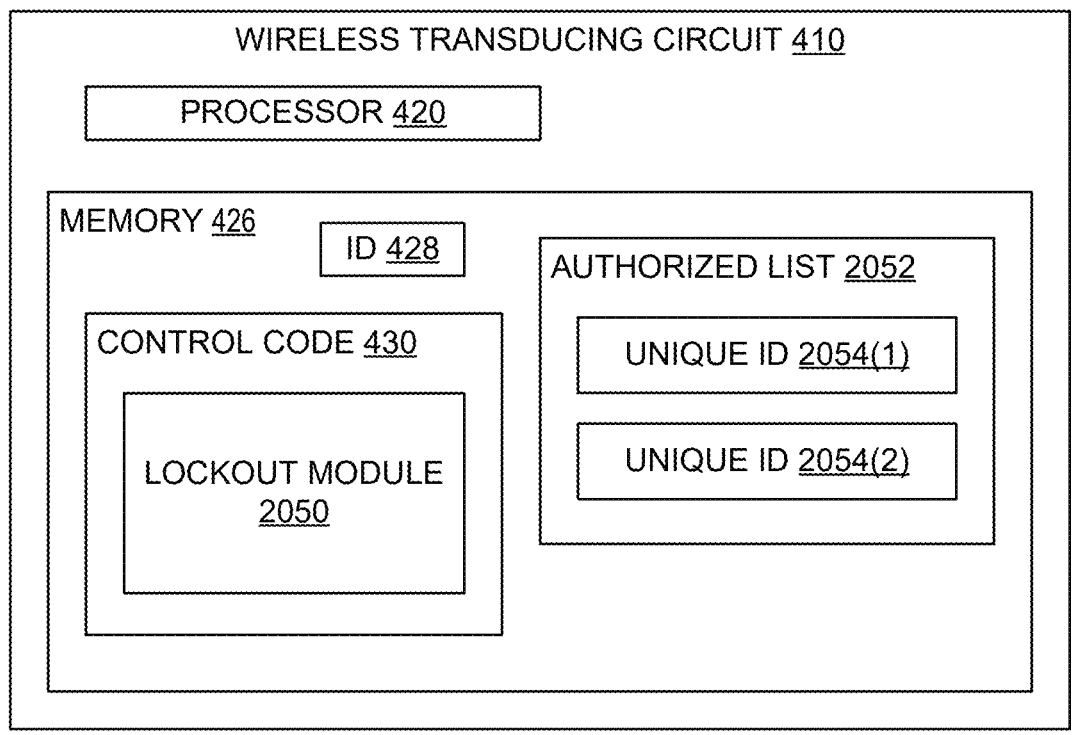
FIG. 20B is a schematic diagram illustrating the wireless transducing circuit of the smart wireless tracking belt of FIG. 20A in further example detail.

FIG. 20A is a schematic diagram illustrating one example smart wireless tracking belt 2020 that uses hook and loop fastening and magnetic closure sensing, where a magnet is positionable on the belt for different sized use. FIG. 20B is a schematic diagram illustrating wireless transducing circuit 410 of smart wireless tracking belt 2020 in further example detail. Control code 430 includes a lockout module 2050, implemented as machine-readable instructions that, when executed by processor 420, cause smart wireless tracking belt 2020 to implement a lockout/tagout protocol described below.

Smart wireless tracking belt 2020 has a flexible belt body 2035 formed with a head portion 2026 and a tail portion 2028. FIG. 20A shows an outside surface 2022 (e.g., top side) of flexible belt body 2035 formed by a fabric layer with hooks (e.g., the hook part of the hook-and-loop fastener). An inside surface (e.g., a bottom side opposite to outside surface 2022) of flexible belt body 2035, opposite outside surface 2022, is formed by a fabric layer with loops (e.g., the loop part of the hook-and-loop fastener). In other embodiments, outside surface 2022 is formed by a fabric layer with loops (e.g., the loop part of the hook-and-loop fastener) and inside surface 2024 (e.g., a bottom side) is formed by a fabric layer with hooks (e.g., the hook part of the hook-and-loop fastener). A head portion 2026 of smart wireless tracking belt 2020 includes a wireless transducing circuit 2010 (e.g., similar to wireless transducing circuit 410 of FIG. 4) between (e.g., within a pocket formed by) the fabrics of outer surface 2022 and inner surface 2024. Tail portion 2028 of smart wireless tracking belt 2020 is narrower than head portion 2026, and head portion 2026 also includes a slot 2030, formed with a grommet 2032, sized to receive tail portion 2028 when smart wireless tracking belt 2020 is attached to an object (e.g., a pallet, an asset, a control handle/lever, or any other suitable object to be tracked). Smart wireless tracking belt 2020 is flexible and is attached to the object by looping smart wireless tracking belt 2020 around the object, passing tail portion 2028 through slot 2030, and pressing inside surface 2024 of tail portion 2028 to outside surface 2022 of head portion 2026, thereby causing the hook-and-loop fastener to secure (e.g., smart wireless tracking belt 2020 fastens to itself). In certain embodiments, slot 2030 and grommet 2032 may be omitted. In other embodiments, grommet 2032 may be replaced with a buckle (e.g., similar to a belt buckle) that includes at least one prong that may be passed through one of at least one hole within tail portion 2028 to fasten smart wireless tracking belt 2020.

One permanent magnet 2002 is in a pouch 2034 that is positionable along tail portion 2028. For example, pouch 2034 may include hook and loop material that is similar to flexible belt body 2035 and may be positioned relative to lines 2036 that may define a usable length of flexible belt body 2035. For example, lines 2036 may indicate a position for pouch 2034 corresponding to a circumference of an object to which flexible belt body 2035 is to attach. In other embodiments, pouch 2034 may include two slots (not shown) that allow tale portion 2028 the thread through pouch 2032, such that pouch 2034 mat slidably position along tail portion 2038. Wireless transducing circuit 2010 includes a magnetic sensor 2006 (e.g., a hall-effect sensor, hall-effect switch, magnetic switch, etc.) positioned at or near outer surface 2022 that detects proximity of magnet 2002 when smart wireless tracking belt 2020 is closed (e.g., fastened to itself as described above). Accordingly, wireless transducing circuit 2010 uses magnetic sensor 2006 to detect a fastening state (fastened to itself or unfastened) of smart wireless tracking belt 2020. For example, wireless transducing circuit 2010 may read sensor data from magnetic sensor 2006 at intervals and process the sensor data to determine a fastening event when magnetic sensor 2006 detects a magnetic field from magnet 2002 and detect an unfastening event when magnetic sensor 2006 does not detects a magnetic field from magnet 2002. In some embodiments, the wireless transducing circuit 2010 may detect a fastening or unfastening event when magnetic sensor 2006 detects a change in the magnetic field that corresponds to a respective fastening or unfastening event.

In certain embodiments, pouch 2034 and magnet 2002 are omitted and magnetic sensor 2006 is replaced by an optical sensor (e.g., a light dependent resistor, image sensor, etc.) that detects ambient light when smart wireless tracking belt 2020 is unfastened and cannot detect ambient light when smart wireless tracking belt 2020 is fastened. Accordingly, after fastening smart wireless tracking belt 2020, and relatively fast increase in light detected by the optical sensor indicates that smart wireless tracking belt 2020 is being unfastened.

Smart wireless tracking belt 2020 may include a status display 2008 (e.g., an LED) positioned at outer surface 2022 and controlled by wireless transducing circuit 2010. Although shown at outer surface 2022, status display 2008 may alternatively, or simultaneously, be positioned at inner surface 2024 without departing from the scope hereof. In certain embodiments, wireless transducing circuit 2010 controls status display 2008 to indicate a status of smart wireless tracking belt 2020. In the example of FIG. 20A, status display 2008 includes an LED, but in other embodiments the status display 2008 may include an LED array, an LCD display panel, an LED display, an OLED display, a flexible display panel, one or more micro-LEDs, or some other type of display. In some embodiments, the status display 2008 may display information other than a status of the wireless tracking belt 2020.

Smart wireless tracking belt 2020 may also include a seal 2014 around magnet 2002 to prevent the magnet from falling out of pouch 2034. Seal 2014 may be formed using one or more of: stitching, an adhesive, a sealed pocket, thermal welding, or some other type of seal and/or material. Head portion 2026 may also include a weatherproof seal 2012 that is positioned to protect wireless transducing circuit 2010 from the elements, such as water, humidity, and/or other traumatic environmental conditions.

In certain embodiments, smart wireless tracking belt 2020 may include a speaker 2009 for outputting an audio alert such as an alarm sound and/or a spoken message when smart wireless tracking belt 2020 is moved and/or unfastened.

Advantageously, smart wireless tracking belt 2020 easily attaches to valve handles (e.g., valve handles 1404 and 1504 of FIGS. 14A, 14B, and 15), control levers (e.g., control levers 1604, 1704, and 1810 of FIGS. 16, 17, and 18), and other types of control for detecting movement and/or position as described above, and for lock-out tag-out purposes as described below with reference FIGS. 30-37.

FIGS. 21A and 21B are schematic diagrams illustrating one example single-use smart security device 2100 in an open position prior to use, and in a closed position during use, respectively. Single-use security tags made from plastic, nylon, or similar materials, are not smart, and only indicate breach or intrusion when the single-use security tag is found broken or damaged. Single-use smart security device 2100 may also be referred to as wireless tracking device 2100.

Single-use smart security device 2100 has a form factor that is similar to conventional security tags and includes a body portion 2102 and a security loop 2104 that is fixedly attached (e.g., a continuous molding or permanent bonding) to body portion 2102 at a first end 2106 and having a notch 2108 at an opposite open end 2110. Body portion 2102 includes a receptacle 2112 sized to receive open end 2110 and including a latch mechanism 2114 that engages notch 2108 and prevents removal of security loop 2104 from receptacle 2112. Body portion 2102 includes a wireless transducing circuit 2116 (e.g., similar to wireless transducing circuit 410 of FIGS. 4 and 20B) that adds intelligence to security device.

In certain embodiments, security loop 2104 is conductive, or includes a conductive thread 2118, that couples, at first end 2106, with a terminal 2120 of wireless transducing circuit 2116, and couples, at open end 2110 with a terminal 2122 of wireless transducing circuit 2116 when open end 2110 is secured within receptacle 2112. Wireless transducing circuit 2116 includes a detector 2124 (e.g., an impedance or inductance detector) that that detects when security loop 2104 is broken (e.g., cut) or tampered with (e.g., shorted). For example, detector 2124 may detect changes (e.g., increase and decrease) in conductivity of security loop 2104 (or conductive thread 2118) that indicates tampering or cutting of security loop 2104. Wireless transducing circuit 2116 may also include at least one motion sensor 2126 (e.g., accelerometer, gyroscope, etc.) that detects movement of single-use smart security device 2100.

Wireless transducing circuit 2116 may also include an indicator 2128 (e.g., an LED or other type of display) that is controlled to indicate an operational status of single-use smart security device 2100. For example, wireless transducing circuit 2116 may cause indicator 2128 to flash when detector 2124 detects that open end 2110 is inserted and secured within receptacle 2112, and thereafter may cause indicator 2128 to flash at intervals to indicate normal operation of single-use smart security device 2100. Wireless transducing circuit 2116 may cause indicator 2128 to flash repeatedly when detector 2124 or motion sensor 2126 detects tampering with single-use smart security device 2100. Wireless transducing circuit 2116 may also include a speaker 2130 that may be controlled to emit audio (e.g., beeps, alarm sounds, etc.) indicative of operation of single-use smart security device 2100. For example, wireless transducing circuit 2116 may cause speaker 2130 to beep twice when detector 2124 detects that open end 2110 is inserted and secured within receptacle 2112, and thereafter may beep at intervals to indicate normal operation of single-use smart security device 2100. Wireless transducing circuit 2116 may cause speaker 2130 to beep repeatedly or output an alarm sound when detector 2124 or motion sensor 2126 detects tampering with single-use smart security device 2100.

As described above with reference to FIG. 4, wireless transducing circuit 2116 may include one or more wireless communication modules 412, 414 that allow single-use smart security device 2100 to communicate with wireless tracking system 700 of FIG. 7. Accordingly, wireless transducing circuit 2116 may communicate its operational status at intervals and may communicate events, such as when detector 2124 detects open end 2110 being inserted and secured within receptacle 2112, and when tampering is detected by either detector 2124 or motion sensor 2126. As described above for wireless transducing circuit 410, wireless transducing circuit 2116 may include other components without departing from the scope hereof. Similarly, certain components of wireless transducing circuit 410 that are not required within single-use smart security device 2100 may be omitted.

As shown in FIG. 21B, open end 2110 may be passed through one or more apertures 2152, 2154 of locking components 2156 and 2158, respectively, prior to being secured within receptacle 2112. Accordingly, single-use smart security device 2100 secures locking components 2156 and 2158 together in this example. However, unlike conventional single-use security tags, single-use smart security device 2100 includes intelligence and communicates tampering when detected. Advantageously, single-use smart security device 2100 may communicate through wireless tracking system 700 to report tampering to server 704 as it occurs.

Single-use smart security device 2100 may take other forms and use other method of closure. For example, single-use smart security device 2100 may be similar to a zip tie, whereby once looped through itself it can only be removed by cutting the strap. In another example, single-use smart security device 2100 may use an adhesive that bonds to single-use smart security device 2100 with a strength that causes dame to the device when removal is attempted.

Advantageously, single-use smart security device 2100 may be used for lock-out tag-out purposes as described below with reference to FIGS. 30-37.

Figure 22:
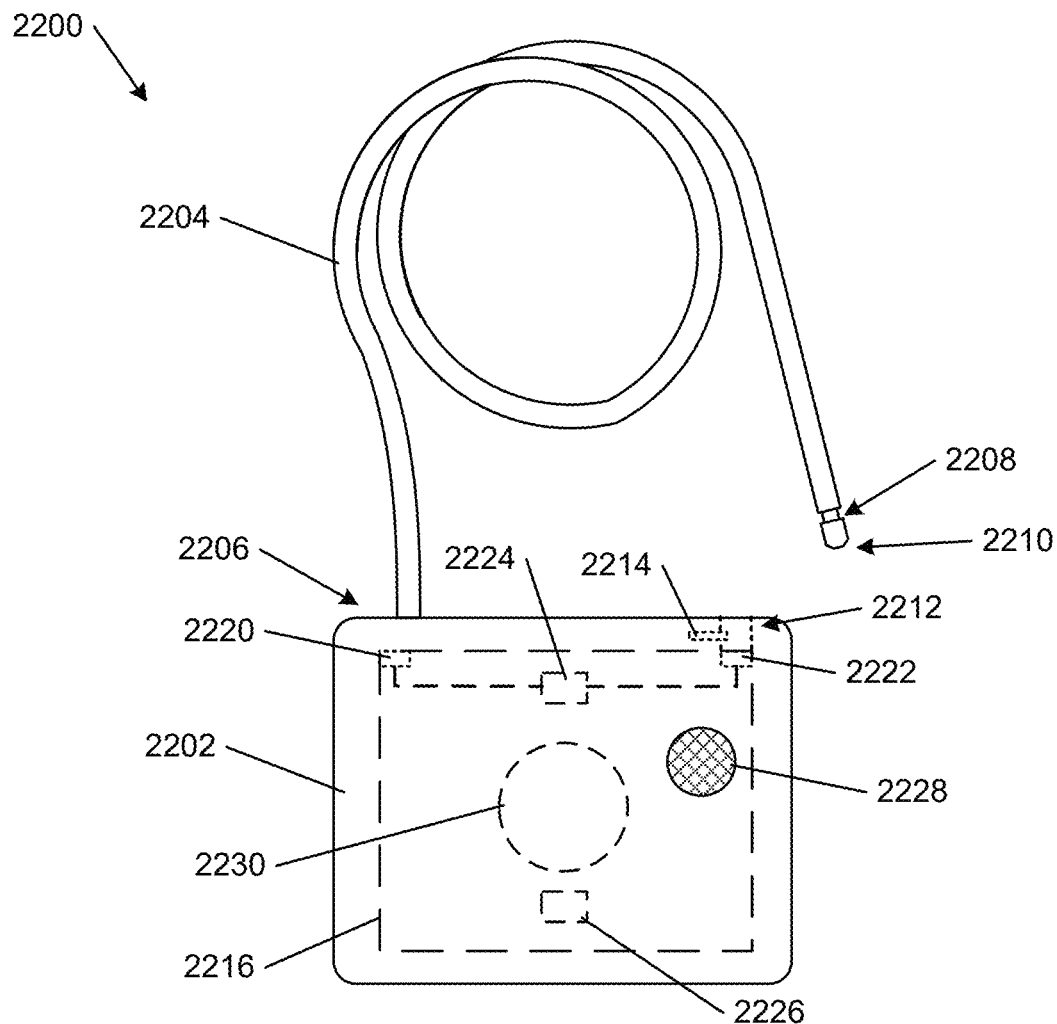
FIG. 22 is a schematic diagram illustrating one example wireless cable-locking device, in embodiments.

FIG. 22 is a schematic diagram illustrating one example wireless cable-locking device 2200. Wireless cable-locking device 2200 may also be referred to as wireless tracking device 2200. Wireless cable-locking device 2200 includes a body portion 2202 and a cable 2204 that is fixedly attached to body portion 2202 at a first end 2206 and having a notch 2208 at an opposite open end 2210. Cable 2204 is a multi-stranded flexible steel security cable, for example. Body portion 2202 includes a receptacle 2212 sized to receive open end 2210 and including a latch mechanism 2214 that engages notch 2208 to prevent removal of cable 2204 from receptacle 2212 unless intentionally released. Body portion 2202 may include a release mechanism (e.g., key operated, combination operated, electromechanically operated) that may be used to deactivate latch mechanism 2214 to release open end 2210 from receptacle 2212. Advantageously, cable 2204 allows use of wireless cable-locking device 2200 in places where items being secured are not close together. Body portion 2202 includes a wireless transducing circuit 2216 (e.g., similar to wireless transducing circuit 410 of FIGS. 4 and 20B) that adds intelligence to wireless cable-locking device 2200.

Cable 2204 is conductive and couples, at first end 2206, with a terminal 2220 of wireless transducing circuit 2216, and couples, at open end 2210 with a terminal 2222 of wireless transducing circuit 2216 when open end 2210 is secured within receptacle 2212. Wireless transducing circuit 2216 includes a detector 2224 (e.g., an impedance or inductance detector) that that detects when cable 2204 is broken (e.g., cut) or tampered with (e.g., shorted). For example, detector 2224 may detect changes (e.g., increase and decrease) in conductivity of cable 2204 that indicates tampering or cutting of cable 2204. Wireless transducing circuit 2216 may also include at least one motion sensor 2226 (e.g., accelerometer, gyroscope, etc.) that detects movement of wireless cable-locking device 2200.

Wireless transducing circuit 2216 may also include an indicator 2228 (e.g., an LED or other type of display) that is controlled to indicate an operational status of wireless cable-locking device 2200. For example, wireless transducing circuit 2216 may cause indicator 2228 to flash when detector 2224 detects that open end 2210 is inserted and secured within receptacle 2212, and thereafter may cause indicator 2228 to flash at intervals to indicate normal operation of wireless cable-locking device 2200. Wireless transducing circuit 2216 may cause indicator 2228 to flash repeatedly when detector 2224 or motion sensor 2226 detects tampering with wireless cable-locking device 2200. Wireless transducing circuit 2216 may also include a speaker 2230 that may be controlled to emit audio (e.g., beeps, alarm sounds, etc.) indicative of operation of wireless cable-locking device 2200. For example, wireless transducing circuit 2216 may cause speaker 2230 to beep twice when detector 2224 detects that open end 2210 is inserted and secured within receptacle 2212, and thereafter may beep at intervals to indicate normal operation of wireless cable-locking device 2200. Wireless transducing circuit 2216 may cause speaker 2230 to beep repeatedly or output an alarm sound when detector 2224 or motion sensor 2226 detects tampering with wireless cable-locking device 2200.

As described above with reference to FIG. 4, wireless transducing circuit 2216 may include one or more wireless communication modules 412, 414 that allow wireless cable-locking device 2200 to communicate with wireless tracking system 700 of FIG. 7. Accordingly, wireless transducing circuit 2216 may communicate its operational status at intervals and may communicate events, such as when detector 2224 detects open end 2210 being inserted and secured within receptacle 2212, and when tampering is detected by either detector 2224 or motion sensor 2226. As described above for wireless transducing circuit 410, wireless transducing circuit 2216 may include other components without departing from the scope hereof. Similarly, certain components of wireless transducing circuit 410 that are not required within wireless cable-locking device 2200 may be omitted.

Advantageously, wireless cable-locking device 2200 may be used for lock-out tag-out purposes as described below with reference to FIGS. 30-37.

Figure 23:
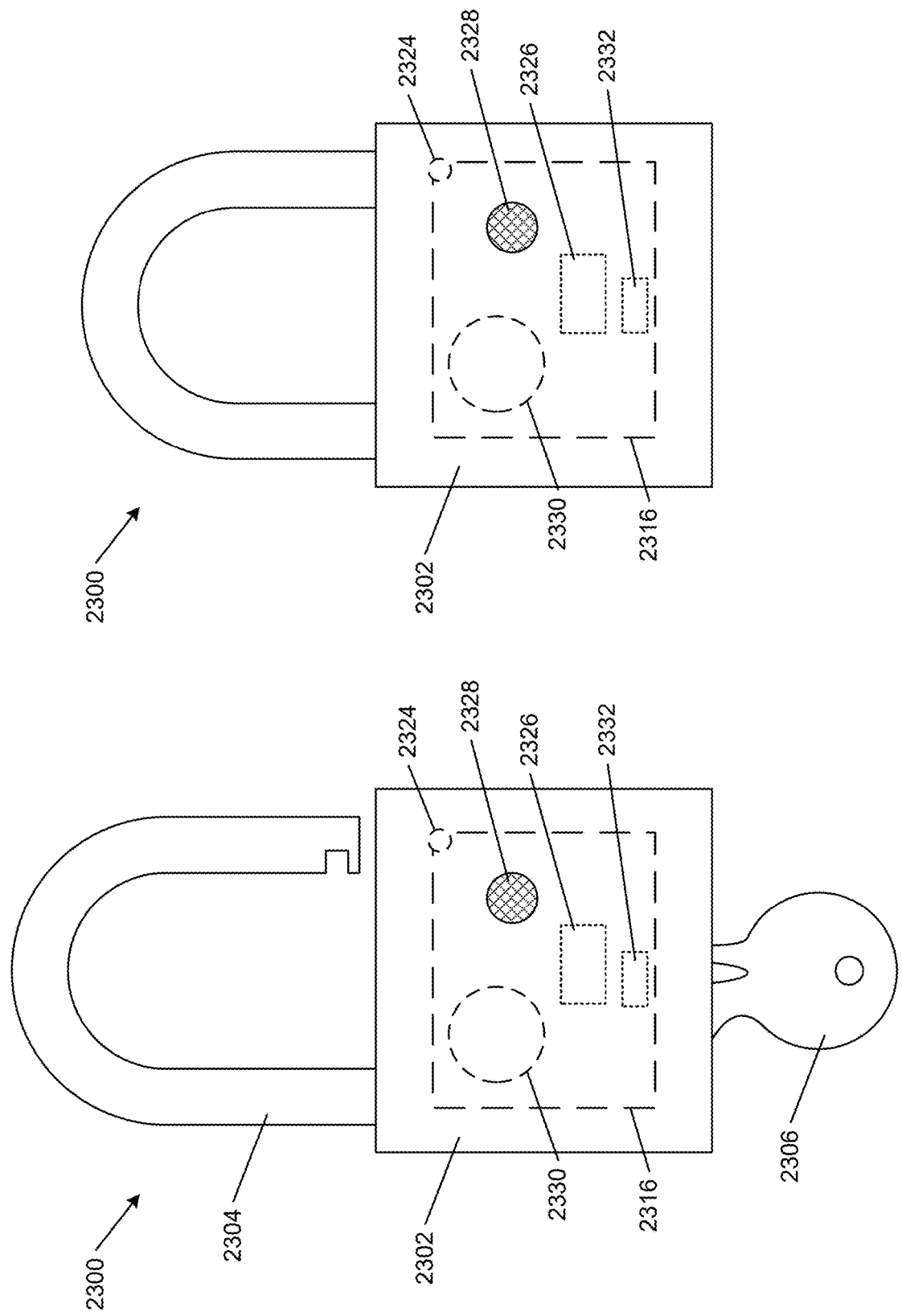
FIGS. 23A and 23B are schematic diagrams illustrating one example smart padlock that is key-operated and shown in open and closed states, respectively, in embodiments.

FIGS. 23A and 23B are schematic diagrams illustrating one example smart padlock 2300 that is key-operated and shown in open and closed states, respectively. Smart padlock 2300 may also be referred to as wireless tracking device 2300. Smart padlock 2300 includes a body portion 2302 and a shackle 2304 that is secured in the closed state by a locking mechanism (not shown) operated by a key 2306. Opening and closing of smart padlock 2300 is similar to conventional padlocks that use a key. Another embodiment of smart padlock 2300 includes a combination locking mechanism that does not require key 2306. Unlike conventional padlocks, body portion 2302 further includes a wireless transducing circuit 2316 (e.g., similar to wireless transducing circuit 410 of FIGS. 4 and 20B) that includes a detector 2324 positioned within body portion 2302 to detect when shackle 2304 is locked closed. In one embodiment, detector 2324 is a light sensor that detects ambient light when shackle 2304 is open and detects no light when shackle 2304 is locked closed. In another embodiment, detector 2324 is a magnetic sensor (e.g., hall effect sensor) that detects when shackle 2304 is open or locked closed. In another embodiment, detector 2324 is an inductive sensor (e.g., a coil where its inductance changes due to proximity of shackle 2304) that detects when shackle 2304 is open or locked closed. Wireless transducing circuit 2316 may also include at least one motion sensor 2326 (e.g., accelerometer, gyroscope, etc.) that detects movement of smart padlock 2300.

Wireless transducing circuit 2316 may also include an indicator 2328 (e.g., an LED or other type of display) that is controlled to indicate an operational status of smart padlock 2300. For example, wireless transducing circuit 2316 may cause indicator 2328 to flash when detector 2324 detects that shackle 2304 closes, and thereafter may cause indicator 2328 to flash at intervals to indicate normal operation of smart padlock 2300. Wireless transducing circuit 2316 may cause indicator 2328 to flash repeatedly when detector 2324 or motion sensor 2326 detects tampering with smart padlock 2300 or when shackle 2304 opens. Wireless transducing circuit 2316 may also include a speaker 2330 that may be controlled to emit audio (e.g., beeps, alarm sounds, etc.) indicative of operation of smart padlock 2300. For example, wireless transducing circuit 2316 may cause speaker 2330 to beep twice when detector 2324 detects shackle 2304 closing, and thereafter may beep at intervals to indicate normal operation of smart padlock 2300. Wireless transducing circuit 2316 may cause speaker 2330 to beep repeatedly or output an alarm sound when detector 2324 or motion sensor 2326 detects tampering with smart padlock 2300 or when shackle 2304 opens.

As described above with reference to FIG. 4, wireless transducing circuit 2316 may include one or more wireless communication modules 412, 414 that allow smart padlock 2300 to communicate with wireless tracking system 700 of FIG. 7. Accordingly, wireless transducing circuit 2316 may communicate its operational status at intervals and may communicate events, such as when detector 2324 detects shackle 2304 closing, when tampering is detected by either detector 2324 or motion sensor 2326, and when shackle 2304 opens. As described above for wireless transducing circuit 410, wireless transducing circuit 2316 may include other components without departing from the scope hereof. Similarly, certain components of wireless transducing circuit 410 that are not required within smart padlock 2300 may be omitted.

In certain embodiments, wireless transducing circuit 2316 may include a sensor 2332 that detects when key 2306 is present within body portion 2302. For example, sensor 2332 may be an inductance sensor that detects inductance caused by presence of key 2306 in body portion 2302. Accordingly, wireless transducing circuit 2316 may send a notification to mobile gateway 710 when shackle 2304 of smart padlock 2300 is closed and key 2306 remains within body portion 2302 for a certain period.

Advantageously, smart padlock 2300 may be used for lock-out tag-out purposes as described below with reference to FIGS. 30-37.

Figure 24:
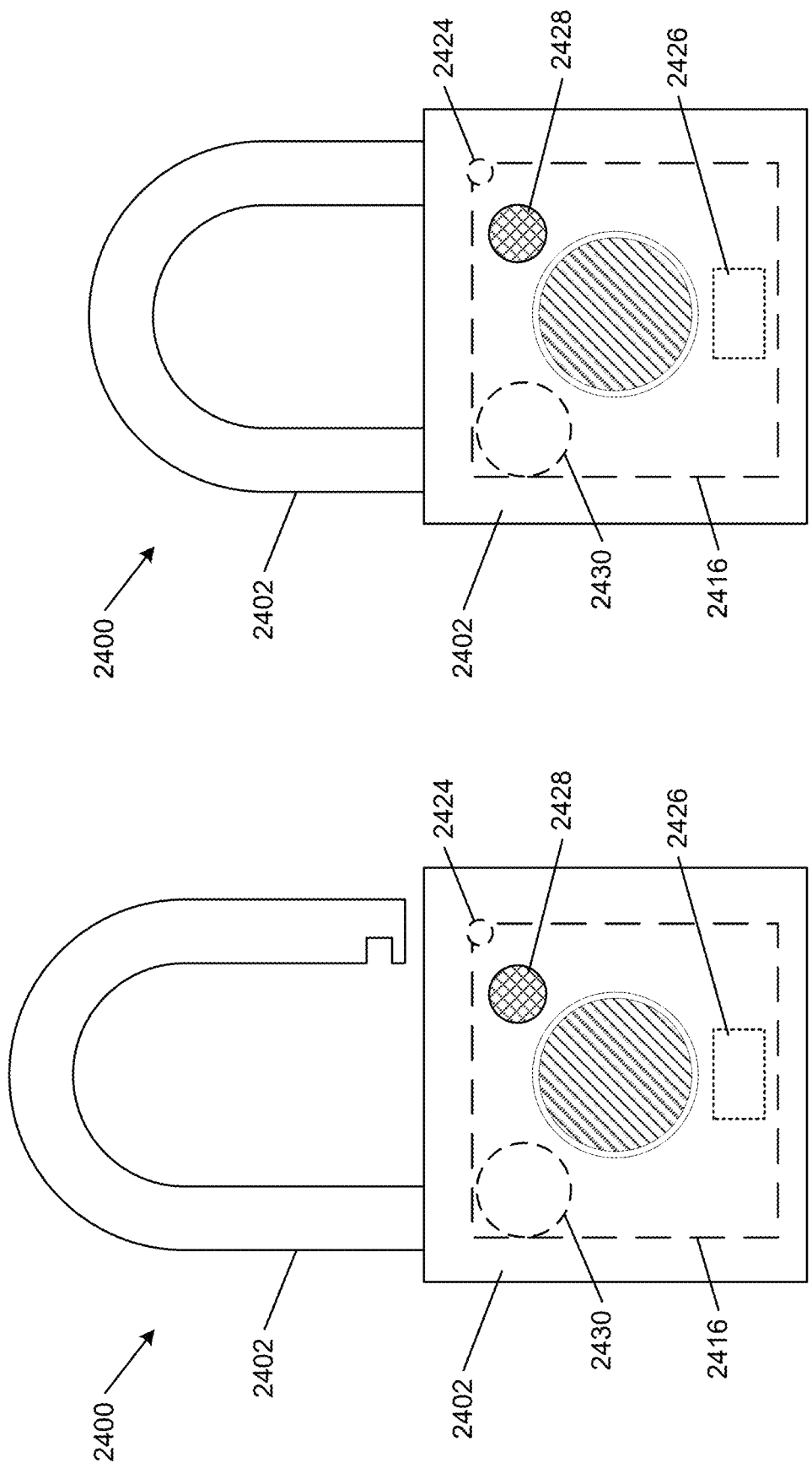
FIGS. 24A and 24B are schematic diagrams illustrating one example smart padlock that is button-operated that is shown in open and closed states, respectively, in embodiments.

FIGS. 24A and 24B are schematic diagrams illustrating one example smart padlock 2400 that is button-operated that is shown in open and closed states, respectively. Smart padlock 2400 may also be referred to as wireless tracking device 2400. Smart padlock 2400 is similar to smart padlock 2300 of FIGS. 23A and 23B, but instead of being key operated, smart padlock 2400 is opened by a button 2406.

Smart padlock 2400 includes a body portion 2402 and a shackle 2404 that is secured in the closed state by a locking mechanism (not shown) operated by a button 2406. Closing of smart padlock 2400 is similar to conventional padlocks, but no key or combination is required for opening smart padlock 2400. Instead, pressing button 2406 opens smart padlock 2400. That is, anyone mat press the button to open smart padlock 2400. However, unlike conventional padlocks, body portion 2402 further includes a wireless transducing circuit 2416 (e.g., similar to wireless transducing circuit 410 of FIGS. 4 and 20B) that includes a detector 2424 positioned within body portion 2402 to detect when shackle 2404 is locked closed. In one embodiment, detector 2424 is a light sensor that detects ambient light when shackle 2404 is open and detects no light when shackle 2404 is locked closed. In another embodiment, detector 2424 is a magnetic sensor (e.g., hall effect sensor) that detects when shackle 2404 is open or locked closed. In another embodiment, detector 2424 is an inductive sensor (e.g., a coil where its inductance changes due to proximity of shackle 2404) that detects when shackle 2404 is open or locked closed. Wireless transducing circuit 2416 may also include at least one motion sensor 2426 (e.g., accelerometer, gyroscope, etc.) that detects movement of smart padlock 2400.

Wireless transducing circuit 2416 may also include an indicator 2428 (e.g., an LED or other type of display) that is controlled to indicate an operational status of smart padlock 2400. For example, wireless transducing circuit 2416 may cause indicator 2428 to flash when detector 2424 detects that shackle 2404 closes, and thereafter may cause indicator 2428 to flash at intervals to indicate normal operation of smart padlock 2400. Wireless transducing circuit 2416 may cause indicator 2428 to flash repeatedly when detector 2424 or motion sensor 2426 detects tampering with smart padlock 2400 or when shackle 2404 opens. Wireless transducing circuit 2416 may also include a speaker 2430 that may be controlled to emit audio (e.g., beeps, alarm sounds, etc.) indicative of operation of smart padlock 2400. For example, wireless transducing circuit 2416 may cause speaker 2430 to beep twice when detector 2424 detects shackle 2404 closing, and thereafter may beep at intervals to indicate normal operation of smart padlock 2400. Wireless transducing circuit 2416 may cause speaker 2430 to beep repeatedly or output an alarm sound when detector 2424 or motion sensor 2426 detects tampering with smart padlock 2400 or when shackle 2404 opens.

As described above with reference to FIG. 4, wireless transducing circuit 2416 may include one or more wireless communication modules 412, 414 that allow smart padlock 2400 to communicate with wireless tracking system 700 of FIG. 7. Accordingly, wireless transducing circuit 2416 may communicate its operational status at intervals and may communicate events, such as when detector 2424 detects shackle 2404 closing, when tampering is detected by either detector 2424 or motion sensor 2426, and when shackle 2404 opens. As described above for wireless transducing circuit 410, wireless transducing circuit 2416 may include other components without departing from the scope hereof. Similarly, certain components of wireless transducing circuit 410 that are not required within smart padlock 2400 may be omitted.

Advantageously, smart padlock 2400 may be used for lock-out tag-out purposes as described below with reference to FIGS. 30-37.

Figure 25:
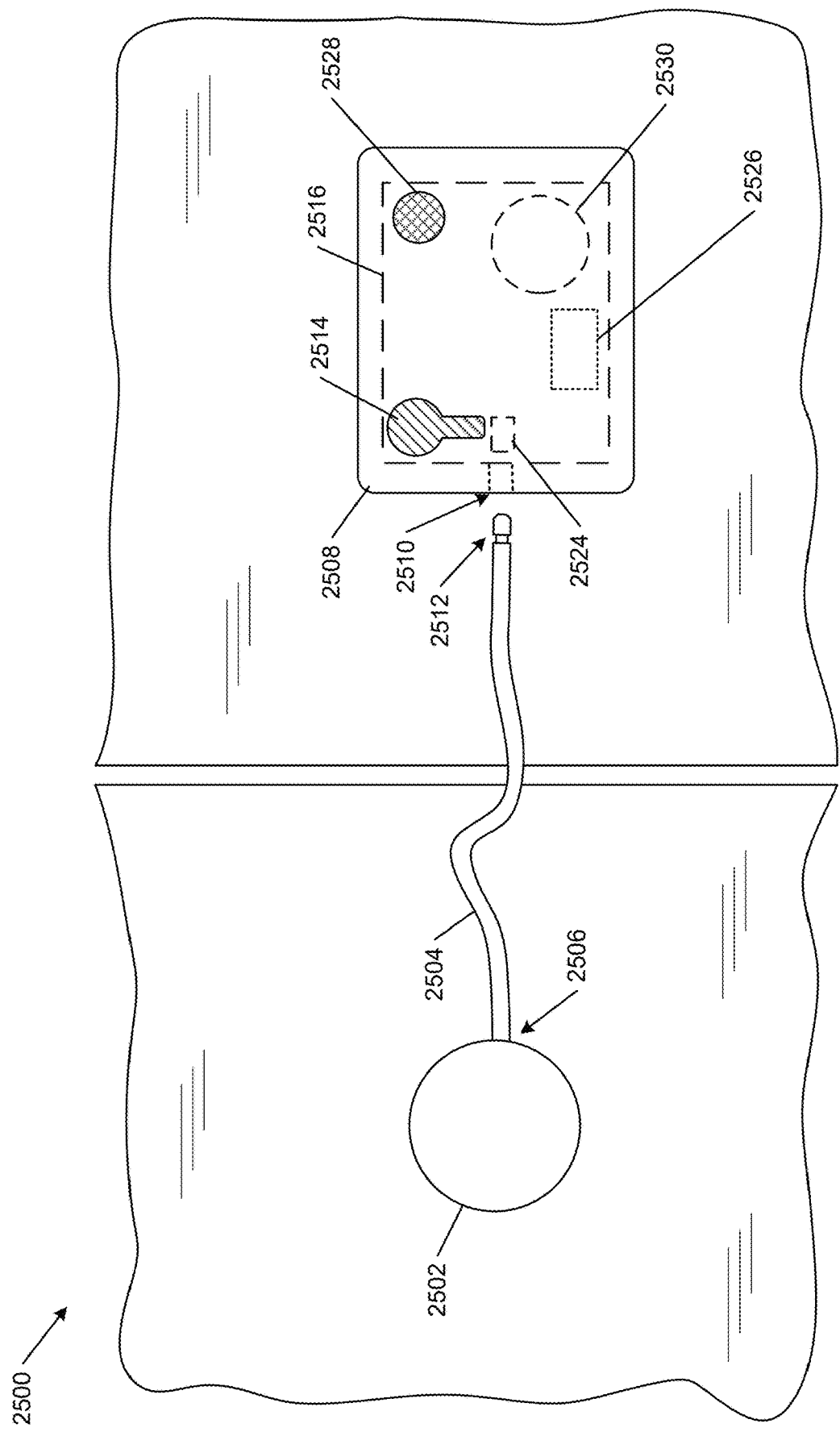
FIG. 25 is a schematic diagram illustrating one example smart two-part cable lock for coupling two objects together, in embodiments.

FIG. 25 is a schematic diagram illustrating one example smart two-part cable lock 2500 for coupling two objects together. Smart two-part cable lock 25 may also be referred to as wireless tracking device 2500. In one example, the two objects are two adjacent doors, such as on a refrigerator or two French patio doors, that smart two-part cable lock 2500 prevents from opening. In another example, the two objects are a door and a side panel, such as a cupboard, control panel, or toolchest, that smart two-part cable lock 2500 prevents from opening.

Smart two-part cable lock 2500 includes a first portion 2502 that attaches to the first object, a cable 2504 fixedly attached at one end 2506 to the first portion 2502, and a main body 2508 that attaches to the second object and has a receptacle 2510 to receive an open end 2512 of cable 2504. Main portion 2508 includes a locking mechanism (not shown) that secures open end 2512 within receptacle 2510. Main portion 2508 is also shown with a keyhole 2514 for receiving a key to open the locking mechanism and release open end 2512 from receptacle 2510. In other embodiments, main portion 2508 may include other mechanisms for opening the locking mechanism to release open end 2512 from receptacle 2510. In one example, main portion 2508 includes a combination lock, whereby setting the correct combination and pressing a button opens the locking mechanism to release open end 2512 from receptacle 2510. In another example, the locking mechanism is opened by a button, whereby anyone can press the button to open the locking mechanism to release open end 2512 from receptacle 2510.

Body portion 2502 further includes a wireless transducing circuit 2516 (e.g., similar to wireless transducing circuit 410 of FIGS. 4 and 20B) that includes a detector 2524 positioned within body portion 2502 to detect when open end 2512 of cable 2504 is captured by receptacle 2510. In one embodiment, detector 2524 is a light sensor that detects ambient light when open end 2512 is not captured by receptacle 2510 and detects no light when open end 2512 is captured by receptacle 2510. In another embodiment, detector 2524 is a magnetic sensor (e.g., hall effect sensor) that detects when open end 2512 is present within receptacle 2510. In another embodiment, detector 2524 is an inductive sensor (e.g., a coil where its inductance changes due to proximity of open end 2512) that detects when open end 2512 is captured by receptacle 2510. Wireless transducing circuit 2516 may also include at least one motion sensor 2526 (e.g., accelerometer, gyroscope, etc.) that detects movement of smart two-part cable lock 2500.

Wireless transducing circuit 2516 may also include an indicator 2528 (e.g., an LED or other type of display) that is controlled to indicate an operational status of smart two-part cable lock 2500. For example, wireless transducing circuit 2516 may cause indicator 2528 to flash when detector 2524 detects that open end 2512 is inserted into receptacle 2510, and thereafter may cause indicator 2528 to flash at intervals to indicate normal operation of smart two-part cable lock 2500. Wireless transducing circuit 2516 may cause indicator 2528 to flash repeatedly when detector 2524 or motion sensor 2526 detects tampering with smart two-part cable lock 2500 or when detector 2524 indicates that open end 2512 is released from receptacle 2510. Wireless transducing circuit 2516 may also include a speaker 2530 that may be controlled to emit audio (e.g., beeps, alarm sounds, etc.) indicative of operation of smart two-part cable lock 2500. For example, wireless transducing circuit 2516 may cause speaker 2530 to beep twice when detector 2524 detects that open end 2512 is inserted into receptacle 2510, and thereafter may beep at intervals to indicate normal operation of smart two-part cable lock 2500. Wireless transducing circuit 2516 may cause speaker 2530 to beep repeatedly or output an alarm sound when detector 2524 or motion sensor 2526 detects tampering with smart two-part cable lock 2500 or when detector 2524 indicates that open end 2512 is released from receptacle 2510.

As described above with reference to FIG. 4, wireless transducing circuit 2516 may include one or more wireless communication modules 412, 414 that allow smart two-part cable lock 2500 to communicate with wireless tracking system 700 of FIG. 7. Accordingly, wireless transducing circuit 2516 may communicate its operational status at intervals and may communicate events, such as when detector 2524 detects that open end 2512 is inserted into receptacle 2510, when tampering is detected by either detector 2524 or motion sensor 2526, and when detector 2524 indicates that open end 2512 is released from receptacle 2510. As described above for wireless transducing circuit 410, wireless transducing circuit 2516 may include other components without departing from the scope hereof. Similarly, certain components of wireless transducing circuit 410 that are not required within smart two-part cable lock 2500 may be omitted.

Advantageously, smart two-part cable lock 2500 may be used for lock-out tag-out purposes as described below with reference to FIGS. 30-37.

Figure 26:
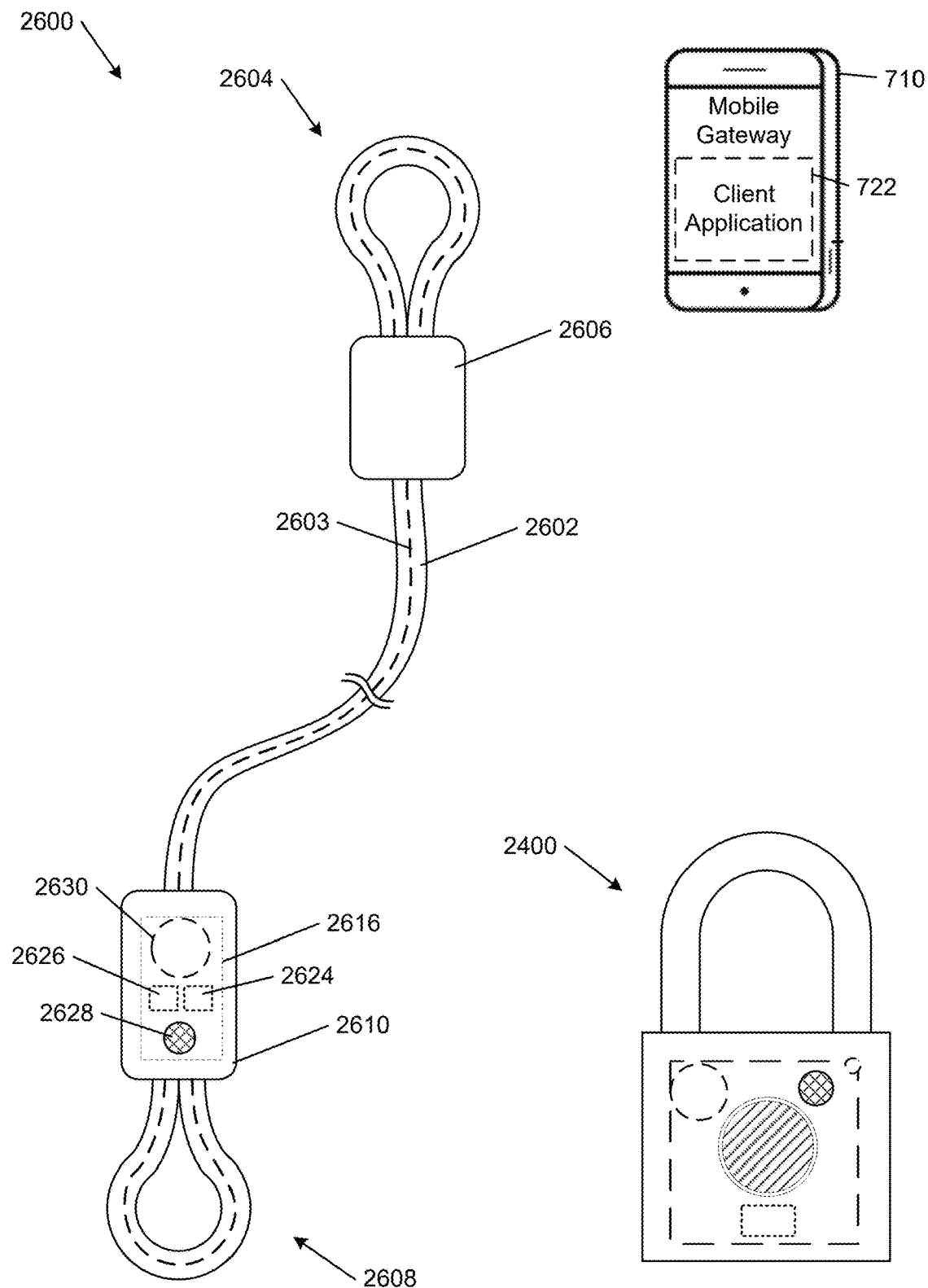
FIG. 26 is a schematic diagram illustrating one example smart cable, in embodiments.

FIG. 26 is a schematic diagram illustrating one example smart cable 2600. Smart cable 2600 may also be referred to as wireless tracking device 2600. Smart cable 2600 includes a cable 2602 with two loops 2602, 2604 formed at opposite ends of cable 2602. In the example shown, loop 2604 is formed by clamping an end of cable 2602 to itself using a clamp 2606, and loop 2608 is formed by clamping the opposite end of cable 2602 to itself using a clamp 2610. Cable 2604 may be of any length and may be formed of a conductive material (e.g., multi-stranded steel). In embodiments where cable 2602 is non-conductive (e.g., a nylon rope), cable 2602 may include at least one conductive thread 2603.

In the example of FIG. 26, clamp 2610 also forms a housing for a wireless transducing circuit 2616 (e.g., similar to wireless transducing circuit 410 of FIGS. 4 and 20B) that includes a detector 2624 (e.g., an impedance detector, an inductance detector, a magnetic detector, etc.) that detects tampering of cable 2602, and may also include one or more of: a movement sensor 2626 (e.g., an accelerometer, gyroscope, etc.) an indicator 2628 (e.g., an LED), and a speaker 2630. As described above with reference to FIG. 4, wireless transducing circuit 2616 may include one or more wireless communication modules 412, 414 that allow smart cable 2600 to communicate with wireless tracking system 700 of FIG. 7. Accordingly, wireless transducing circuit 2616 may communicate its operational status at intervals and may communicate events, such as when detector 2624 detects tampering or when movement sensor 2626 detects movement indicative of tampering. As described above for wireless transducing circuit 410, wireless transducing circuit 2616 may include other components without departing from the scope hereof. Similarly, certain components of wireless transducing circuit 410 that are not required within smart cable 2600 may be omitted.

Detector 2624 electrically couples with cable 2602 (or thread 2603 if included) to detect changes in one or both of impedance and inductance that are indicative of tampering (e.g., cutting, shorting) with cable 2602. Sensor 2626 senses movement of clamp 2610, which may result from movement of cable 2602 that is indicative of tampering.

A user attaches smart cable 2600 to one or more objects/assets that are to be protected. For example, loop 2604 may be permanently attached to a first object, and second loop 2608 and clamp 2610 threaded through loop on a second object, and second loop 2608 is secured to a loop on a third object using a conventional padlock. In another example, cable 2602 is looped around an immovable object (e.g., a pole or fence) and then around an object (e.g., a bicycle) and then loops 2604 and 2608 are secured together using a conventional padlock.

The user activates smart cable 2600 through use of mobile gateway 710, whereby client application 722 may communicate with wireless transducing circuit 2616 to transition it into an active mode. In the active mode, wireless transducing circuit 2616 reads detector 2624, and movement sensor 2626 if included, to detect tampering with cable 2602 and/or loops 2604 and 2608. The user deactivates smart cable 2600 through use of mobile gateway 710.

When wireless transducing circuit 2616 detect tampering in the active mode, wireless transducing circuit 2616 transmits an alert to wireless tracking system 700 and/or to mobile gateway 710 when in range. Further, wireless transducing circuit 2616 may cause indicator 2628 to flash and/or cause speaker 2630 to output a beeping or alarm sound.

Smart cable 2600 may also be used with one or more of single-use smart security device 2100 of FIGS. 21A and 21B, smart padlock 2300 of FIGS. 23A and 23B and smart padlock 2400 of FIGS. 24A and 24B (illustratively shown in FIG. 26), whereby wireless transducing circuit 2616 wirelessly communicates with single-use smart security device 2100, smart padlock 2300, and/or smart padlock 2400 to increase security of the one or more objects being protected by smart cable 2600.

Figure 27:
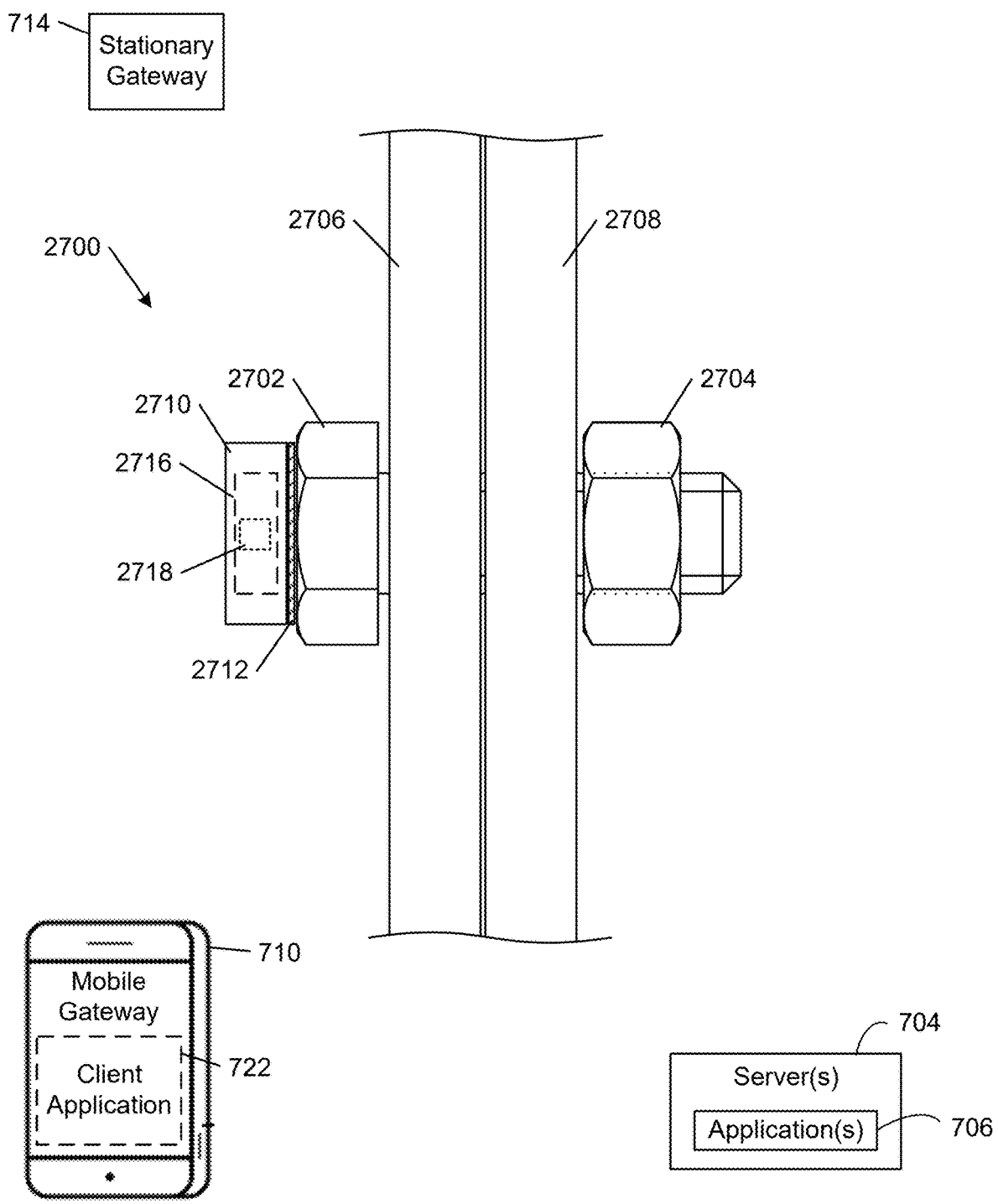
FIG. 27 is a schematic diagram illustrating one example stamp device attached to a bolt, in embodiments.

FIG. 27 is a schematic diagram illustrating one example stamp device 2700 attached to a bolt 2702. Stamp device 2700 may also be referred to as wireless tracking device 2700. In this example, bolt 2702 and nut 2704 are used to secure plates 2706 and 2708 together to prevent plate 2706 rotating relative to plate 2708. However, in other embodiments, bolt 2702 and nut 2704 may be used to fasten other items together, such as fastening an object to a structure and/or fastening other objects together. Stamp device 2700 includes a housing 2710 with a wireless transducing circuit 2716 (e.g., similar to wireless transducing circuit 410 of FIGS. 4 and 20B) and an adhesive 2712 that fixedly attaches housing 2710 to a head of bolt 2702. In other embodiments, housing 2702 may be formed (e.g., molded) to mechanically couple with the head of bolt 2702 such that it snaps on to the head and is retained thereon by friction.

Wireless transducing circuit 2716 includes one or more sensors 2718 (e.g., accelerometers, gyroscopes, magnetometers, etc.) for sensing orientation of stamp device 2700. Accordingly, stamp device 2700 may detect when bolt 2702 rotates, indicating that it has become loose, which may be as a result of tampering. As described above with reference to FIG. 4, wireless transducing circuit 2716 may include one or more wireless communication modules 412, 414 that allow stamp device 2700 to communicate with wireless tracking system 700 of FIG. 7. Accordingly, wireless transducing circuit 2716 may communicate its operational status at intervals and may communicate events, such as when detector 2724 indicates rotation indicative of bolt 2702 becoming loose. As described above for wireless transducing circuit 410, wireless transducing circuit 2716 may include other components without departing from the scope hereof. Similarly, certain components of wireless transducing circuit 410 that are not required within stamp device 2700 may be omitted.

In one example of operation, a user passes bolt 2702 through plates 2706 and 2708 and secures the pates together by tightening nut 2704. The user then attaches stamp device 2700 to the head of bolt 2702 and uses mobile gateway 710 to activate wireless transducing circuit 2716. Upon activation, wireless transducing circuit 2716 reads sensor 2718 to determine and store an initial orientation of stamp device 2700. At intervals, wireless transducing circuit 2716 reads sensor 2718 to determine a current orientation of stamp device 2700 and compares the current orientation with the stored orientation to determine whether orientation of stamp device 2700 has changed, which is indicative of bolt 2702 having turned. When the current orientation of stamp device 2700 has changed, wireless transducing circuit 2716 sends a message to one or more of mobile gateway 710 (if within range), a stationary gateway 714 and/or server 704 to indicate that bolt 2702 is loose. Advantageously, through wireless tracking system 700 and use of stamp device 2700, the user is warned when bolt 2702 becomes loose, such as through wear or when someone has tampered with bolt 2702.

Stamp device 2700 may also be applied to control knobs that are used to controls equipment. For example, a control panel may use a knob to set a control parameter for a machine. Advantageously, stamp device 2700 may be adhered to the control knob to monitor and/or implement a lockout/tagout protocol for the control knob. In another example, stamp device 2700 may be adhered to a doorknob of a control room that is to remain closed during maintenance of a plant. Advantageously, stamp device 2700 may detect movement of the doorknob (e.g., turning, rattling, pushing, pulling) and provide a working of a breach in lockout/tagout protocol.

Figure 28A:
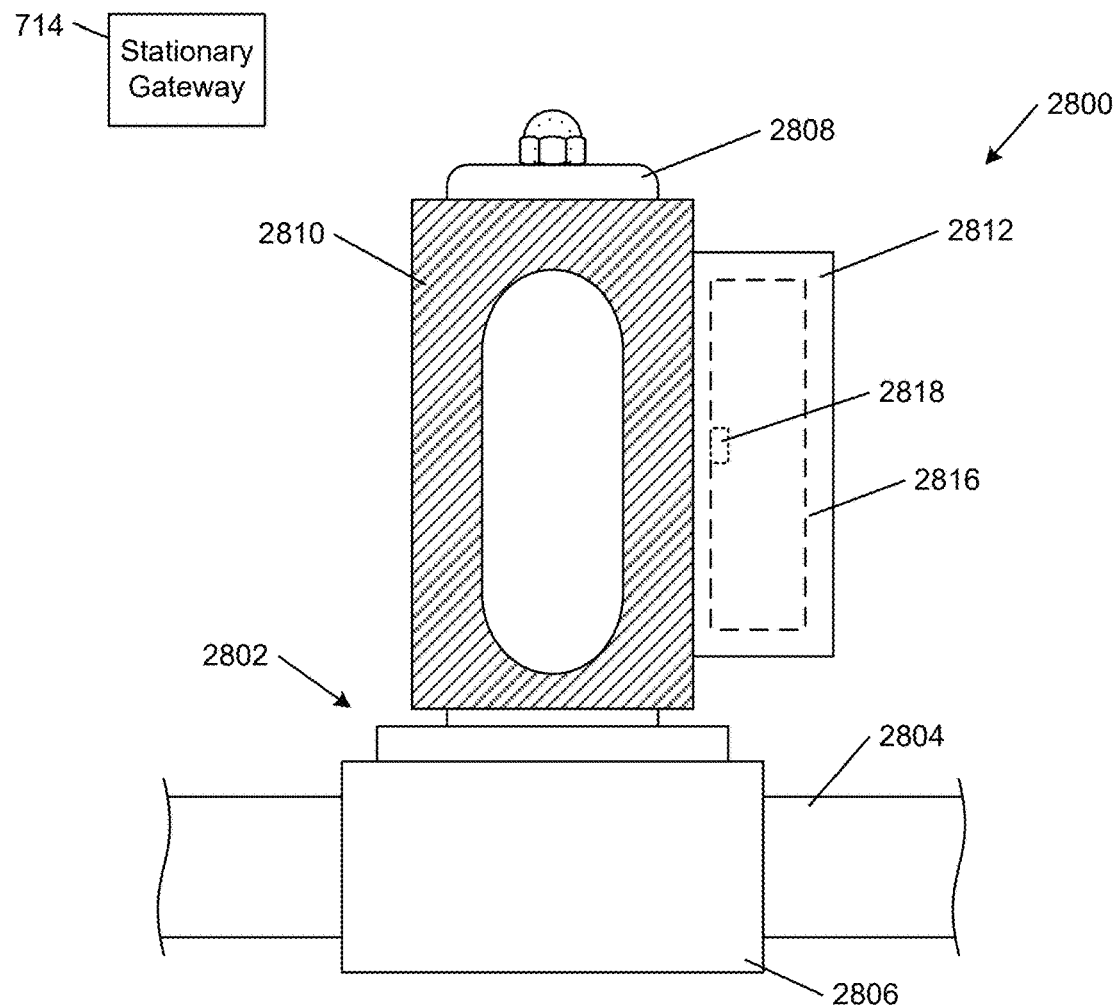
FIGS. 28A and 28B are schematic diagrams illustrating one example magnetic valve monitoring device, in embodiments.
Figure 28B:
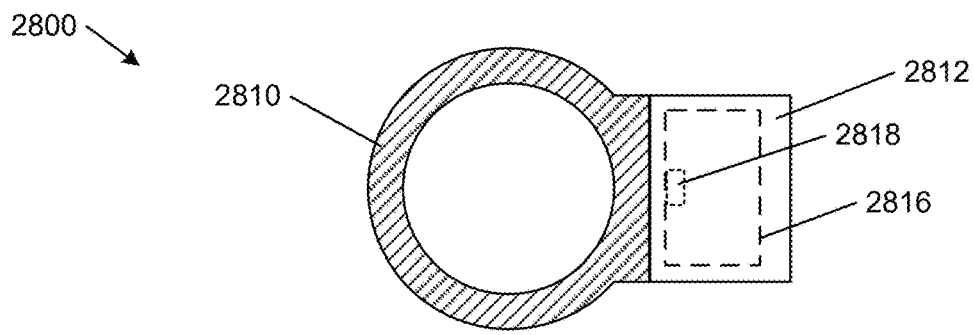

FIGS. 28A and 28B are schematic diagrams illustrating one example magnetic valve monitoring device 2800. Magnetic valve monitoring device 2800 may also be referred to as wireless tracking device 2800. A magnetically controlled valve 2802 is positioned in a pipe 2804 to control flow of a fluid through pipe 2804. Valve 2802 includes base portion 2806 that couples with pipe 2804 and a barrel 2808 that includes a solenoid for operating a valve within base portion 2806.

Magnetic valve monitoring device 2800 includes a sleeve 2810 that is sized and shaped to slide over barrel 2808 and be retained by friction. Sleeve 2810 may couple with a housing 2812 that contains a wireless transducing circuit 2816 (e.g., similar to wireless transducing circuit 410 of FIGS. 4 and 20B). In certain embodiments, sleeve 2810 and housing 2812 are formed as one component (e.g., a molding or 3D printed). Wireless transducing circuit 2816 includes a detector 2818 (e.g., a magnetometer) that detects when the solenoid of valve 2802 is and is not energized. For example, the solenoid may be energized by an alternating current or a direct current that generates a magnetic field that is detected by detector 2818. Wireless transducing circuit 2816 reads detector 2818 at intervals to determine whether the solenoid is generating a magnetic field and sends a message to server 704 of wireless tracking system 700 (e.g., via stationary gateway 714) indicative of an operating state of valve 2802. Advantageously, magnetic valve monitoring device 2800 may be configured to monitor valve 2802 without requiring that valve be disconnected or dismantled. As shown in the example of FIG. 28, sleeve 2810 slides over barrel 2808 after valve 2802 is installed on pipe 2804.

Magnetic valve monitoring device 2800 may monitor other devices that are solenoid operated. For example, solenoid operated switches and locks may be monitored by magnetic valve monitoring device 2800. In certain embodiments, a cut circuit of wireless transducing circuit 1816 extends through sleeve 2810 and/or around other parts of valve 2802 such that attempts to manually control valve 1802 break the cut circuit and is detected by wireless transducing circuit 2816.

Magnetic valve monitoring device 2800 may also be used to monitor devices that are not solenoid operated but include magnetic parts that are used to control settings of the devices. For example, the position of a magnetic lockable ball valve, which uses a magnetic part to manipulate a ball that controls the flow of liquid or gas through the valve, may be monitored based on sensing the magnetic field from the magnetic parts of the valve. In this example, the control for the ball valve may be manually actuated to change the setting of the valve, with the magnetic field of the parts being affected by the actuation. The magnetic valve monitoring device 2800 may detect the setting and the changes in the setting based on detecting the magnetic field, and/or changes to the magnetic field, from one or more magnetic parts in the ball valve.

Figure 29:
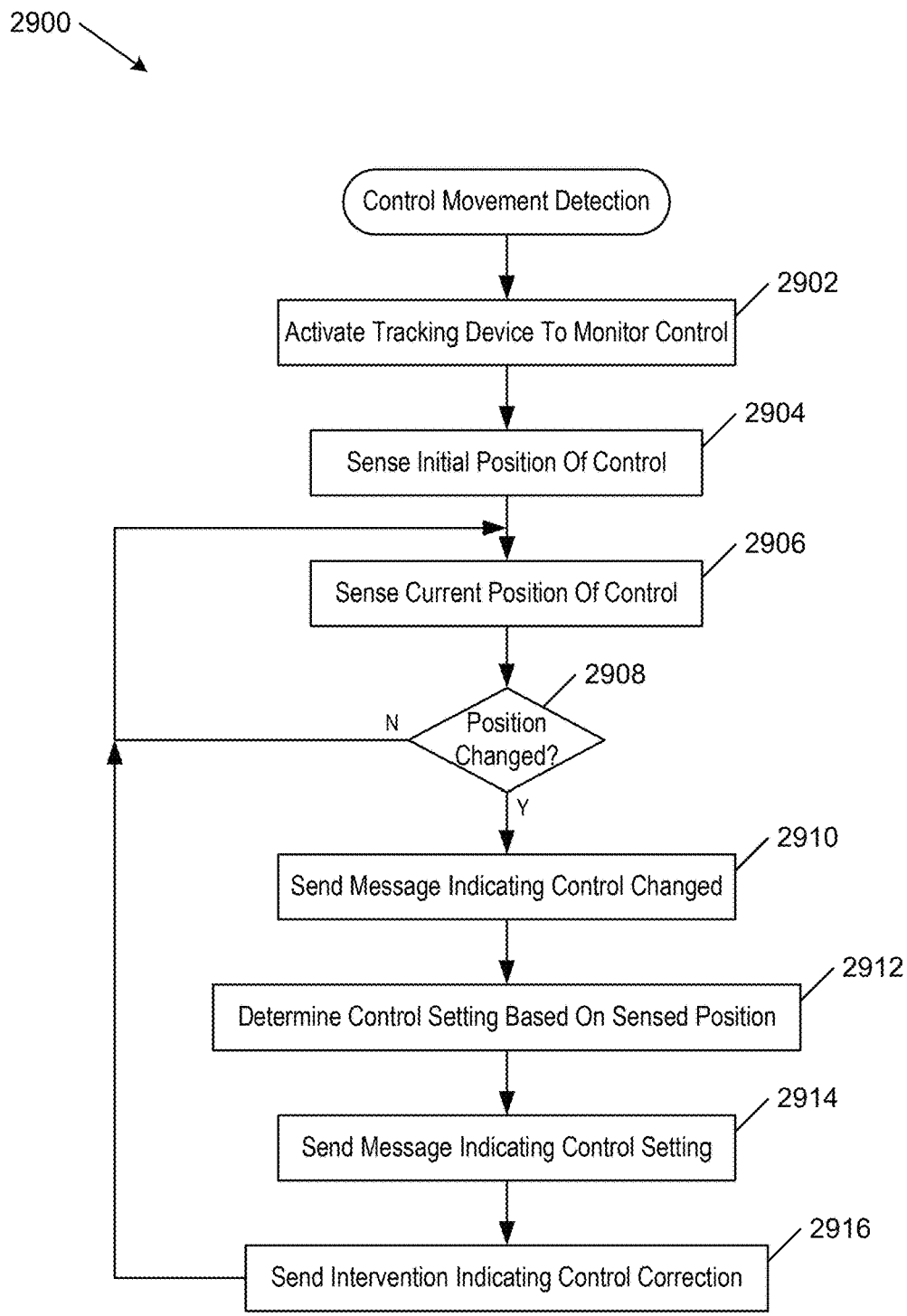
FIG. 29 is a flowchart illustrating one example method for sensing movement of a control for equipment, in embodiments.

FIG. 29 is a flowchart illustrating one example method 2900 for sensing movement of a control for equipment. Method 2900 is for example implemented, at least in part within any of wireless tracking devices 1402, 1502, 1702, 1802, 2020, 2100, 2200, 2300, 2400, 2500, 2600, 2700, and 2800 of FIGS. 14A and 14B, 15, 16, 17, 18, 20, 21A and 21B, 22, 23A and 23B, 24A and 24B, 25, 26, 27, 28A and 28B, respectively.

In block 2902, a wireless tracking device is activated to monitor a control. For example, wireless tracking device 1402, attached to valve handle 1404, is initialized by mobile gateway 710 to monitor valve handle 1404. In another example, wireless tracking device 1402(1), attached to control lever 1604(1), is initialized by mobile gateway 710 to monitor control lever 1604(1). In another example, wireless tracking device 1802 is mounted to control panel 1808 and cord 1806 is attached to lever 1810 to monitor lever 1810. In block 2904, an initial position of the control is sensed. In one example, wireless tracking device 1402 determines its current orientation relative to the Earth and stores the orientation in its memory as being representative of an initial position of valve handle 1404. In another example, wireless tracking device 1402(1) determines its distance from stationary gateway 714, using time of flight, and stores the distance as being representative of a position of lever 1604(1). In another example, wireless tracking device 1802 determines a length of cord 1806 extracted from spool 1804 as representing a position of lever 1810.

Blocks 2906 and 2908 repeat at intervals. Example intervals include one second, ten seconds, one minute, five minutes, one hour, one day, or any other interval suitable to the control being monitored and/or the needs of the user. In certain embodiments, where a longer battery life is more important than detecting change in position of the control, a longer interval (e.g., one day, multiple days, one week, etc.) is selected. In block 2906, the position of the control is sensed. For example, wireless tracking device 1402 determines its current orientation relative to the Earth. In another example, wireless tracking device 1402(1) uses time of flight to determine its distance from stationary gateway 714. In another example, wireless tracking device 1802 determines, based on tracking rotation of spool 1804, a change in position of lever 1810. Block 2908 is a decision. If, in block 2908, method 2900 determines that the position of the control has changed, relative to the initial position stored in memory, method 2900 continues with block 2910; otherwise, method 2900 continues with block 2906 at the subsequent interval. In other embodiments, blocks 2906 and 2908 detect change in position and/or orientation of wireless tracking device 1402 over time. For example, where sensor 1434 indicate movement, blocks 2906 and 2908 may integrate the movement to determine a change in position and/or setting of the control. That is, sensor 1434 may sense velocity or acceleration rather than absolute position. For example, wireless tracking device 1402 may sense a change in current, impedance, inductance, light exposure, or other sensed characteristic, that indicates change in the control and/or a setting of the equipment.

In block 2910, the wireless tracking device sends a message indicating that the control has changed position. For example, wireless tracking device 1402 sends alert/notification 1413(1) to mobile gateway 710 indicating that valve handle 1404 has been moved. In another example, wireless tracking device 1402(1) sends a message to server 704 indicating that lever 1604(1) has been moved. In another example, wireless tracking device 1802 sends a message to mobile gateway 710, via stationary gateway 714, indicating that lever 1810 has changed position.

Blocks 2912 and 2914 are optional. If included, in block 2912, a control setting based on the sensed position is determined. For example, wireless tracking device 1402 determines a setting of valve 1406 based on a difference between a current orientation and the stored orientation. In another example, wireless tracking device 1402(1) determines a setting of control panel 1606 based on a difference between a current distance from stationary gateway 714 and a previously stored distance. In another example, wireless tracking device 1802 determines a setting change of control panel 1808 based on a difference in the amount of cord 1806 extracted from spool 1804 as compared to the stored amount of cord 1806 extracted from spool 1804. If included, in block 2914, a message indicating the control setting is sent. For example, wireless tracking device 1402 sends alert/notification 1413(2) to server 704 indicating a current setting of valve 1406. In another example, wireless tracking device 1402(1) sends a message to server 704 indicating a setting of control panel 1606. In another example, wireless tracking device 1802 sends a message to mobile gateway 710, via stationary gateway 714, indicating a setting of control panel 1808.

Block 2916 is optional. If included, in block 2916, an intervention indicating a control correction is sent. In one example of block 2916, wireless tracking device 1402(1) sends intervention information 1900 of FIG. 19 to mobile gateway 710. Method 2900 may then return to block 2906 to continue monitoring the control.

Lockout/Tagout

The Occupational Safety and Health Administration (OSHA) indicates that lockout/tagout" refers to specific practices and procedures to safeguard employees from the unexpected energization or startup of machinery and equipment, or the release of hazardous energy during service or maintenance activities. This requires, in part, that a designated individual turns off and disconnects the machinery or equipment from its energy source(s) before performing service or maintenance and that the authorized employee(s) either lock or tag the energy-isolating device(s) to prevent the release of hazardous energy and take steps to verify that the energy has been isolated effectively. If the potential exists for the release of hazardous stored energy or for the re-accumulation of stored energy to a hazardous level, the employer must ensure that the employee(s) take steps to prevent injury that may result from the release of the stored energy. Lockout devices hold energy-isolation devices in a safe or "off" position. They provide protection by preventing machines or equipment from becoming energized because they are positive restraints that no one can remove without a key or other unlocking mechanism, or through extraordinary means, such as bolt cutters. Tagout devices, by contrast, are prominent warning devices that an authorized employee fastens to energy-isolating devices to warn employees not to reenergize the machine while he or she services or maintains it. Tagout devices are easier to remove and, by themselves, provide employees with less protection than do lockout devices. Other form factors for lockout and tagout devices may be used without departing from the scope hereof. For example, any of the above-described segments 113 (FIGS. 1 and 2), segments 502, 504 (FIG. 5), segments 640, 670, 680 (FIGS. 6A, 6B, and 6C), tape nodes of FIGS. 7-12, wireless tracking device 1402 (FIGS. 14A, 14B and 16), wireless tracking device 1502 (FIG. 15), wireless tracking device 1702 (FIG. 17), wireless tracking device 1802 (FIG. 18), wireless tracking belt 2020 (FIG. 20A), single-use smart security device 2100 (FIGS. 21A and 21B), wireless cable-locking device 2200 (FIG. 22), smart padlock 2300 (FIGS. 23A and 23B), and smart padlock 2400 (FIGS. 24A and 24B), smart cable 2600 (FIG. 26), stamp device 2700 (FIG. 27), and magnetic valve monitoring device 2800 (FIG. 28) may be used in conjunction with non-smart/conventional lockout tagout accessories to implement a wireless-enabled lockout tagout procedure. For example, any of wireless tracking device 1402, spool based wireless tracking device 1802 and smart stamp 2700 may be used to monitor/detect/alert for specific changes or operations that occur during a lockout tagout time period and may be used with a conventional lock or tag being used to indicate the lockout tagout time period and intervene with operations. These devices may also be used in conjunction with other smart lockout tagout device described above, such as the wireless tracking belt, the adhesive tape or the smart locks.

Figure 30:
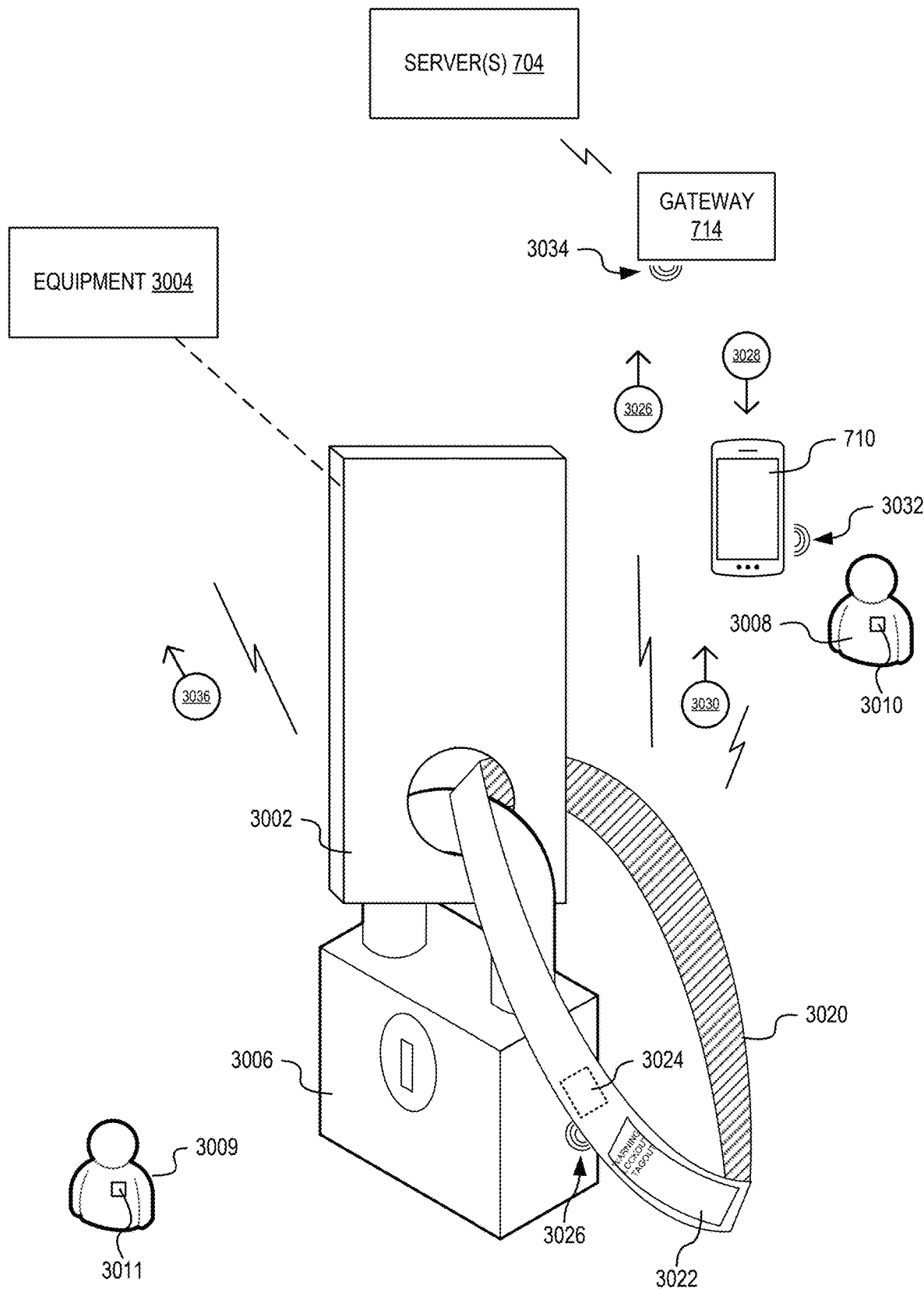
FIG. 30 is a schematic diagram illustrating example use of a smart wireless tracking belt to monitor and/or implement a lockout/tagout protocol, in embodiments.

FIG. 30 is a schematic diagram illustrating example use of a smart wireless tracking belt 3020 to monitor and/or implement a lockout/tagout protocol. Smart wireless tracking belt 3020 may represent smart wireless tracking belt 2020 of FIG. 20A.

A physical lockout control 3002 implements a lockout/tagout of an equipment 3004. For example, equipment 3004 may represent a machine in a factory that is scheduled for maintenance, and physical lockout control 3002 is coupled with a power switch of equipment 3004 that may be physically blocked using a padlock 3006 to prevent inadvertent activation of equipment 3004, as part of an OSHA safety protocol. Other types of physical lockout control 3002 and locking devices may be used without departing from the scope hereof. For example, authorized personnel 3008 (e.g., a service engineer performing the maintenance or an authorized supervisor thereof) applies padlock 3006 when equipment 3004 is deactivated to ensure that equipment 3004 cannot be reactivated by anyone other than authorized personnel 3008 (e.g., the service engineer using a key to unlock padlock 3006 when maintenance is complete and equipment 3004 may be reactivated). Although described for use with the OSHA safety protocol, smart wireless tracking belt 3020 and the described operation may be used without following the OSHA safety protocol and/or without the use of padlock 3006, whereby smart wireless tracking belt 3020 detects manipulation and/or attempted operation of equipment 3004 while such manipulation and/or operation is undesired (e.g., access is restricted). For example, physical lockout control 3002 may represent any physical control lever of equipment 3004, whereby smart wireless tracking belt 3020 detects and reports movement of, or tampering with, physical control lever.

As shown in FIG. 30, smart wireless tracking belt 3020 is looped through physical lockout control 3002, as is padlock 3006, and fastened on itself as described above. However, as illustrated by FIGS. 28 and 29, smart wireless tracking belt 3020 may operate without padlock 3006. In one example of operation, authorized personnel 3008 uses mobile gateway 710 to assign and/or associate smart wireless tracking belt 3020 with one or both of physical lockout control 3002 and equipment 3004, and then applies smart wireless tracking belt 3020 to physical lockout control 3002 when preparing and securing equipment 3004 for maintenance.

When fastening is detected, smart wireless tracking belt 3020 initiates and reads, at intervals, one or more sensors 3024, including an accelerometer, within smart wireless tracking belt 3020 and processes the accelerometer data to detect a settling period (e.g., 10 seconds) of inactivity (e.g., no movement of smart wireless tracking belt 3020 that indicates that deployment of smart wireless tracking belt 3020 is complete). After detecting the first settling period of inactivity, smart wireless tracking belt 3020 transitions to a monitoring/tampering detect mode, whereby any significant movement detected by sensors 3024 causes smart wireless tracking belt 3020 to transmit a wireless message indicative of detected movement (e.g., caused by tampering with physical lockout control 3002 and/or padlock 3006) to one or both of stationary gateway 714 (see FIG. 7) and/or mobile gateway 710. For example, smart wireless tracking belt 3020 may transmit a notification to server 704 of tracking system 700, either directly using a long range wireless communication system (e.g., cellular or satellite communications)

onboard the smart wireless tracking belt or indirectly by transmitting the notification to a gateway node or another wireless node using an onboard short range or medium range wireless communication system (e.g., BLE or LoRa) and the gateway node or other wireless node relays the notification to server 704.

Smart wireless tracking belt 3020 may also include a warning display 3022 that may indicate the purpose of smart wireless tracking belt 3020 being used with the lockout/tagout protocol and may also indicate who is authorized to unfasten and remove smart wireless tracking belt 3020. For example, warning display 3022 may warns unauthorized users not to remove smart wireless tracking belt 3020, and not to change the state of, or operate, equipment 3004. In certain embodiments, warning display 3022 is a message and/or graphics printed on smart tracking device 3020. In other embodiments, warning display 3022 is an electronic display (e.g., an LED, an LED panel, another light emitting element, an electronic paper display, an OLED display, an LCD display, or some other type of display). Warning display 3022 may operate similarly to status display 2008 of FIG. 20A. In certain embodiments, smart wireless tracking belt 3020 also includes an audio device (e.g., a speaker) for outputting an audio alert 3026 such as an alarm sound and/or a spoken message when smart wireless tracking belt 3020 is moved and/or unfastened.

In certain embodiments, smart wireless tracking belt 3020 transmits wireless message 3026 indicative of detected movement to server(s) 704 via stationary gateway 714, and in response to message 3026 and verifying the assignment and activation of smart wireless tracking belt 3020, server(s) 704 sends an alert 3028 to mobile gateway 710, via stationary gateway 714. Mobile gateway 710 notifies authorized personnel 3008 of potential tampering with physical lockout control 3002 in response to alert 3028. In another example of operation, smart wireless tracking belt 3020 transmits wireless message 3030 indicative of detected movement directly to mobile gateway 710, when in range, or via gateway 714 when mobile gateway 710 is not in range. Advantageously, authorized personnel 3008 is alerted (e.g., via a sound 3032) to a potentially dangerous situation of someone trying to activate equipment 3004 while maintenance is taking place. In certain embodiments, wireless message 3026 may cause gateway 714, when in proximity of equipment 3004, to emit an alarm (e.g., a sound 3034) to warn of unauthorized tampering with physical lockout control 3002.

In certain embodiments, smart wireless tracking belt 3036 transmits wireless message 3036 indicative of detected movement to equipment 3004 (e.g., when equipment 3004 is smart and incudes a wireless receiver), whereby equipment 3004 may initiate further lockout and/or shutdown actions to prevent unwanted operation of equipment 3004.

When padlock 3006 is to be removed (e.g., when maintenance is complete and equipment 3004 may be reactivated), authorized personnel 3008 uses mobile gateway to deactivate smart wireless tracking belt 3020, removes smart wireless tracking belt 3020 after unfastening it, and then unlocks padlock 3006 if used. In certain embodiments, when smart wireless tracking belt 3020 detects proximity of a smart badge 3010 (e.g., a wireless enabled badge that transmits a unique ID) and/or a client device (e.g., mobile gateway 710 that transmits a unique ID) that indicates (e.g., based on the unique ID identifying a person authorized to remove smart wireless tracking belt 3020 and/or padlock 3006) authority to remove smart wireless tracking belt 3020 and/or padlock 3006, smart wireless tracking belt 3020 may transition to a deactivated mode, whereby events of the detected movement and/or unfastening are send to server(s) 704 together with the unique ID indicating authorization, and therefore no alarm is generated.

In certain embodiments, when smart wireless tracking belt 3020 detects unexpected movement or is unexpectedly unfastened, smart wireless tracking belt 3020 captures a unique identifier from a nearby smart badge 3011 of a nearby person 3009 who is unauthorized to open smart wireless tracking belt 3020. Smart wireless tracking belt 3020 may then include the unique ID within a notification and/or alert sent by smart wireless tracking belt 3020 to tracking system 700.

In certain embodiments, padlock 3006 may represent any one of: single-use smart security device 2100 of FIGS. 21A and 21B, wireless cable-locking device 2200 of FIG. 22, smart padlock 2300 of FIGS. 23A and 23B, and smart padlock 2400 of FIGS. 24A and 24B, respectively. For example, any of single-use smart security device 2100, wireless cable-locking device 2200, smart padlock 2300, and smart padlock 2400 may collaborate with smart wireless tracking belt 3020 to increase reliability and sensitivity to detect movement.

Figure 31:
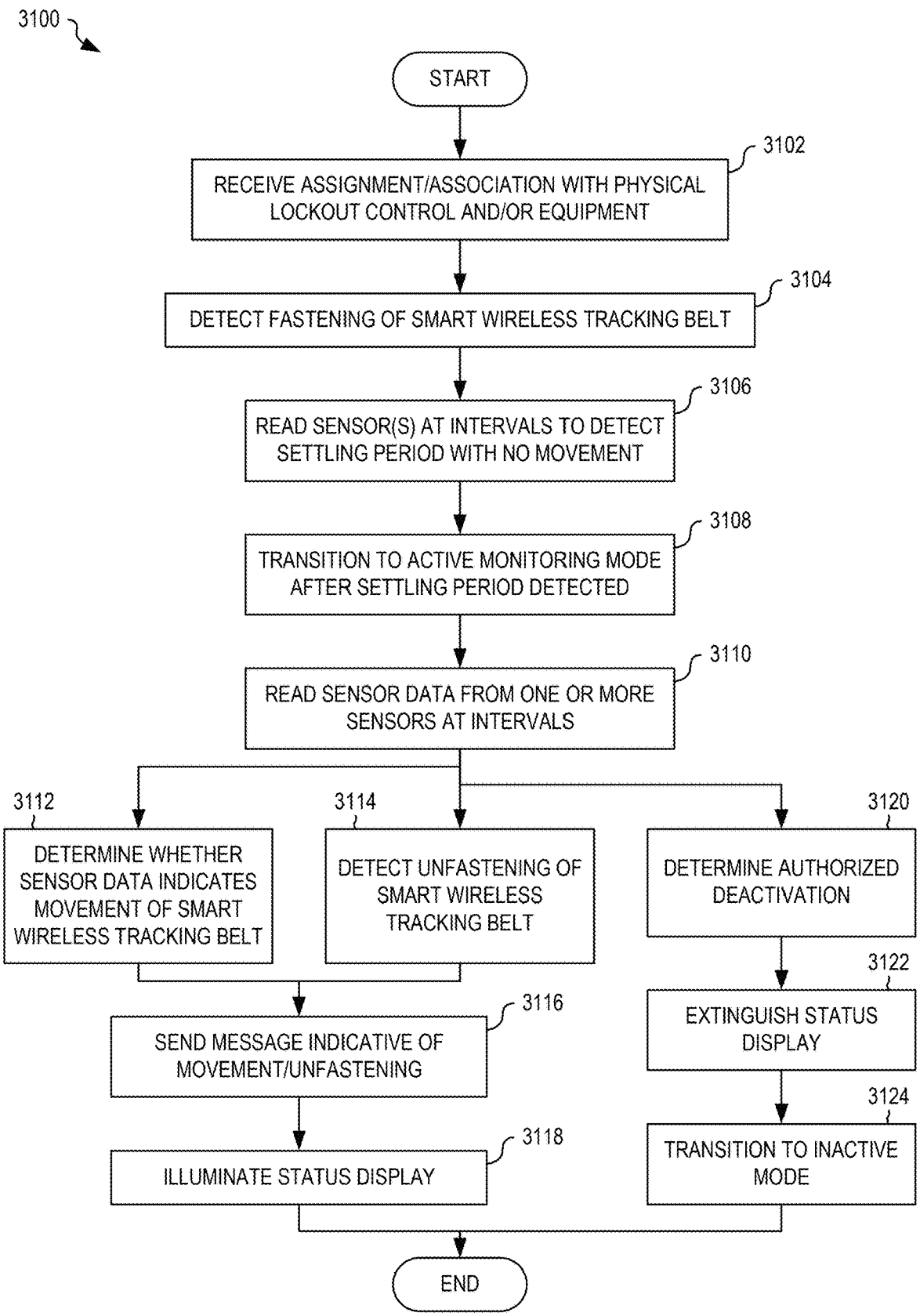
FIG. 31 is a flowchart illustrating one example method for implementing a lockout/tagout protocol using smart wireless tracking belt of FIG. 30, in embodiments.

FIG. 31 is a flowchart illustrating one example method 3100 for implementing a lockout/tagout protocol using smart wireless tracking belt 3020 of FIG. 30, in embodiments. Method 3100 is implemented, at least in part, by smart wireless tracking belt 3020.

In block 3102, method 3100 received assignment/association with physical lockout control and/or equipment. In one example of block 3102, smart wireless tracking belt 3020 receives a wireless communication associating it with at least one of physical lockout control 3002 and equipment 3004. For example, server(s) 704 may include a database for storing relationships between an ID of smart wireless tracking belt 3020 and an ID of physical lockout control 3002 and/or an ID of equipment 3004.

In block 3104, method 3100 detects fastening of smart wireless tracking belt 3020. In one example of block 3104, wireless transducing circuit 2010, as implemented within smart wireless tracking belt 3020, uses magnetic sensor 2006 to detect a fastening of smart wireless tracking belt 3020. In block 3106, method 3100 reads sensors at intervals to detect a settle period with no movement. In one example of block 3106, smart wireless tracking belt 3020 reads sensors 3024 and processes at least accelerometer data to detect a settling period of 10 seconds of inactivity that indicates deployment of smart wireless tracking belt 3020 is complete. In block 3108, method 3100 transitions to an active monitoring mode after the settling period is detected. In one example of block 3108, smart wireless tracking belt 3020 transitions to an armed mode in which detected movement indicates inadvertent tampering with smart wireless tracking belt 3020 or with padlock 3006. In certain embodiments, in one or both of blocks 3104 and 3108, smart wireless tracking belt 3020 logs the detected event and/or sends a wireless message indicative of a unique ID of smart wireless tracking belt 3020 and/or a current date and time, to server 704 and/or mobile gateway 710, to indicate the transition into the armed mode.

Blocks 3110 through 3118 repeat at intervals to detect movement and unfastening of smart wireless tracking belt 3020. In block 3110, method 3100 reads sensor data from one or more sensors at intervals. In one example of block 3110, smart wireless tracking belt 3020 reads sensor data from sensors 3024 and magnetic sensor 2006 at intervals.

Blocks 3112, 3114 and 3120 may occur substantially in parallel. In block 3112, method 3100 determines whether sensor data captured in step indicates movement of the smart wireless tracking belt. In one example of block 3112, wireless transducing circuit 2010 processes at least accelerometer data of the sensor data read in block 3110 to determine whether smart wireless tracking belt 3020 is being moved. In block 3114, method 3100 detects unfastening of the smart wireless tracking belt. In one example of block 3124, wireless transducing circuit 2010 processes at least sensor data read from magnetic sensor 2006 in block 3110 to determine whether smart wireless tracking belt 3020 is unfastened.

In block 3116, method 3100 sends a message indicating detected movement and/or unfastening. In one example of block 3116, smart wireless tracking belt 3020 sends message 3026, indicative of detected movement with the unique ID of smart wireless tracking belt 3020 and a current date and time, to server 704 via gateway 714. In another example of block 3116, method 3100 sends message 3030, indicating detected unfastening with the unique ID of smart wireless tracking belt 3020 and a current date and time, to mobile gateway 710. In block 3118, method 3100 illuminates the status display. In one example of block 3118, wireless transducing circuit 2010 illuminates status display 2008.

Blocks 3120, 3122, and 3124 are optional and may be omitted in embodiments where smart wireless tracking belt 3020 does not automatically identify authorized movement. If included, in block 3120, method 3100 determines authorized deactivation. In one example of block 3120, smart wireless tracking belt 3020 detects proximity of a smart badge worn by a person moving and/or unfastening smart wireless tracking belt 3020, and/or a client device carried by a person moving and/or unfastening smart wireless tracking belt 3020, receives a unique ID from the smart badge or client device, validates (e.g., within an internal lookup table and/or by communication with server 704) that the unique ID indicates authorization to deactivate smart wireless tracking belt 3020 and/or open padlock 3006. In embodiments where block 3120 is not included, smart wireless tracking belt 3020 may not check for proximity of a smart badge worn by a person when smart wireless tracking belt 3020 is moved. Accordingly, any movement detected by smart wireless tracking belt 3020 is assumed unauthorized.

If included, in block 3122, method 3100 extinguishes status display. In one example of block 3122, smart wireless tracking belt 3020 deactivates status display 2008 if active. In block 3124, method 3100 transitions to an inactive mode. In one example of block 3124, smart wireless tracking belt 3020 transitions to an inactive mode in which smart wireless tracking belt 3020 is not actively detecting motion and/or does not send messages indicative of detected motion. When deactivated, smart wireless tracking belt 3020 may send to server 704 and/or mobile gateway 710, a deactivation message indicating the unique ID of smart wireless tracking belt 3020, the unique ID of the authorized personnel, and a current date and time.

In certain embodiments, block 3120 is invoked by any of block 3112 and 3114 when movement and/or unfastening is detected. Accordingly, when smart wireless tracking belt 3020 is removed by authorized personnel, smart wireless tracking belt 3020 prevents warning messages and/or alerts from being generated and sent.

Advantageously, where multiple smart wireless tracking belts 3020 are deployed, each has its own unique ID, and each smart wireless tracking belt 3020 may be configured to have different, or the same, authorized personnel. For example, each smart wireless tracking belt 3020 may store a set of IDs for authorized personnel, where the set of authorized personnel is different (sets may have overlap) or the same for each smart wireless tracking belt 3020 depending on the situation. In this embodiment, to remove smart wireless tracking belt 3020, such as to allow operation of a piece of equipment, smart wireless tracking belt 3020 may require two operators (e.g., an authorized employee and their supervisor) present such that both IDs are concurrently detected. In further example, to unlock a piece of equipment smart wireless tracking belt 3020 may require that two people of different authority levels (or security access authorization) be present. Such operation may be implemented by one smart wireless tracking belt 3020 that includes a set of two IDs of authorized personnel or may be implemented by deploying two smart wireless tracking belts 3020, where each requires a different one of the two IDs. Where two smart wireless tracking belts 3020 are deployed of different equipment, each may have different requirements for authorization from the other.

Figure 32:
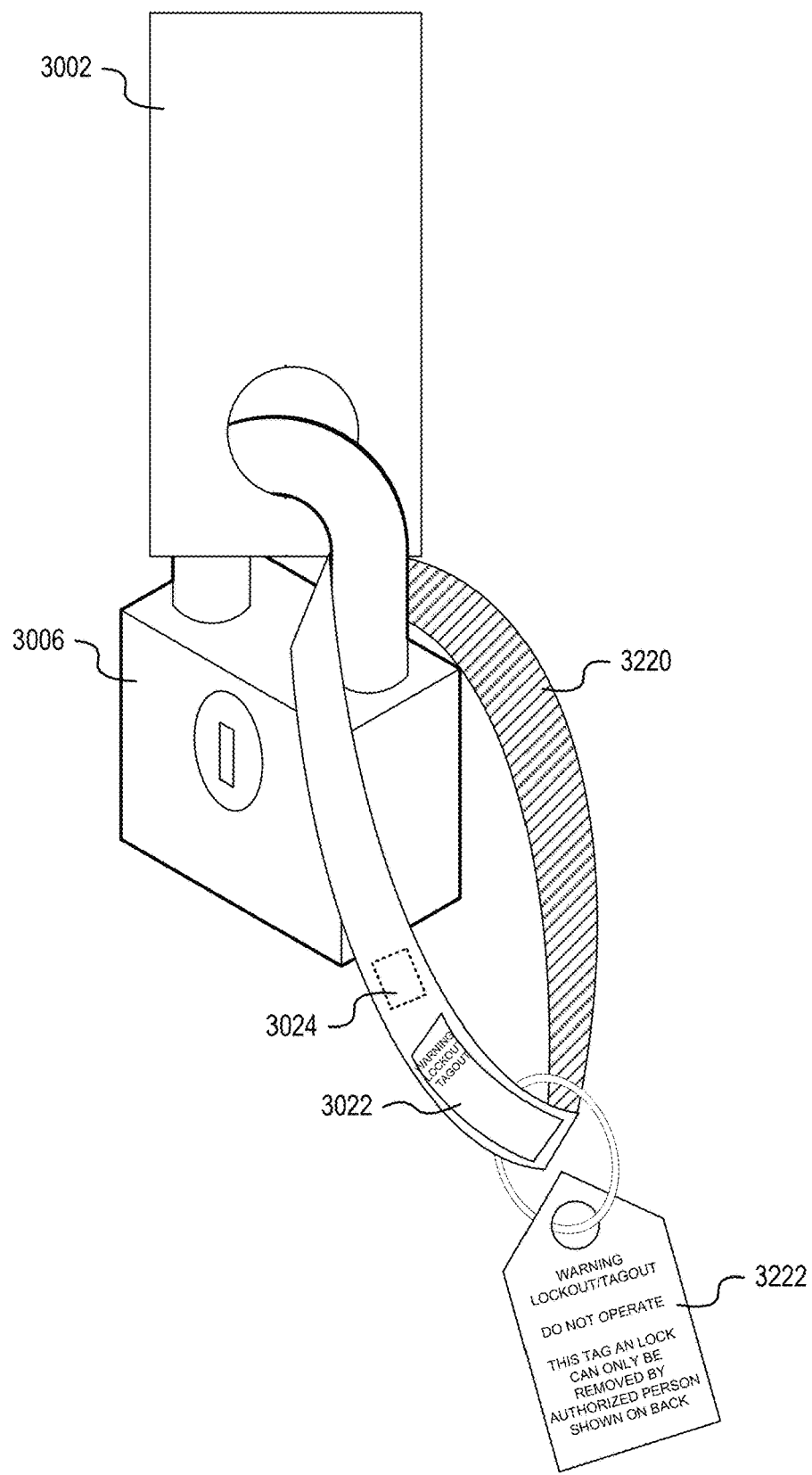
FIG. 32 is a schematic diagram illustrating one example smart wireless tracking belt with an attached warning display, in embodiments.

FIG. 32 is a schematic diagram illustrating one example smart wireless tracking belt 3220 with an attached warning display 3222. Smart wireless tracking belt 3220 is similar to smart wireless tracking belt 3020 of FIG. 30, but excludes built-in warning display 3022, and includes attached warning display 3222, for example, in the form of a tag that conforms to OSHA lockout/tagout regulations. Further, the use of attached warning display 3222 allows smart wireless tracking belt 3020 to be used for different purposes, whereby the appropriate attached warning display 3222 is selected for the intended use. For example, smart wireless tracking belt 3020 may be generic, and a user writes the relevant information (e.g., name of authorized user, time, etc.) on attached warning display 3222 (e.g., a label tag) with pen, marker, or label maker (or digitally using a user device and associated database of tracking tags). After user, attached warning display 3222 may be removed from smart wireless tracking belt 3020. Smart wireless tracking belt 3020 may then be used again with another attached warning display 3222.

Figure 33:
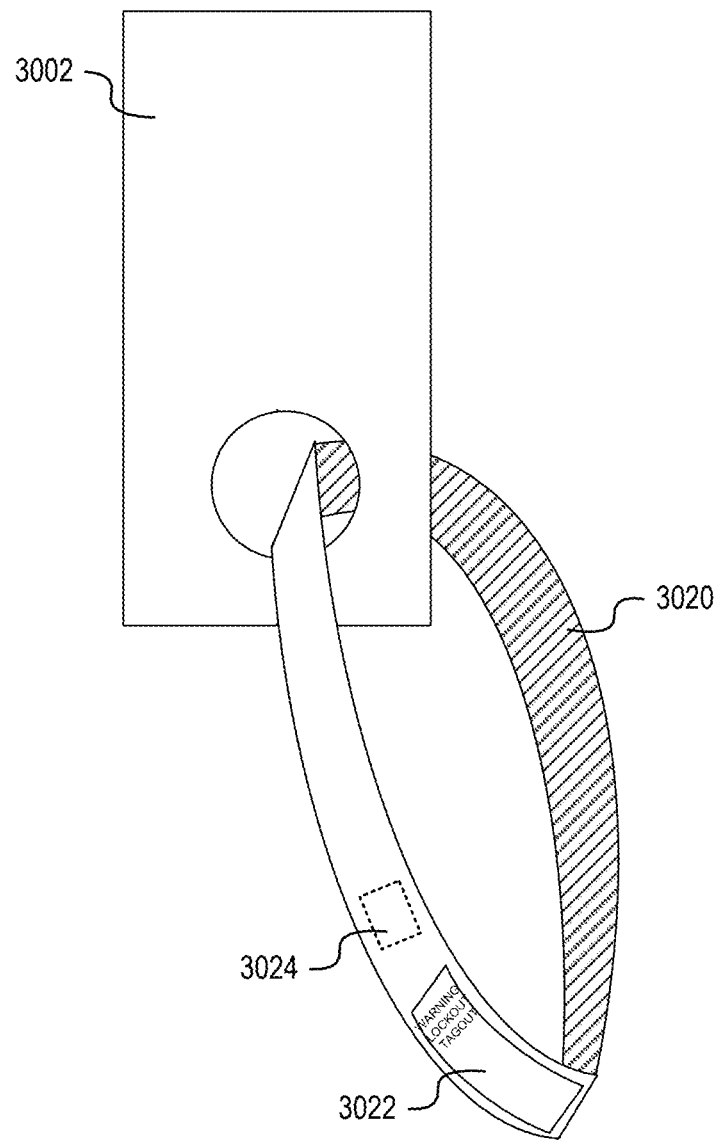
FIG. 33 is a schematic diagram illustrating an alternative scenario where the smart wireless tracking belt of FIG. 30 is looped through physical lockout control, in embodiments.

FIG. 33 is a schematic diagram illustrating an alternative scenario where smart wireless tracking belt 3020 of FIG. 30 is looped through physical lockout control 3002. In this scenario, smart wireless tracking belt 3020 is used without padlock 3006 and operates to detect movement of physical lockout control 3002 and thereby detect any inadvertent attempt at operating equipment 3004 and/or removal of smart wireless tracking belt 3020 therefrom. That is, use of smart wireless tracking belt 3020 alone detects any inadvertent attempt at activating equipment 3004.

Figure 34:
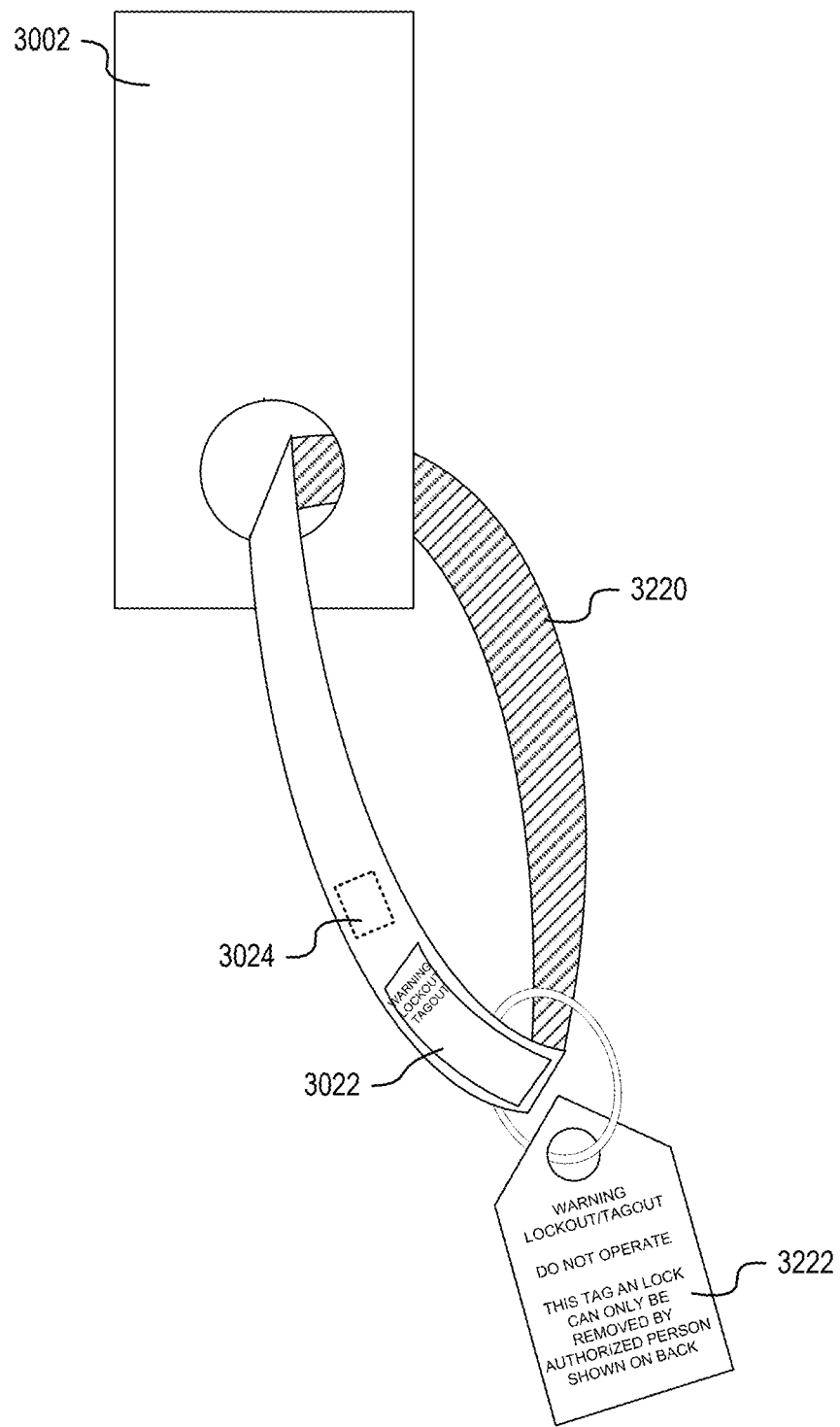
FIG. 34 is a schematic diagram illustrating one alternative scenario where the smart wireless tracking belt of FIG. 32, with attached warning display, is looped through physical lockout control, in embodiments.
Figure 35:
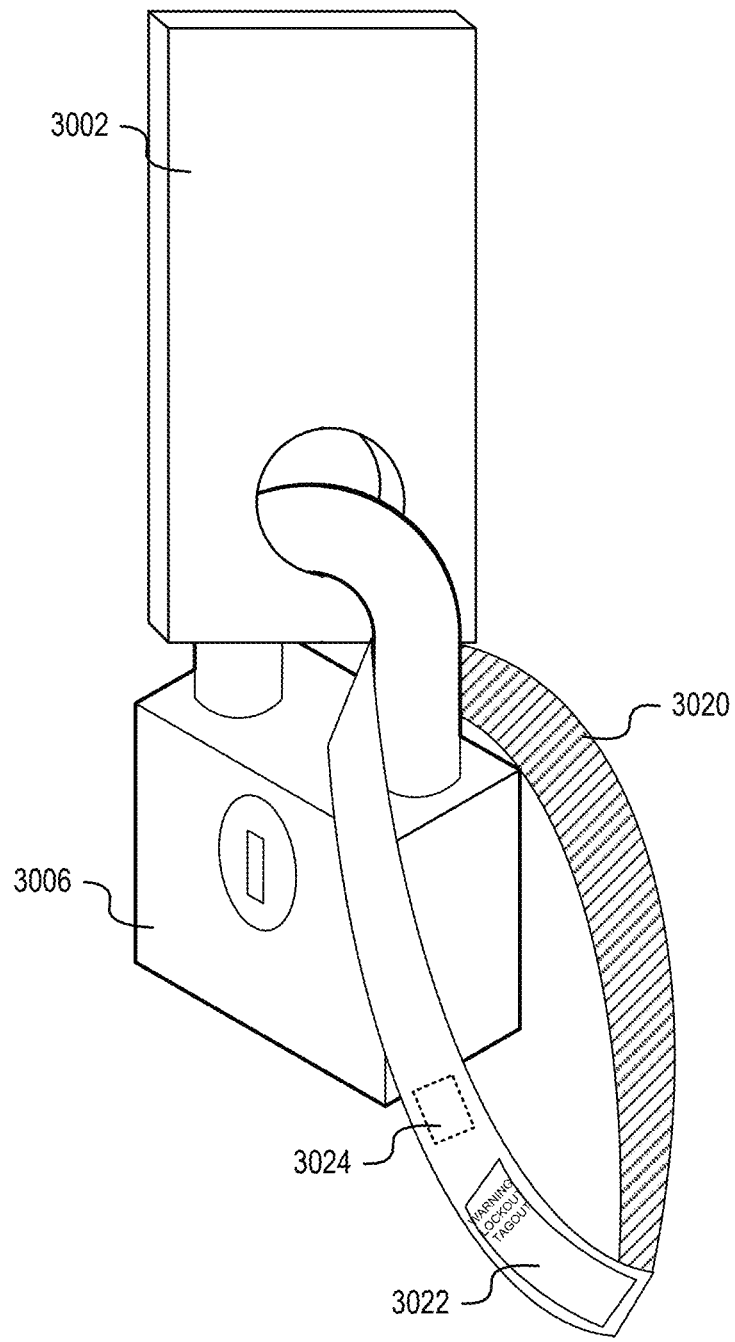
FIG. 35 is a schematic diagram illustrating an alternative scenario where the smart wireless tracking belt of FIG. 30 is deployed around the closed shackle of padlock and fastened on itself, in embodiments.

FIG. 34 is a schematic diagram illustrating one alternative scenario where smart wireless tracking belt 3220 of FIG. 32, with attached warning display 3222, is looped through physical lockout control 3002. In this scenario, smart wireless tracking belt 3220 is used without padlock 3006 and operates to detect movement of physical lockout control 3002 and/or removal of smart wireless tracking belt 3220 therefrom. Smart wireless tracking belt 3220 includes attached warning display 3222, for example, in the form of a tag that conforms to OSHA lockout/tagout regulations FIG. 35 is a schematic diagram illustrating an alternative scenario where smart wireless tracking belt 3020 of FIG. 30 is deployed around the closed shackle of padlock 3006 and fastened on itself as described above. In this embodiment, smart wireless tracking belt 3020 detects movement (e.g., tampering) with padlock 3006.

Figure 36:
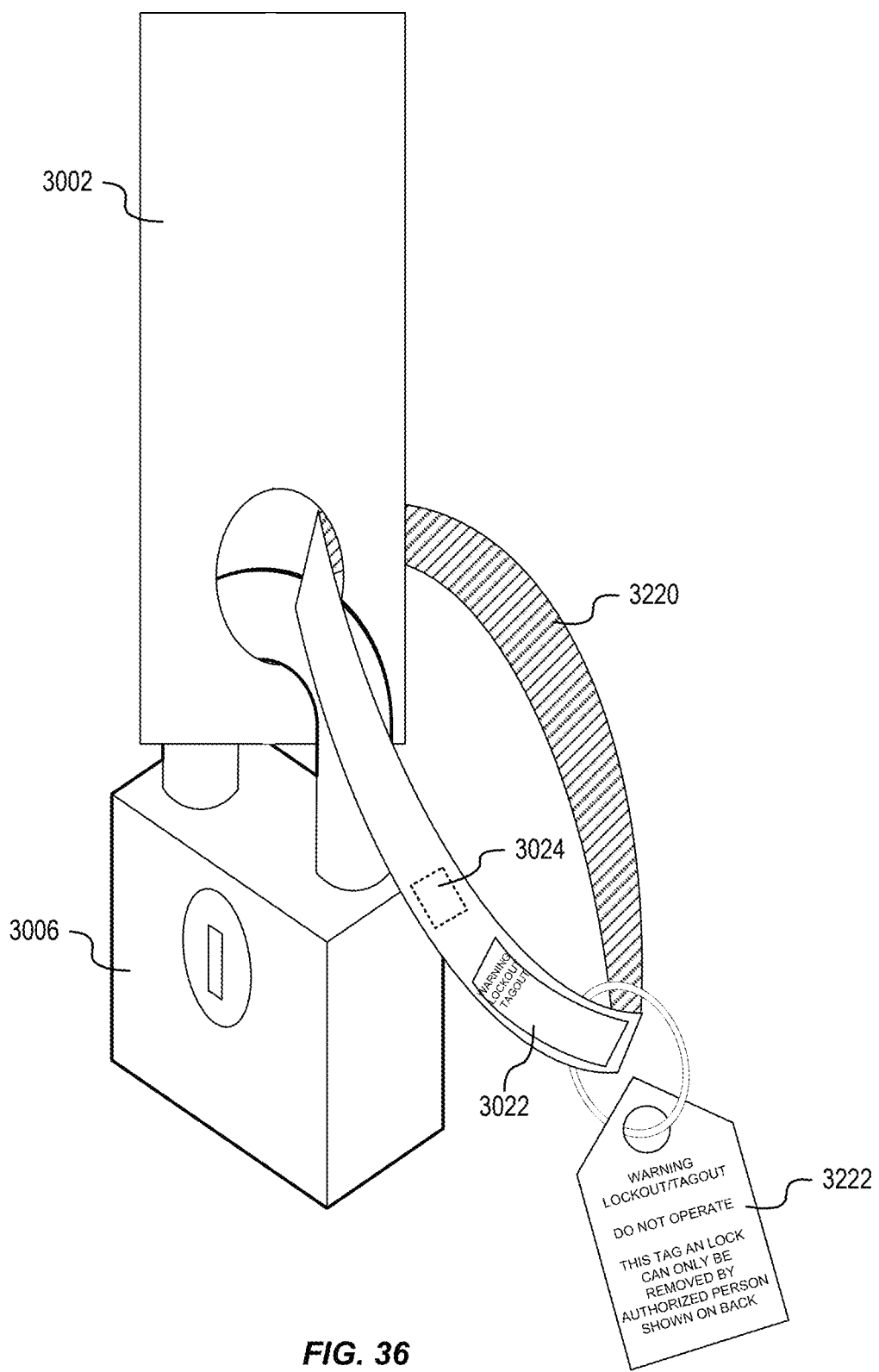
FIG. 36 is a schematic diagram illustrating one alternative scenario where the smart wireless tracking belt of FIG. 32, with attached warning display, is looped through physical lockout control with padlock, in embodiments.

FIG. 36 is a schematic diagram illustrating one alternative scenario where smart wireless tracking belt 3220 of FIG. 32, with attached warning display 3222, is looped through physical lockout control 3002 with padlock 3006.

The smart wireless tracking belt may include a warning display that warns unauthorized users not to remove the smart wireless tracking belt and not to change the state of or operate the equipment (removing the portion from isolation). The warning display may be a message and/or graphics printed on the smart tracking device, for example. In other examples, the warning display is an electronic display (such as an LED, an LED panel, another light emitting element, an electronic paper display, an OLED display, an LCD display, or some other type of display). The smart wireless tracking belt may also include a speaker for playing an audio alarm when the smart wireless tracking belt is unfastened.

Figure 37:
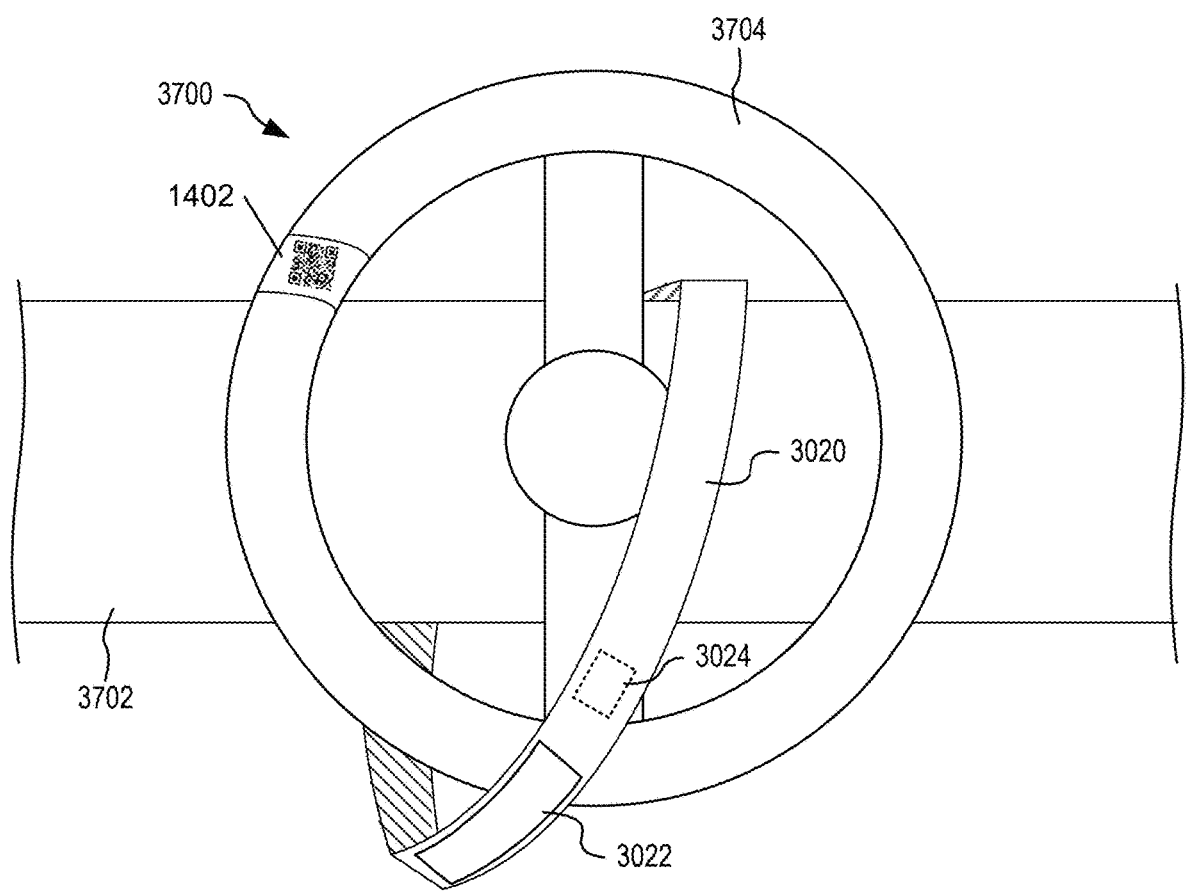
FIG. 37 is a schematic diagram illustrating example use of the smart wireless tracking belt of FIG. 30 to monitor and/or implement a lockout/tagout protocol for a valve that controls flow of a fluid through a pipe, in embodiments.

FIG. 37 is a schematic diagram illustrating example use of smart wireless tracking belt 3020 of FIG. 30 to monitor and/or implement a lockout/tagout protocol for a valve 3700 that controls flow of a fluid through a pipe 3702. Smart wireless tracking belt 3020 is looped through a handle 3704 of valve 3700 and around pipe 3702 when valve 3700 is closed, for example. To open valve 3700, by turning handle 3704, requires that smart wireless tracking belt 3020 be moved and removed. In this scenario, smart wireless tracking belt 3020 operates to detect movement of valve handle 3704 and thereby detect any inadvertent attempt at changing flow through pipe 3702 and/or removal of smart wireless tracking belt 3020 therefrom. That is, use of smart wireless tracking belt 3020 alone detects any inadvertent attempt at operating valve 3700.

In this embodiment, smart wireless tracking belt 3020 serves as notice to operators that the position of the valve or switch 3700 should not be changed. In certain embodiments, the smart wireless tracking belt 3020 may be positioned with respect to the valve or switch 3700 in a manner that physically restricts a user from changing the position of the valve or switch 3700 without removing the smart wireless tracking belt 3020. Therefore, the smart wireless tracking belt 3020 can track when the valve or switch 3700 is potentially moved. In embodiments, the valve or switch 3700 may be locked in place, such as using lock 3006 discussed above, and smart wireless tracking belt 3020 operates to detect if the lock 3006 is unlocked, removed, or broken as discussed above. Smart wireless tracking belt 3020 may operate to periodically transmit a "heartbeat signal" such as a ping or message that indicates the valve 3700 or lock 3006 has not been removed, locked, broken, or changed positions (or whether such removal, lock, break, or position change has occurred).

In embodiments, although only one smart wireless tracking belt 3020 is shown in FIG. 32, multiple tracking devices may be used. For example, on smart wireless tracking belt 3020 may be used to monitor lockout/tagout as discussed above, and another may be used to monitor valve position of valve 3700 as shown in FIG. 37. Alternatively, a single device may perform both functions (e.g., both lockout/tagout and valve position monitoring).

In certain embodiments, as shown in FIG. 37, wireless tracking device 1402 of FIGS. 14A and 14B is also attached to valve handle 3704 and operates to detect movement of valve handle 3704 and/or a position of valve handle 3704, as described above with respect to FIGS. 14A and 14B. Wireless tracking device 1402 and smart wireless tracking belt 3020 may collaborate to increase reliability and sensitivity to detect movement.

In other embodiments, wireless tracking device 1402 may operate in place of smart wireless tracking belt 3020 to monitor and/or implement the lockout/tagout protocol for valve 3700.

Figure 38A:
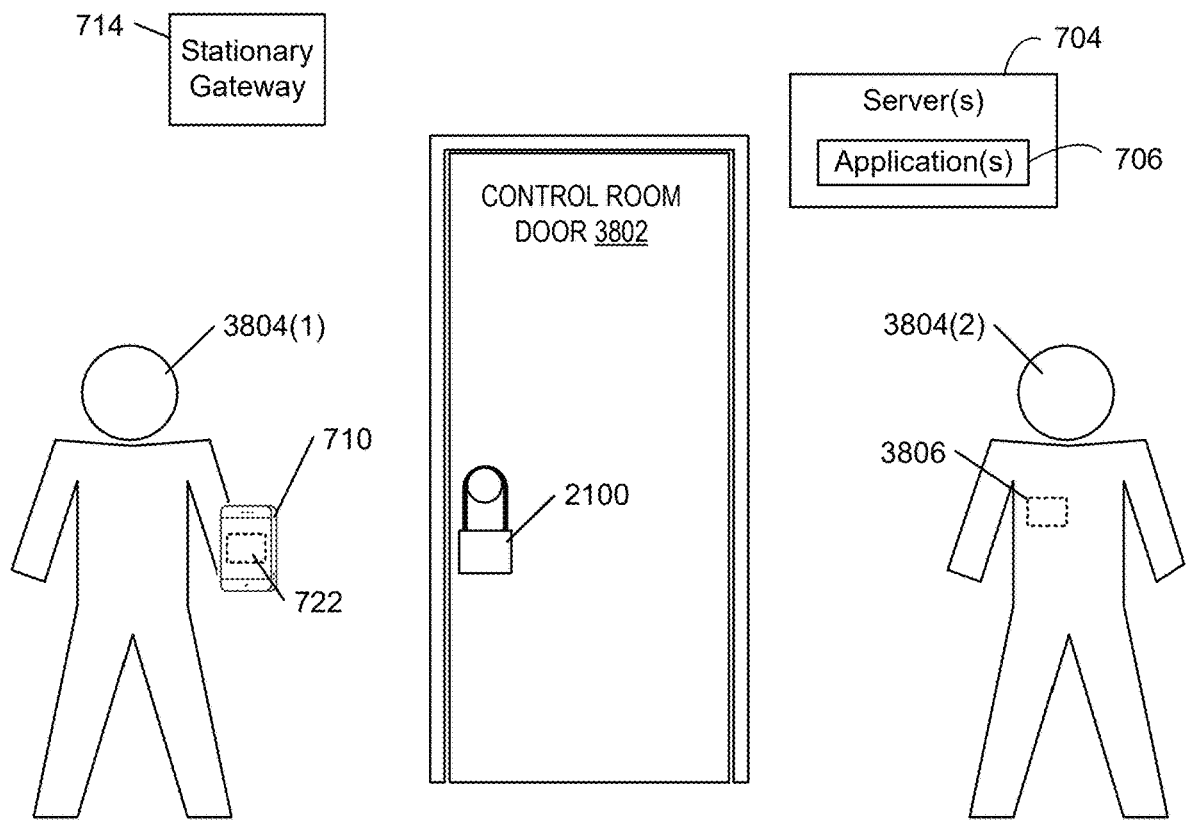
FIG. 38A shows the single-use smart security device of FIGS. 21A and 21B being used to lockout/tagout of a door where two authorized personnel are required to be present when single-use smart security device is deactivated and removed from door, in embodiments.
Figure 38B:
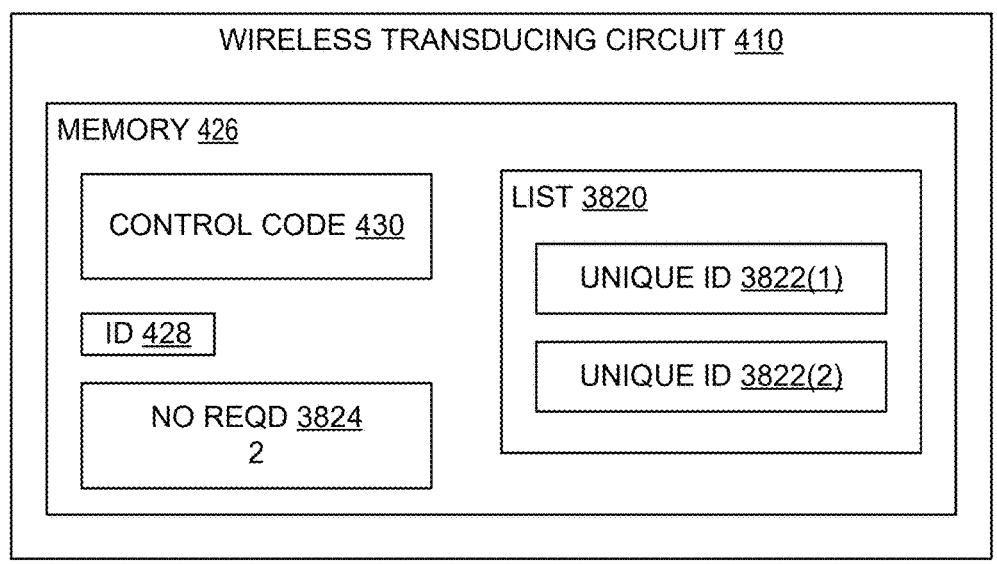
FIG. 38B shows a wireless transducing circuit of the single-use smart security device of FIGS. 21A and 21B in further example detail, in embodiments.

FIG. 38A shows single-use smart security device 2100 of FIGS. 21A and 21B being used to lockout/tagout of a door 3802 (e.g., to a control room) and where two authorized personnel 3804(1) and 3802(2) are required to be present when single-use smart security device 2100 is deactivated and removed from door 3802. Any of wireless tracking devices 1402, 1502, 1702, 1802, 2020, 2100, 2200, 2300, 2400, 2500, 2600, 2700, and 2800 of FIGS. 14A and 14B, 15, 16, 17, 18, 20, 21A and 21B, 22, 23A and 23B, 24A and 24B, 25, 26, 27, 28A and 28B, respectively, may be used to implement lockout/tagout protocols as described herein. FIG. 38B shows wireless transducing circuit 410 of single-use smart security device 2100 in further example detail. Memory 426 of single-use smart security device 2100 includes a list 3820 of unique IDs 3822 of personnel authorized to deactivate single-use smart security device 2100, and a number required variable 3824 that indicates the number of personnel required to be simultaneously present to deactivate single-use smart security device 2100. In this example, number required variable 3824 is set to two and list 3820 includes two unique IDs 3822(1) and 3822(2) that correspond to authorized personnel 3804(1) and 3802(2). For example, client application 722 of person 3804(1) may include unique ID 3822(1) and a smart badge 3806 of person 3804(2) may include unique ID 3822(2). List 3820 may have additional unique IDs 3822 where any two of the listed personnel are authorized to deactivate single-use smart security device 2100.

In the example of FIGS. 38A and 38B, single-use smart security device 2100 is used to secure a lock of a control room door 3802, where security loop 2104 is passed through a portion of the lock to prevent operation of the lock, and then single-use smart security device 2100 is activated by a mobile gateway 710 or other component of wireless tracking system 700 of FIG. 7. Once activated, single-use smart security device 2100 operates as described above to generate notification/alert messages and/or interventions when someone attempts to access through door 3802 or attempts to remove single-use smart security device 2100.

When the lockout/tagout is to be removed, and prior to single-use smart security device 2100 being cut and removed from the lock of door 3802, single-use smart security device 2100 reads unique ID 3822(1) from mobile gateway 710 of person 3804(1) and unique ID 3822(2) from smart badge 3806 of person 3804(2). Accordingly, when security loop 2104 is cut, control code 430 determines that both authorized personnel 3804(1) and 3804(2) are present and therefore there is no security breach, and no notification or alert messages are generated. In certain embodiments, single-use smart security device 2100 sends a message to server 704 with unique IDs 3822(1) and 3822(2) to log the removal of the lockout/tagout protocol. When security loop 2104 is not cut, or single-use smart security device 2100 otherwise deactivated, single-use smart security device 2100 may continue to follow the lockout/tagout protocol.

When security loop 2104 is cut with fewer than the number required value 3824 of authorized personnel present, single-use smart security device 2100 sends a notification/alert to one or more of mobile gateway 710, static gateway 714, and server 704 to indicate the breach in lockout/tagout protocol.

Other embodiments and Examples of Use

The above-described solutions for monitor and/or implement a lockout/tagout protocol may be applied to other controls without departing from the scope hereof. For example, any of wireless tracking devices 1402, 1502, 1702, 1802, 2020, 2100, 2200, 2300, 2400, 2500, 2600, 2700, and 2800 of FIGS. 14A and 14B, 15, 16, 17, 18, 20, 21A and 21B, 22, 23A and 23B, 24A and 24B, 25, 26, 27, 28A and 28B, respectively, may be used to monitor a gate, a door, a control for a sluiceway, and so on. Advantageously, these wireless tracking devices may be applied to anything that controls a flow of people, objects, and materials, and provides a notification, alert, or intervention in response to detecting that the control is moved or tampered with. The use of a lockout/tagout indication informs people that control should not be changed, and knowledge that a notification or intervention will be sent if a control is changed allows a person (e.g., maintenance technician) to proceed with safety.

In certain embodiments, magnetic valve monitoring device 2800 may also be used for lockout/tagout. For example, where magnetic valve monitoring device 2800 senses a status change in valve 2802 that is unexpected, or that is an indication of a control change, magnetic valve monitoring device 2800 may send a notification, alert, or intervention. In another example, magnetic valve monitoring device 2800 may cooperate and report valve operational changes to another lockout/tagout device that sends the notification, alert, or intervention. In another example, where magnetic valve monitoring device 2800 operates to monitor valve 1802 at intervals, another lockout/tagout device may change the interval to be shorter such that magnetic valve monitoring device 2800 detects any change in the valve status sooner, particularly where the lockout/tagout device detects tampering.

In another example, where a device (e.g., a furnace normally run continuously) is shut down for maintenance and requires certain checks or procedures before turning it back on, the main control may be locked out, using a wireless tracking device, until the checks and procedure have been completed.

Figure 39:
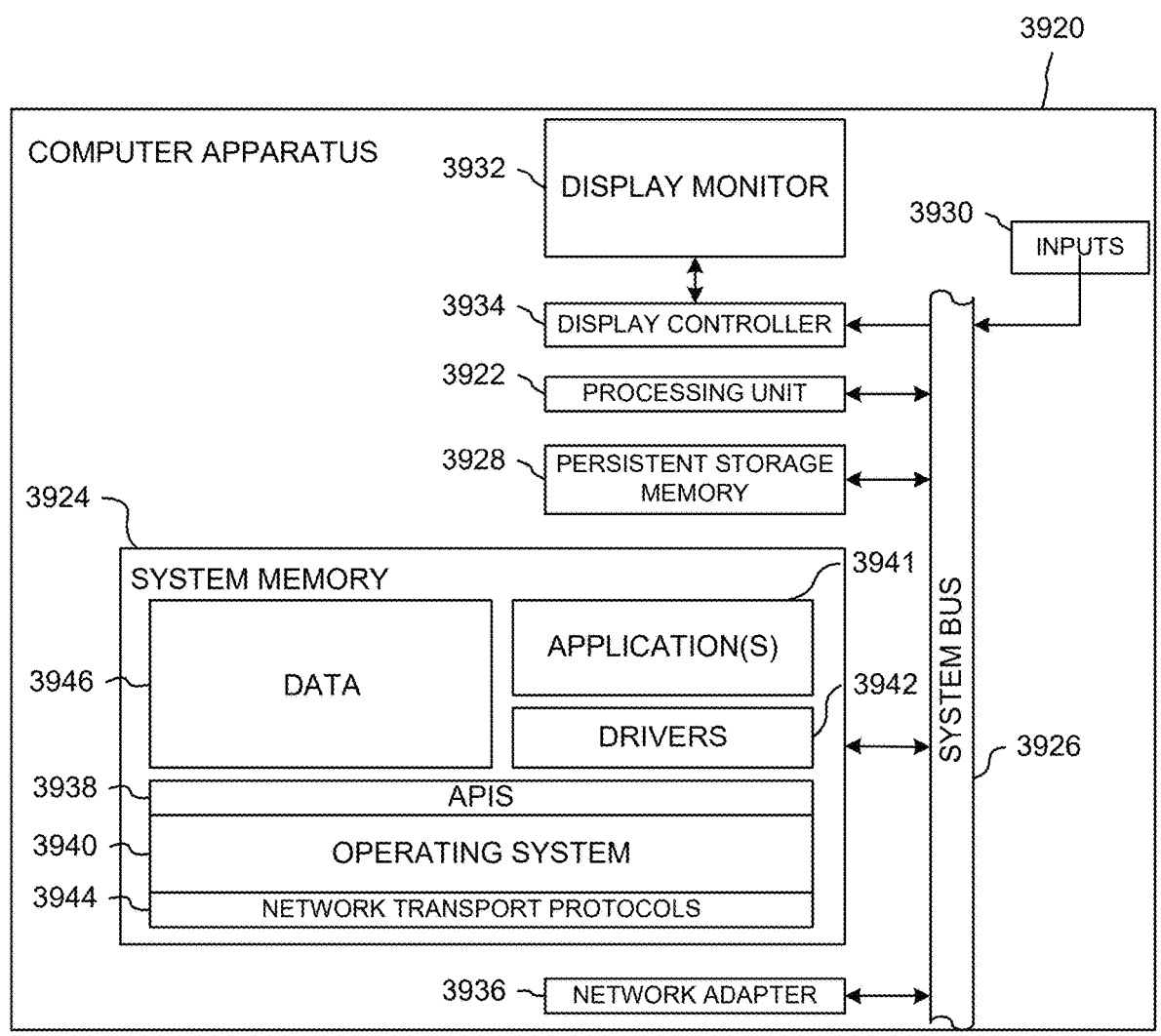
FIG. 39 shows one example computer apparatus that, either alone or in combination with one or more other computing apparatus, is operable to implement one or more of the computer systems described in this specification, in embodiments.

FIG. 39 shows an example embodiment of computer apparatus 3920 that, either alone or in combination with one or more other computing apparatus, is operable to implement one or more of the computer systems described in this specification. For example, computer apparatus 3920 may represent any of wireless tracking devices 1402, 1502, 1702, 1802, 2020, 2100, 2200, 2300, 2400, 2500, 2600, 2700, and 2800 of FIGS. 14A and 14B, 15, 16, 17, 18, 20, 21A and 21B, 22, 23A and 23B, 24A and 24B, 25, 26, 27, 28A and 28B, respectively. Computer apparatus 3920 may also represent any of smart wireless tracking belts 3020 and 3220 of FIGS. 30, and 32, respectively. The computer apparatus 3920 includes a processing unit 3922, a system memory 3924, and a system bus 3926 that couples the processing unit 3922 to the various components of the computer apparatus 3920. The processing unit 3922 may include one or more data processors, each of which may be in the form of any one of various commercially available computer processors. The system memory 3924 includes one or more computer-readable media that typically are associated with a software application addressing space that defines the addresses that are available to software applications. The system memory 3924 may include a read only memory (ROM) that stores a basic input/output system (BIOS) that contains start-up routines for the computer apparatus 3920, and a random-access memory (RAM). The system bus 3926 may be a memory bus, a peripheral bus, or a local bus, and may be compatible with any of a variety of bus protocols, including PCI, VESA, Microchannel, ISA, and EISA. The computer apparatus 3920 also includes a persistent storage memory 3928 (e.g., a hard drive, a floppy drive, a CD ROM drive, magnetic tape drives, flash memory devices, and digital video disks) that is connected to the system bus 3926 and contains one or more computer-readable media disks that provide non-volatile or persistent storage for data, data structures and computer-executable instructions.

A user may interact (e.g., input commands or data) with the computer apparatus 3920 using one or more input devices 3930 (e.g. one or more keyboards, computer mice, microphones, cameras, joysticks, physical motion sensors, and touch pads). Information may be presented through a graphical user interface (GUI) that is presented to the user on a display monitor 3932, which is controlled by a display controller 3934. The computer apparatus 3920 also may include other input/output hardware (e.g., peripheral output devices, such as speakers and a printer). The computer apparatus 3920 connects to other network nodes through a network adapter 3936 (also referred to as a "network interface card" or NIC).

A number of program modules may be stored in the system memory 3924, including application programming interfaces 3938 (APIs), an operating system (OS) 3940 (e.g., the Windows® operating system available from Microsoft Corporation of Redmond, Washington U.S.A.), software applications 3941 including one or more software applications programming the computer apparatus 3920 to perform one or more of the steps, tasks, operations, or processes of the positioning and/or tracking systems described herein, drivers 3942 (e.g., a GUI driver), network transport protocols 3944, and data 3946 (e.g., input data, output data, program data, a registry, and configuration settings).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features

Features described above as well as those claimed below may be combined in various ways without departing from the scope hereof. The following enumerated examples illustrate some possible, non-limiting combinations:

(A1) A system for detecting a setting of a control for equipment includes: a tracking device, having: a sensor that senses a position of the control, a memory storing the position and a setting module having non-transitory computer-readable instructions, and, a processor coupled to the sensor and the memory and configured to execute the setting module to analyze the position to determine the setting of the control; and, a battery that supplies power to the sensor, the memory, and the processor.

(A2) In embodiments of (A1), the tracking device being flexible and having an adhesive surface that, in use, adheres the tracking device to the equipment.

(A3) In either of embodiments (A1) or (A2), the sensor being one or more of a magnetometer, an accelerometer, a gyroscope, a compass sensor, a position sensor, an optical sensor, and an image sensor, a time-of-flight sensor, an acoustic sensor, and an infrared sensor.

(A4) Any of embodiments (A1)-(A3) the tracking device further including a wireless communication module;

wherein the processor is configured to transmit notification of a change in the setting to another device external to the flexible tracking device.

(A5) In any of embodiments (A1)-(A4), the tracking device being coupled to a moveable portion of the equipment.

(A6) In any embodiment (A5), the moveable portion being one of: a valve handle and a control lever.

(A7) In any of embodiments (A1)-(A6), the position including orientation of the tracking device.

(A8) In any of embodiments (A1)-(A7), the setting module including instructions that, when executed by the processor, operate to aggregate the position with another position received from another tracking device to verify the setting of the control.

(A9) In any of embodiments (A1)-(A8), wherein, in response to a change in the setting, an operational assignment of the flexible tracking device is altered from a first operational assignment to a second operational assignment.

(A10) In any embodiment (A9), the second operational assignment including detecting ambient air temperature.

(A11) In any of embodiments (A1)-(A10), the setting data including optical data, wherein the analyzing the setting data to determine a setting includes identifying when an indicator light of the equipment turns on or off.

(A12) In any of embodiments (A1)-(A11), the flexible tracking device including a lockout circuit; wherein, when the flexible tracking device is secured to a lockout device, the lockout circuit is located to trigger when the lockout device is unlocked or tampered with.

(A13) In any embodiment (A12), the memory further storing a lockout module that, when executed by the processor, operates to monitor the lockout circuit; and, when the lockout circuit indicates the lockout device is improperly oriented, transmit an alert to another device.

(A14) In any embodiment (A13), the lockout module, when executed by the processor, further operating to periodically transmit a status signal indicating whether the lockout circuit is properly oriented.

(A15) In any of embodiments (A12)-(A14), the lockout circuit triggering in response to a change in inductance of the lockout circuit.

(A16) In any of embodiments (A12)-(A15), the lockout circuit triggering in response to the lockout circuit becoming an open circuit.

(A17) In any of embodiments (A12)-(A16), the lockout circuit being a one-time use circuit.

(B1) A method for lockout/tagout using a wireless tracking device includes: detecting unexpected movement of the wireless tracking device by: reading sensor data from at least one movement sensor of the wireless tracking device; and processing the sensor data to detect movement of the wireless tracking device; and generating an alert when the unexpected movement is detected.

(B2) In embodiments of (B1), the wireless tracking device being attached to a control of equipment having a lockout/tagout procedure, wherein the wireless tracking device detects violations of the lockout/tagout procedure.

(B3) In either of embodiments (B1) or (B2), the step of generating an alert including sending a wireless message including a unique identifier of the wireless tracking device to a server, wherein the server sends a message to a mobile gateway near the equipment.

(B4) In any of embodiments (B1)-(B3), the step of generating an alert including sending a wireless message including a unique identifier of the wireless tracking device directly to a mobile gateway near the equipment.

(B5) In any of embodiments (B1)-(B4), the step of generating an alert including sending a wireless message including a unique identifier of the wireless tracking device directly to a wireless receiver of the equipment.

(B6) In any of embodiments (B1)-(B5), the step of detecting fastening of the wireless tracking device includes reading sensor data from a magnetic sensor positioned in a head portion of the wireless tracking device; and processing the sensor data to determine presence of a magnetic field of one magnet positioned in a pouch adjustably positionable on a tail portion of the wireless tracking device.

(B7) Any of embodiments (B1)-(B6) further including determining unexpected unfastening of the wireless tracking device by: reading sensor data from the magnetic sensor at intervals; and processing the sensor data to determine when the magnetic sensor does not sense the magnet.

(B8) Any of embodiments (B1)-(B7) further including logging at least one of the detected fastening, the detected unfastening, and the detected unexpected movement, and sending the log to an external device.

(B9) Any of embodiments (B1)-(B8) further including receiving a unique ID from an external device proximate the wireless tracking device; determining that the unique ID corresponds to authorized personnel; and determining movement is expected when the unique ID corresponds to authorized personnel.

(B 10) Any of embodiments (B1)-(B9) further including receiving a plurality of unique IDs from external devices proximate the wireless tracking device; determining that the unique IDs correspond to authorized personnel; and determining movement is expected when the unique IDs correspond to authorized personnel.

(C1) A method for lockout/tagout using a wireless tracking device includes: detecting unexpected movement of a control of equipment by: reading sensor data from at least one sensor of the wireless tracking device; and processing the sensor data to determine the control has moved; and generating an alert when the control is moved unexpectedly.

(C2) The embodiment (C1) further including receiving a unique ID from an external device proximate the wireless tracking device; and including the unique ID in the alert.

(C3) Either of embodiments (C1) or (C2) further including receiving a unique ID from an external device proximate the wireless tracking device; determining that the unique ID corresponds to authorized personnel; and determining movement of the control is expected when the unique ID corresponds to authorized personnel.

(D1) A wireless tracking device for monitoring position of a control includes: a sensor that senses a position of the control; a memory storing the position and non-transitory computer-readable instructions; a processor coupled to the sensor and the memory and configured to execute the computer-readable instructions to determine change in a position of the control; a battery that supplies power to the sensor, the memory, and the processor; and wherein the wireless tracking device is flexible and has an adhesive surface that, in use, adheres the wireless tracking device to the control.

What is claimed is:
1. A system for detecting a setting of a control for equipment, comprising:
  a tracking device, having:
    a sensor that senses a position of the control,
    a memory storing the position and a control code having non-transitory computer-readable instructions, and a processor coupled to the sensor and the memory and configured to execute the control code to analyze the position to determine the setting of the control; and, a battery that supplies power to the sensor, the memory, and the processor.

2. The system of claim 1, the tracking device being flexible and having an adhesive surface that, in use, adheres the tracking device to the equipment.

3. The system of claim 1, the sensor being one or more of a magnetometer, an accelerometer, a gyroscope, a compass sensor, a position sensor, an optical sensor, and an image sensor, a time-of-flight sensor, an acoustic sensor, and an infrared sensor.

4. The system of claim 1, the tracking device further comprising a wireless communication module; wherein the wireless communication module is configured to transmit notification of a change in the setting to another device external to the flexible tracking device.

5. The system of claim 1, the tracking device being coupled to a moveable portion of the equipment.

6. The system of claim 5, the moveable portion being one of: a valve handle and a control lever.

7. The system of claim 1, the position including orientation of the tracking device.

8. The system of claim 1, the control code including instructions that, when executed by the processor, operate to aggregate the position with another position received from another tracking device to verify the setting of the control.

9. The system of claim 1, wherein, in response to a change in the setting, an operational assignment of the flexible tracking device is altered from a first operational assignment to a second operational assignment.

10. The system of claim 9, the second operational assignment including detecting ambient air temperature.

11. The system of claim 1, the setting data including optical data, wherein the analyzing the setting data to determine a setting includes identifying when an indicator light of the equipment turns on or off.

12. The system of claim 1, the flexible tracking device including a lockout circuit; wherein, when the flexible tracking device is secured to a lockout device, the lockout circuit is located to trigger when the lockout device is unlocked or tampered with.

13. The system of claim 12, the memory further storing a lockout module that, when executed by the processor, operates to:
monitor the lockout circuit; and,
when the lockout circuit indicates the lockout device is improperly oriented, transmit an alert to another device.

14. The system of claim 13, the lockout module, when executed by the processor, further operating to periodically transmit a status signal indicating whether the lockout circuit is properly oriented.

15. The system of claim 12, the lockout circuit triggering in response to a change in inductance of the lockout circuit.

16. The system of claim 12, the lockout circuit triggering in response to the lockout circuit becoming an open circuit.

17. The system of claim 12, the lockout circuit being a one-time use circuit.

18. A method for lockout/tagout using a wireless tracking device comprising:
detecting, by the wireless tracking device, fastening of the wireless tracking device to a piece of equipment based on sensor data from one or more sensors of the wireless tracking device;

in response, transitioning, by the wireless tracking device, to an active monitoring mode of the wireless tracking device;

detecting, by the wireless tracking device, unexpected movement of the wireless tracking device by:
reading sensor data from at least one movement sensor of the wireless tracking device; and
processing the sensor data from the at least one movement sensor to detect movement of the wireless tracking device; and
generating an alert when the unexpected movement is detected.

19. The method of claim 18, the wireless tracking device being attached to a control of the piece of equipment having a lockout/tagout procedure, wherein the wireless tracking device detects violations of the lockout/tagout procedure.

20. The method of claim 18, the step of generating an alert comprising sending a wireless message including a unique identifier of the wireless tracking device to a server, wherein the server sends a message to a mobile gateway near the piece of equipment.

21. The method of claim 18, the step of generating an alert comprising sending a wireless message including a unique identifier of the wireless tracking device directly to a mobile gateway near the piece of equipment.

22. The method of claim 18, the step of generating an alert comprising sending a wireless message including a unique identifier of the wireless tracking device directly to a wireless receiver of the piece of equipment.

23. The method of claim 18, the step of detecting fastening of the wireless tracking device comprising:
reading sensor data from a magnetic sensor positioned in a head portion of the wireless tracking device; and
processing the sensor data to determine presence of a magnetic field of one magnet positioned in a pouch adjustably positionable on a tail portion of the wireless tracking device.

24. The method of claim 23, further comprising determining unexpected unfastening of the wireless tracking device by:
reading sensor data from the magnetic sensor at intervals; and
processing the sensor data to determine when the magnetic sensor does not sense the magnet.

25. The method of claim 24, further comprising logging at least one of the detected fastening, the detected unfastening, and the detected unexpected movement, and sending the log to an external device.

26. The method of claim 18, further comprising:
receiving a unique identifier (ID) from an external device proximate the wireless tracking device;
determining that the unique ID corresponds to authorized personnel; and
determining movement is expected when the unique ID corresponds to authorized personnel.

27. The method of claim 18, further comprising:
receiving a plurality of unique IDs from external devices proximate the wireless tracking device;
determining that the unique IDs correspond to authorized personnel; and
determining movement is expected when the unique IDs correspond to authorized personnel.

28. A method comprising:
detecting an unfastening of a wireless tracking device by:
reading sensor data from at least one sensor of the wireless tracking device; and processing the sensor data to determine the control has moved;
determining the unfastening is unexpected; and
generating an alert when the, in response, wherein
the wireless tracking device comprises:
  a processor;
  a memory coupled to the processor;
  a permanent magnet in a first portion of the wireless tracking device;
  the at least one sensor comprising a magnetic sensor in a second portion of the wireless tracking device, wherein the permanent magnet and the magnetic sensor are positioned within a threshold distance from each other when the wireless tracking device is fastened;
  and
  a mechanism for removably fastening the wireless tracking device to the piece of equipment.

29. The method of claim 28, further comprising:
receiving a unique ID from an external device proximate the wireless tracking device; and
including the unique ID in the alert.

30. The method of claim 28, wherein the determining the unfastening is unexpected comprises:
receiving a unique ID from an external device proximate the wireless tracking device; and
determining that the unique ID corresponds to unauthorized personnel.

* * * * *